US008137174B2

(12) United States Patent
Nicely et al.

(10) Patent No.: US 8,137,174 B2
(45) Date of Patent: Mar. 20, 2012

(54) GAMING SYSTEM, GAMING DEVICE, AND METHOD PROVIDING MULTIPLE HAND CARD GAME

(75) Inventors: Mark C. Nicely, Daly City, CA (US); Paul Baker Stroube, Oakland, CA (US); Steven Joseph Bazyl, Pacifica, CA (US)

(73) Assignee: IGT, Reno, NV (US)

( * ) Notice: Subject to any disclaimer, the term of this patent is extended or adjusted under 35 U.S.C. 154(b) by 1155 days.

(21) Appl. No.: 11/873,993

(22) Filed: Oct. 17, 2007

(65) Prior Publication Data

US 2009/0104962 A1 Apr. 23, 2009

(51) Int. Cl.
*A63F 13/00* (2006.01)
*A63F 1/18* (2006.01)

(52) U.S. Cl. ................ 463/13; 463/12; 463/16; 463/18; 463/25; 273/138.1; 273/274; 273/292; 273/306

(58) Field of Classification Search ............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 273/309

See application file for complete search history.

(56) References Cited

U.S. PATENT DOCUMENTS 2,743,108 A 4/1956 Sanders
3,904,207 A 9/1975 Gold
4,363,485 A 12/1982 Edwall
4,582,324 A 4/1986 Koza et al.
4,618,150 A 10/1986 Kimura
4,651,997 A 3/1987 Wood
4,652,998 A 3/1987 Koza et al.
4,659,087 A 4/1987 Shen et al.
4,695,053 A 9/1987 Vazquez, Jr. et al.

(Continued)

FOREIGN PATENT DOCUMENTS

EP 0 449 433 10/1991

(Continued)

OTHER PUBLICATIONS

Blackjackswitch.com, website <http://www.blackjackswitch.com> printed on Sep. 27, 2007, 5 pages.

*Primary Examiner* — Arthur O. Hall
(74) *Attorney, Agent, or Firm* — K&L Gates LLP

(57) ABSTRACT

A gaming device includes a single player poker game that includes one or more opportunities for selecting or forming player hands. In one embodiment, wagers are placed on several player hands, and the gaming device matches these wagers for each of several dealer hands. A play of the game includes one or more opportunities for a player to fold or cancel one of the player hands and withdraw the wager associated with the withdrawn hand. The gaming device may also cause one or more of the dealer hands to be folded. In another embodiment, the game includes dealing several initial player hands and enabling a player to select one of the player hands to compete against one or more dealer hands. In another embodiment, a play of the game includes dealing a plurality of player cards and enabling a player to form multiple player hands from the dealt player cards. The game also includes dealing a plurality of dealer cards and forming multiple dealer hands from the dealt dealer cards. In the embodiments, a number of community cards are dealt and the highest ranking combined hand of the formed or selected player and dealer hands wins an award.

17 Claims, 32 Drawing Sheets

U.S. PATENT DOCUMENTS

| | | | | | |
|---|---|---|---|---|---|
| 4,743,022 | A | | 5/1988 | Wood | |
| 4,775,155 | A | | 10/1988 | Lees | |
| 4,807,884 | A | | 2/1989 | Breeding | |
| 4,836,553 | A | * | 6/1989 | Suttle et al. | 273/292 |
| 4,844,464 | A | | 7/1989 | Berge | |
| 4,861,041 | A | | 8/1989 | Jones et al. | |
| 4,948,134 | A | * | 8/1990 | Suttle et al. | 463/13 |
| 5,019,973 | A | | 5/1991 | Wilcox et al. | |
| 5,033,744 | A | | 7/1991 | Bridgeman et al. | |
| 5,087,405 | A | | 2/1992 | Maker | |
| 5,098,107 | A | | 3/1992 | Boylan et al. | |
| 5,116,055 | A | | 5/1992 | Tracy | |
| 5,154,429 | A | | 10/1992 | LeVasseur | |
| 5,174,579 | A | | 12/1992 | Griffiths | |
| 5,205,555 | A | | 4/1993 | Hamano | |
| 5,248,142 | A | | 9/1993 | Breeding | |
| 5,257,789 | A | * | 11/1993 | LeVasseur | 273/309 |
| 5,275,400 | A | | 1/1994 | Weingardt et al. | |
| 5,275,416 | A | | 1/1994 | Schorr et al. | |
| 5,280,909 | A | | 1/1994 | Tracy | |
| 5,280,915 | A | * | 1/1994 | Groussman | 273/292 |
| 5,288,077 | A | | 2/1994 | Jones | |
| 5,288,081 | A | | 2/1994 | Breeding | |
| 5,292,127 | A | | 3/1994 | Kelly et al. | |
| 5,314,193 | A | * | 5/1994 | Ferrer | 273/292 |
| 5,334,836 | A | | 8/1994 | Filo | |
| 5,342,047 | A | | 8/1994 | Heidel et al. | |
| 5,342,049 | A | | 8/1994 | Wichinsky et al. | |
| 5,344,144 | A | | 9/1994 | Canon | |
| 5,356,140 | A | | 10/1994 | Dabrowski et al. | |
| 5,362,053 | A | | 11/1994 | Miller | |
| 5,364,105 | A | | 11/1994 | Jones | |
| 5,377,973 | A | * | 1/1995 | Jones et al. | 463/12 |
| 5,377,993 | A | | 1/1995 | Josephs | |
| 5,382,025 | A | * | 1/1995 | Sklansky et al. | 273/292 |
| 5,390,934 | A | | 2/1995 | Grassa | |
| 5,393,057 | A | | 2/1995 | Marnell, II | |
| 5,393,067 | A | | 2/1995 | Paulsen et al. | |
| 5,407,200 | A | | 4/1995 | Zalabah | |
| 5,411,271 | A | | 5/1995 | Mirando | |
| 5,417,430 | A | | 5/1995 | Breeding | |
| 5,431,407 | A | | 7/1995 | Hofberg et al. | |
| 5,437,462 | A | | 8/1995 | Breeding | |
| 5,452,899 | A | | 9/1995 | Skratulia et al. | |
| 5,454,570 | A | | 10/1995 | Karal | |
| 5,472,194 | A | | 12/1995 | Breeding et al. | |
| 5,476,259 | A | | 12/1995 | Weingardt | |
| 5,494,296 | A | | 2/1996 | Grassa | |
| 5,529,309 | A | | 6/1996 | Bartlett | |
| 5,531,440 | A | | 7/1996 | Dabrowski et al. | |
| 5,531,441 | A | | 7/1996 | Dabrowski et al. | |
| 5,531,448 | A | * | 7/1996 | Moody | 273/292 |
| 5,536,016 | A | | 7/1996 | Thompson | |
| 5,542,669 | A | | 8/1996 | Charron et al. | |
| 5,544,892 | A | | 8/1996 | Breeding | |
| 5,560,603 | A | | 10/1996 | Seelig et al. | |
| 5,570,885 | A | | 11/1996 | Ornstein | |
| 5,577,731 | A | | 11/1996 | Jones | |
| 5,584,485 | A | | 12/1996 | Jones et al. | |
| 5,584,763 | A | | 12/1996 | Kelly et al. | |
| 5,597,162 | A | | 1/1997 | Franklin | |
| 5,611,730 | A | | 3/1997 | Weiss | |
| 5,615,888 | A | | 4/1997 | Lofink et al. | |
| 5,626,341 | A | | 5/1997 | Jones et al. | |
| 5,632,485 | A | | 5/1997 | Woodland et al. | |
| 5,636,842 | A | | 6/1997 | Cabot et al. | |
| 5,639,088 | A | | 6/1997 | Schneider et al. | |
| 5,639,089 | A | | 6/1997 | Matsumoto et al. | |
| 5,641,730 | A | | 6/1997 | Brown | |
| 5,645,486 | A | | 7/1997 | Nagao et al. | |
| 5,649,705 | A | | 7/1997 | String | |
| 5,651,548 | A | | 7/1997 | French et al. | |
| 5,660,391 | A | | 8/1997 | Klasee | |
| 5,660,393 | A | | 8/1997 | Dreger | |
| 5,664,781 | A | * | 9/1997 | Feola | 273/292 |
| 5,673,917 | A | | 10/1997 | Vancura | |
| 5,678,821 | A | | 10/1997 | Hedman | |
| 5,685,774 | A | | 11/1997 | Webb | |
| 5,718,430 | A | | 2/1998 | Aramapakul et al. | |
| 5,720,483 | A | | 2/1998 | Trinh | |
| 5,735,742 | A | | 4/1998 | French | |
| 5,743,523 | A | | 4/1998 | Kelly et al. | |
| 5,755,619 | A | | 5/1998 | Matsumoto et al. | |
| 5,769,716 | A | | 6/1998 | Saffari et al. | |
| 5,772,506 | A | | 6/1998 | Marks et al. | |
| 5,781,647 | A | | 7/1998 | Fishbine et al. | |
| 5,788,573 | A | | 8/1998 | Baerlocher et al. | |
| 5,788,574 | A | | 8/1998 | Ornstein et al. | |
| 5,794,964 | A | | 8/1998 | Jones et al. | |
| 5,795,225 | A | | 8/1998 | Jones et al. | |
| 5,806,846 | A | * | 9/1998 | Lofink et al. | 273/292 |
| 5,816,575 | A | | 10/1998 | Keller | |
| 5,820,128 | A | | 10/1998 | Brunelle | |
| 5,823,873 | A | | 10/1998 | Moody | |
| 5,823,874 | A | | 10/1998 | Adams | |
| 5,830,063 | A | | 11/1998 | Byrne | |
| 5,833,536 | A | | 11/1998 | Davids et al. | |
| 5,833,537 | A | | 11/1998 | Barrie | |
| 5,839,730 | A | | 11/1998 | Pike | |
| 5,845,906 | A | | 12/1998 | Wirth | |
| 5,848,932 | A | | 12/1998 | Adams | |
| 5,851,011 | A | * | 12/1998 | Lott | 273/292 |
| 5,851,148 | A | | 12/1998 | Brune et al. | |
| 5,855,515 | A | | 1/1999 | Pease et al. | |
| 5,857,678 | A | | 1/1999 | Coleman et al. | |
| 5,863,041 | A | | 1/1999 | Boylan et al. | |
| 5,873,781 | A | | 2/1999 | Keane | |
| 5,882,261 | A | | 3/1999 | Adams | |
| 5,890,962 | A | | 4/1999 | Takemoto | |
| 5,893,718 | A | | 4/1999 | O'Donnell | |
| 5,901,958 | A | * | 5/1999 | Andrews | 273/292 |
| 5,911,418 | A | | 6/1999 | Adams | |
| 5,911,419 | A | | 6/1999 | Delaney et al. | |
| 5,927,714 | A | | 7/1999 | Kaplan | |
| 5,934,675 | A | * | 8/1999 | Handelman et al. | 273/292 |
| 5,935,002 | A | | 8/1999 | Falciglia | |
| 5,941,769 | A | | 8/1999 | Order | |
| 5,947,820 | A | | 9/1999 | Morro et al. | |
| 5,947,822 | A | | 9/1999 | Weiss | |
| 5,951,397 | A | | 9/1999 | Dickinson | |
| 5,957,776 | A | | 9/1999 | Hoehne | |
| 5,967,894 | A | | 10/1999 | Kinoshita et al. | |
| 5,976,016 | A | | 11/1999 | Moody et al. | |
| 5,980,384 | A | | 11/1999 | Barrie | |
| 5,984,310 | A | * | 11/1999 | English | 273/292 |
| 5,997,401 | A | | 12/1999 | Crawford | |
| 6,007,066 | A | | 12/1999 | Moody | |
| 6,007,424 | A | | 12/1999 | Evers et al. | |
| 6,012,719 | A | | 1/2000 | Webb | |
| 6,015,346 | A | | 1/2000 | Bennett | |
| 6,019,369 | A | | 2/2000 | Nakagawa et al. | |
| 6,019,374 | A | | 2/2000 | Breeding | |
| 6,039,650 | A | | 3/2000 | Hill | |
| 6,047,963 | A | | 4/2000 | Pierce et al. | |
| 6,050,895 | A | | 4/2000 | Luciano, Jr. et al. | |
| 6,056,641 | A | | 5/2000 | Webb | |
| 6,056,642 | A | | 5/2000 | Bennett | |
| 6,059,289 | A | | 5/2000 | Vancura | |
| 6,059,658 | A | | 5/2000 | Mangano et al. | |
| 6,062,979 | A | | 5/2000 | Inoue | |
| 6,062,981 | A | | 5/2000 | Luciano, Jr. | |
| 6,089,976 | A | | 7/2000 | Schneider et al. | |
| 6,089,978 | A | | 7/2000 | Adams | |
| 6,093,102 | A | | 7/2000 | Bennett | |
| 6,095,525 | A | | 8/2000 | Terminel | |
| 6,102,798 | A | | 8/2000 | Bennett | |
| 6,110,039 | A | | 8/2000 | Oh | |
| 6,110,041 | A | | 8/2000 | Walker et al. | |
| 6,110,043 | A | | 8/2000 | Olsen | |
| 6,120,031 | A | | 9/2000 | Adams | |
| 6,120,377 | A | | 9/2000 | McGinnis, Sr. et al. | |
| 6,126,541 | A | | 10/2000 | Fuchs | |
| 6,126,542 | A | | 10/2000 | Fier | |
| 6,126,547 | A | | 10/2000 | Ishimoto | |
| 6,131,908 | A | | 10/2000 | Palmer | |
| 6,135,884 | A | | 10/2000 | Hedrick et al. | |
| 6,135,885 | A | | 10/2000 | Lermusiaux | |

| | | | |
|---|---|---|---|
| 6,139,013 A | 10/2000 | Pierce et al. | |
| 6,142,873 A | 11/2000 | Weiss et al. | |
| 6,142,874 A | 11/2000 | Kodachi et al. | |
| 6,146,273 A | 11/2000 | Olsen | |
| 6,155,925 A | 12/2000 | Giobbi et al. | |
| 6,159,095 A | 12/2000 | Frohm et al. | |
| 6,159,096 A | 12/2000 | Yoseloff | |
| 6,159,097 A | 12/2000 | Gura | |
| 6,159,098 A | 12/2000 | Slomiany et al. | |
| 6,165,069 A | 12/2000 | Sines et al. | |
| 6,165,070 A | 12/2000 | Nolte et al. | |
| 6,174,233 B1 | 1/2001 | Sunaga et al. | |
| 6,174,235 B1 | 1/2001 | Walker et al. | |
| 6,176,781 B1 | 1/2001 | Walker et al. | |
| 6,179,291 B1 | 1/2001 | Vancura | |
| 6,179,711 B1 | 1/2001 | Yoseloff | |
| 6,186,894 B1 | 2/2001 | Mayeroff | |
| 6,189,888 B1 | 2/2001 | Brunelle | |
| 6,190,255 B1 | 2/2001 | Thomas et al. | |
| 6,203,010 B1 | 3/2001 | Jorasch et al. | |
| 6,206,373 B1 * | 3/2001 | Garrod | 273/292 |
| 6,210,279 B1 | 4/2001 | Dickinson | |
| 6,220,593 B1 | 4/2001 | Pierce et al. | |
| 6,220,961 B1 | 4/2001 | Keane et al. | |
| 6,224,482 B1 | 5/2001 | Bennett | |
| 6,224,483 B1 | 5/2001 | Mayeroff | |
| 6,224,484 B1 | 5/2001 | Okuda et al. | |
| 6,227,969 B1 | 5/2001 | Yoseloff | |
| 6,231,442 B1 | 5/2001 | Mayeroff | |
| 6,231,445 B1 | 5/2001 | Acres | |
| 6,234,897 B1 | 5/2001 | Frohm et al. | |
| 6,237,917 B1 | 5/2001 | Timpano | |
| 6,238,288 B1 | 5/2001 | Walker et al. | |
| 6,261,177 B1 | 7/2001 | Bennett | |
| 6,267,669 B1 | 7/2001 | Luciano, Jr. et al. | |
| 6,270,409 B1 | 8/2001 | Shuster | |
| 6,270,412 B1 | 8/2001 | Crawford et al. | |
| 6,293,866 B1 | 9/2001 | Walker et al. | |
| 6,299,536 B1 | 10/2001 | Hill | |
| 6,305,686 B1 | 10/2001 | Perrie et al. | |
| 6,309,298 B1 | 10/2001 | Gerow | |
| 6,309,299 B1 | 10/2001 | Weiss | |
| 6,312,330 B1 | 11/2001 | Jones et al. | |
| 6,312,334 B1 | 11/2001 | Yoseloff | |
| 6,313,871 B1 | 11/2001 | Schubert | |
| 6,334,814 B1 | 1/2002 | Adams | |
| 6,336,859 B2 | 1/2002 | Jones et al. | |
| 6,336,862 B1 | 1/2002 | Byrne | |
| 6,345,824 B1 | 2/2002 | Selitzky | |
| 6,346,044 B1 * | 2/2002 | McCrea, Jr. | 463/27 |
| 6,347,996 B1 | 2/2002 | Gilmore et al. | |
| 6,358,147 B1 | 3/2002 | Jaffe | |
| 6,371,867 B1 | 4/2002 | Webb | |
| 6,375,189 B1 | 4/2002 | Jones | |
| 6,386,977 B1 | 5/2002 | Hole | |
| 6,398,644 B1 | 6/2002 | Perrie et al. | |
| 6,402,147 B1 | 6/2002 | Lo | |
| 6,402,150 B1 | 6/2002 | Jones | |
| 6,416,409 B1 | 7/2002 | Jordan | |
| 6,419,583 B1 | 7/2002 | Crumby et al. | |
| 6,425,823 B1 | 7/2002 | Byrne | |
| 6,428,412 B1 | 8/2002 | Anderson et al. | |
| 6,435,511 B1 | 8/2002 | Vancura et al. | |
| 6,443,837 B1 | 9/2002 | Jaffe et al. | |
| 6,454,266 B1 | 9/2002 | Breeding et al. | |
| 6,454,651 B1 | 9/2002 | Yoseloff | |
| 6,460,848 B1 | 10/2002 | Soltys et al. | |
| 6,461,240 B1 | 10/2002 | Perkins | |
| 6,461,241 B1 | 10/2002 | Webb et al. | |
| 6,464,582 B1 | 10/2002 | Baerlocher et al. | |
| 6,471,591 B1 | 10/2002 | Crumby | |
| 6,474,646 B1 | 11/2002 | Webb | |
| 6,475,088 B1 | 11/2002 | Jones et al. | |
| 6,481,713 B2 | 11/2002 | Perrie et al. | |
| 6,482,089 B2 | 11/2002 | Demar et al. | |
| 6,485,368 B2 | 11/2002 | Jones et al. | |
| 6,491,302 B1 | 12/2002 | Boylan et al. | |
| 6,503,145 B1 | 1/2003 | Webb | |
| 6,511,068 B1 | 1/2003 | Sklansky et al. | |
| 6,514,140 B1 | 2/2003 | Storch | |
| 6,517,073 B1 | 2/2003 | Vancura | |
| 6,517,435 B2 | 2/2003 | Soltys et al. | |
| 6,523,831 B2 | 2/2003 | Webb | |
| 6,530,837 B2 | 3/2003 | Soltys et al. | |
| 6,532,291 B1 | 3/2003 | McGrath | |
| 6,533,276 B2 | 3/2003 | Soltys et al. | |
| 6,533,658 B1 | 3/2003 | Walker et al. | |
| 6,533,662 B2 | 3/2003 | Soltys et al. | |
| 6,536,768 B2 | 3/2003 | Caputo | |
| 6,537,150 B1 | 3/2003 | Luciano et al. | |
| 6,547,242 B1 | 4/2003 | Sugiyama et al. | |
| 6,553,276 B2 | 4/2003 | Akram et al. | |
| 6,561,897 B1 | 5/2003 | Bourbour et al. | |
| 6,569,015 B1 | 5/2003 | Baerlocher et al. | |
| 6,572,471 B1 | 6/2003 | Bennett | |
| 6,579,180 B2 | 6/2003 | Soltys et al. | |
| 6,607,195 B2 | 8/2003 | Vancura | |
| 6,609,711 B1 | 8/2003 | Campbell | |
| 6,645,073 B2 | 11/2003 | Lemay et al. | |
| 6,648,759 B2 | 11/2003 | Vancura | |
| 6,652,378 B2 | 11/2003 | Cannon et al. | |
| 6,656,040 B1 | 12/2003 | Brosnan et al. | |
| 6,656,047 B1 | 12/2003 | Tarantino et al. | |
| 6,659,461 B2 | 12/2003 | Yoseloff et al. | |
| 6,672,975 B1 | 1/2004 | Galloway | |
| 6,682,419 B2 | 1/2004 | Webb et al. | |
| 6,682,420 B2 | 1/2004 | Webb et al. | |
| 6,692,003 B2 | 2/2004 | Potter et al. | |
| 6,692,355 B2 | 2/2004 | Baerlocher et al. | |
| 6,702,289 B1 | 3/2004 | Feola | |
| 6,726,427 B2 * | 4/2004 | Jarvis et al. | 273/292 |
| 6,726,565 B2 | 4/2004 | Hughs-Baird | |
| 6,729,620 B2 | 5/2004 | Jones | |
| 6,733,389 B2 | 5/2004 | Webb et al. | |
| 6,749,200 B2 | 6/2004 | Yurkins | |
| 6,758,751 B2 | 7/2004 | Soltys et al. | |
| 6,772,975 B2 | 8/2004 | Sommerfeld et al. | |
| 6,776,415 B2 | 8/2004 | Robinson et al. | |
| 6,789,800 B2 | 9/2004 | Webb | |
| 6,802,773 B2 | 10/2004 | Moody | |
| 6,808,173 B2 | 10/2004 | Snow | |
| 6,811,153 B1 | 11/2004 | Ko | |
| 6,827,348 B1 | 12/2004 | Mitchell | |
| 6,840,517 B2 * | 1/2005 | Snow et al. | 273/292 |
| 6,845,981 B1 | 1/2005 | Ko | |
| 6,848,994 B1 | 2/2005 | Knust et al. | |
| 6,857,958 B2 | 2/2005 | Osawa | |
| 6,869,074 B2 | 3/2005 | Miller | |
| 6,869,075 B1 * | 3/2005 | Stavinsky | 273/292 |
| 6,874,786 B2 | 4/2005 | Bruno et al. | |
| 6,877,748 B1 * | 4/2005 | Patroni et al. | 273/292 |
| 6,878,064 B2 | 4/2005 | Huang | |
| 6,884,168 B2 | 4/2005 | Wood et al. | |
| 6,896,265 B1 | 5/2005 | Schlumbrecht | |
| 6,896,620 B1 | 5/2005 | Luciano et al. | |
| 6,902,167 B2 | 6/2005 | Webb | |
| 6,923,446 B2 | 8/2005 | Snow | |
| 6,938,900 B2 | 9/2005 | Snow | |
| 6,955,599 B2 | 10/2005 | Bourbour et al. | |
| 6,959,928 B2 | 11/2005 | Schultz | |
| 6,986,514 B2 * | 1/2006 | Snow | 273/292 |
| 7,011,309 B2 | 3/2006 | Soltys et al. | |
| 7,017,805 B2 | 3/2006 | Meehan | |
| 7,018,291 B1 | 3/2006 | Lemke et al. | |
| 7,029,395 B1 | 4/2006 | Baerlocher | |
| 7,044,468 B2 * | 5/2006 | Sklansky et al. | 273/292 |
| 7,114,718 B2 | 10/2006 | Grauzer et al. | |
| 7,137,630 B2 | 11/2006 | Yurkins | |
| 7,165,770 B2 | 1/2007 | Snow | |
| 7,195,244 B1 | 3/2007 | Feola | |
| 7,201,375 B2 * | 4/2007 | Adam et al. | 273/292 |
| 7,222,855 B2 * | 5/2007 | Sorge | 273/292 |
| 7,246,799 B2 | 7/2007 | Snow | |
| 7,329,179 B2 | 2/2008 | Baerlocher | |
| 7,351,146 B2 | 4/2008 | Kaminkow | |
| 7,374,486 B2 | 5/2008 | Baerlocher | |
| 2001/0000933 A1 | 5/2001 | Koelling | |
| 2001/0035610 A1 | 11/2001 | Webb | |

| | | | | |
|---|---|---|---|---|
| 2001/0054796 | A1 | 12/2001 | Lo | |
| 2002/0028710 | A1 | 3/2002 | Ishihara et al. | |
| 2002/0034974 | A1 | 3/2002 | Wood et al. | |
| 2002/0042298 | A1 | 4/2002 | Soltys et al. | |
| 2002/0042299 | A1 | 4/2002 | Soltys et al. | |
| 2002/0045472 | A1 | 4/2002 | Adams | |
| 2002/0068625 | A1 | 6/2002 | Soltys et al. | |
| 2002/0072405 | A1 | 6/2002 | Soltys et al. | |
| 2002/0072407 | A1 | 6/2002 | Soltys et al. | |
| 2002/0094855 | A1 | 7/2002 | Berman | |
| 2002/0177480 | A1 | 11/2002 | Rowe | |
| 2002/0198036 | A1 | 12/2002 | Baerlocher et al. | |
| 2003/0006555 | A1 | 1/2003 | Boylan et al. | |
| 2003/0057648 | A1 | 3/2003 | Webb | |
| 2003/0064772 | A1 | 4/2003 | Tempest et al. | |
| 2003/0064785 | A1 | 4/2003 | Stone et al. | |
| 2003/0069064 | A1 | 4/2003 | Ainsworth | |
| 2003/0071418 | A1 | 4/2003 | Saucier | |
| 2003/0075869 | A1 | 4/2003 | Breeding et al. | |
| 2003/0087696 | A1 | 5/2003 | Soltys et al. | |
| 2003/0114209 | A1 | 6/2003 | Ritner et al. | |
| 2003/0144053 | A1 | 7/2003 | Michaelson | |
| 2003/0151194 | A1 | 8/2003 | Hessing et al. | |
| 2003/0171142 | A1 | 9/2003 | Kaji et al. | |
| 2003/0181231 | A1 | 9/2003 | Vancura et al. | |
| 2003/0207709 | A1 | 11/2003 | Paotrakul | |
| 2003/0207710 | A1 | 11/2003 | Rodgers et al. | |
| 2003/0211884 | A1 | 11/2003 | Gauselmann | |
| 2003/0236116 | A1 | 12/2003 | Marks et al. | |
| 2004/0029631 | A1 | 2/2004 | Duhamel | |
| 2004/0053673 | A1 | 3/2004 | Mishra | |
| 2004/0053683 | A1 | 3/2004 | Hartl et al. | |
| 2004/0063492 | A1 | 4/2004 | Baerlocher et al. | |
| 2004/0070146 | A1 | 4/2004 | Snow | |
| 2004/0072619 | A1 | 4/2004 | Brosnan et al. | |
| 2004/0152509 | A1 | 8/2004 | Hornik et al. | |
| 2004/0164491 | A1 | 8/2004 | Webb | |
| 2004/0183256 | A1 | 9/2004 | Ko | |
| 2004/0195770 | A1 | 10/2004 | Ornstein | |
| 2004/0204218 | A1 | 10/2004 | Hughs-Baird | |
| 2004/0224777 | A1 | 11/2004 | Smith et al. | |
| 2004/0251630 | A1 | 12/2004 | Sines et al. | |
| 2005/0012273 | A1 | 1/2005 | Bruno et al. | |
| 2005/0026680 | A1 | 2/2005 | Gururajan | |
| 2005/0026683 | A1 | 2/2005 | Fujimoto | |
| 2005/0029743 | A1 | 2/2005 | Daines | |
| 2005/0040599 | A1 | 2/2005 | Snow | |
| 2005/0051963 | A1 | 3/2005 | Snow | |
| 2005/0054408 | A1 | 3/2005 | Steil et al. | |
| 2005/0054429 | A1 | 3/2005 | Baerlocher et al. | |
| 2005/0059461 | A1 | 3/2005 | Ching et al. | |
| 2005/0060050 | A1 | 3/2005 | Baerlocher | |
| 2005/0073100 | A1 | 4/2005 | Falciglia, Sr. | |
| 2005/0073102 | A1 | 4/2005 | Yoseloff et al. | |
| 2005/0082758 | A1 | 4/2005 | Sklansky et al. | |
| 2005/0107148 | A1 | 5/2005 | Webb | |
| 2005/0116414 | A1 | 6/2005 | Yurkins | |
| 2005/0119047 | A1 | 6/2005 | Olive | |
| 2005/0119048 | A1 | 6/2005 | Soltys et al. | |
| 2005/0127606 | A1 | 6/2005 | Snow et al. | |
| 2005/0143168 | A1 | 6/2005 | Torango | |
| 2005/0161882 | A1 | 7/2005 | Miller | |
| 2005/0164760 | A1 | 7/2005 | Moody | |
| 2005/0170875 | A1 | 8/2005 | Snow | |
| 2005/0176488 | A1 | 8/2005 | Olive | |
| 2005/0209004 | A1 | 9/2005 | Torango | |
| 2005/0239542 | A1 | 10/2005 | Olsen | |
| 2005/0269776 | A1 | 12/2005 | Miller | |
| 2005/0282622 | A1 | 12/2005 | Lindquist | |
| 2005/0282625 | A1 | 12/2005 | Nicely | |
| 2006/0001211 | A1 | 1/2006 | Lewis et al. | |
| 2006/0019739 | A1 | 1/2006 | Soltys et al. | |
| 2006/0027970 | A1 | 2/2006 | Kyrychenko | |
| 2006/0058082 | A1 | 3/2006 | Crawford, III et al. | |
| 2006/0058083 | A1 | 3/2006 | Crawford, III et al. | |
| 2006/0058084 | A1 | 3/2006 | Crawford, III et al. | |
| 2006/0058085 | A1 | 3/2006 | White et al. | |
| 2006/0058086 | A1 | 3/2006 | White et al. | |
| 2006/0058087 | A1 | 3/2006 | White et al. | |
| 2006/0058088 | A1 | 3/2006 | Crawford, III et al. | |
| 2006/0058089 | A1 | 3/2006 | White et al. | |
| 2006/0058090 | A1 | 3/2006 | Crawford, III et al. | |
| 2006/0058091 | A1 | 3/2006 | Crawford, III et al. | |
| 2006/0058092 | A1 | 3/2006 | Crawford, III et al. | |
| 2006/0058093 | A1 | 3/2006 | White et al. | |
| 2006/0066052 | A1 | 3/2006 | White et al. | |
| 2006/0068498 | A1 | 3/2006 | White et al. | |
| 2006/0068864 | A1 | 3/2006 | White et al. | |
| 2006/0068865 | A1 | 3/2006 | White et al. | |
| 2006/0068866 | A1 | 3/2006 | White et al. | |
| 2006/0068868 | A1 | 3/2006 | Crawford, III et al. | |
| 2006/0068869 | A1 | 3/2006 | White et al. | |
| 2006/0068870 | A1 | 3/2006 | Crawford, III et al. | |
| 2006/0068871 | A1 | 3/2006 | Crawford, III et al. | |
| 2006/0068879 | A1 | 3/2006 | Crawford, III et al. | |
| 2006/0068899 | A1 | 3/2006 | White et al. | |
| 2006/0084505 | A1 | 4/2006 | Yoseloff et al. | |
| 2006/0084506 | A1 | 4/2006 | Yoseloff et al. | |
| 2006/0128455 | A1 | 6/2006 | Bourbour et al. | |
| 2006/0128457 | A1 | 6/2006 | Cannon | |
| 2006/0131810 | A1 | 6/2006 | Nicely | |
| 2006/0160600 | A1 | 7/2006 | Hill et al. | |
| 2006/0160608 | A1 | 7/2006 | Hill et al. | |
| 2006/0165254 | A1 | 7/2006 | Fujimoto et al. | |
| 2006/0177109 | A1 | 8/2006 | Storch | |
| 2006/0186598 | A1 | 8/2006 | Coussa | |
| 2006/0202422 | A1 | 9/2006 | Bahar | |
| 2006/0217167 | A1 | 9/2006 | Jubinville et al. | |
| 2006/0223605 | A1 | 10/2006 | Pullman | |
| 2006/0223638 | A1 | 10/2006 | Koyoma et al. | |
| 2006/0252521 | A1 | 11/2006 | Gururajan et al. | |
| 2006/0252554 | A1 | 11/2006 | Gururajan et al. | |
| 2006/0258427 | A1 | 11/2006 | Rowe et al. | |
| 2006/0258442 | A1 | 11/2006 | Ryan | |
| 2006/0264252 | A1 | 11/2006 | White et al. | |
| 2006/0267285 | A1 | 11/2006 | Webb et al. | |
| 2006/0281513 | A1 | 12/2006 | Kirkpatrick | |
| 2006/0284376 | A1 * | 12/2006 | Snow | 273/292 |
| 2006/0284378 | A1 * | 12/2006 | Snow et al. | 273/292 |
| 2006/0287066 | A1 | 12/2006 | Crawford, III et al. | |
| 2006/0287067 | A1 | 12/2006 | White et al. | |
| 2006/0287101 | A1 | 12/2006 | Crawford, III et al. | |
| 2006/0287102 | A1 | 12/2006 | White et al. | |
| 2006/0287103 | A1 | 12/2006 | Crawford, III et al. | |
| 2006/0287104 | A1 | 12/2006 | White et al. | |
| 2006/0293099 | A1 | 12/2006 | Cooper | |
| 2007/0054726 | A1 | 3/2007 | Muir et al. | |
| 2007/0075494 | A1 | 4/2007 | Abbott | |
| 2007/0090600 | A1 | 4/2007 | Adam et al. | |
| 2007/0205559 | A1 | 9/2007 | Webb et al. | |
| 2008/0102934 | A1 | 5/2008 | Tan | |
| 2008/0108406 | A1 | 5/2008 | Oberberger | |
| 2008/0108425 | A1 | 5/2008 | Oberberger | |

FOREIGN PATENT DOCUMENTS

| | | | |
|---|---|---|---|
| EP | 0 874 337 | | 10/1998 |
| EP | 0 945 837 | | 9/1999 |
| EP | 0 984 408 | | 3/2000 |
| EP | 0 984 409 | | 3/2000 |
| EP | 1 469 432 | | 4/2004 |
| EP | 1 532 594 | | 11/2006 |
| GB | 2 096 376 | A | 10/1982 |
| GB | 2 097 160 | A | 10/1982 |
| GB | 2 100 905 | A | 1/1983 |
| GB | 2 117 952 | | 10/1983 |
| GB | 2 137 392 | A | 10/1984 |
| GB | 2 142 457 | A | 1/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 191 030 | | 12/1987 |
| GB | 2 222 712 | A | 3/1990 |
| GB | 2 226 907 | A | 7/1990 |
| GB | 2 408 951 | | 6/2005 |

| | | | |
|---|---|---|---|
| WO | WO 98/47115 | | 10/1998 |
| WO | WO 98/51384 | | 11/1998 |
| WO | WO 00/12186 | | 3/2000 |
| WO | WO 2004/021294 | | 3/2004 |
| WO | WO 2004/112923 | | 12/2004 |
| WO | WO 2005/009563 | | 2/2005 |
| WO | WO 2005/025696 | | 3/2005 |
| WO | WO 2005/025701 | | 3/2005 |
| WO | WO 2005/037385 | | 4/2005 |
| WO | WO 2005/043475 | | 5/2005 |
| WO | WO 2005/081958 | | 9/2005 |
| WO | WO 2005/083599 | A1 | 9/2005 |
| WO | WO 2005/099425 | A2 | 10/2005 |
| WO | WO 2005/123203 | | 12/2005 |
| WO | WO 2006/041655 | | 4/2006 |
| WO | WO 2006/106192 | | 10/2006 |
| WO | WO 2006/127128 | | 11/2006 |

* cited by examiner

GAMING SYSTEM, GAMING DEVICE, AND METHOD PROVIDING MULTIPLE HAND CARD GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player gets five cards dealt face-up from a 52 card deck of playing cards. The player can discard none, one, a plurality or all of the five cards. Each discarded card is replaced with another card from the deck. After the replacement, the cards are evaluated for winning combinations. For a five card poker game, there are ten general categories of hands, ranked from highest to lowest, as shown in Table 1 below.

TABLE 1

Ranking of Five Card Poker Hands by Category

| Rank | Name | Example |
|---|---|---|
| 1 | Royal Flush | A♣ K♣ Q♣ J♣ 10♣ |
| 2 | Straight Flush | K♣ Q♣ J♣ 10♣ 9♣ |
| 3 | Four of a Kind | J♣ J♥ J♦ J♠ 3♣ |
| 4 | Full House | A♥ A♦ A♣ 6♦ 6♣ |
| 5 | Flush | A♣ J♣ 8♣ 6♣ 2♣ |
| 6 | Straight | 8♦ 7♣ 6♠ 5♠ 4♣ |
| 7 | Three of a Kind | Q♠ Q♥ Q♦ 6♦ 2♠ |
| 8 | Two Pair | 8♦ 8♥ 5♥ 5♣ 2♠ |
| 9 | One Pair | K♦ K♠ 8♣ 7♣ 2♥ |
| 10 | No Pair | A♥ 10♣ 7♦ 5♠ 3♠ |

Within each category, hands are ranked according to the rank of individual cards, with an Ace being the highest card and a two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of straight flush, four of a kind, or flush. There are over a hundred equivalent hands for each two pair variation, and there are over 1,000 equivalent hands for each type of no-pair hand.

Numerous variations of poker exist, including Five Card Draw as mentioned above, Three Card Poker, Five Card Stud, Seven Card Stud, Hold'em (also called Texas Hold'em), Omaha (also called Omaha Hold'em), and Pai-Gow Poker. The variations in these games generally differ in the manner in which cards are dealt and in the manner and frequency in which bets are placed. Various criteria may also be used to determine the winning hand, including highest ranking hand, lowest ranking hand (Low-Ball), and where the high and low hands each win half of the pot (High-Low).

In certain known multiplayer variations of poker, the players play against each other rather than against a dealer or house. In certain of these variations, a round of play begins when each player has placed an initial bet, called the ante, into the pot. The term pot refers to the total accumulation of antes and wagers made during a particular game. However, in other poker variations, such as Texas Hold'em described in further detail below, only two players at a table make the initial bets, commonly referred to as the blinds.

The number of cards dealt depends on the particular variation of poker being played. For example, in Five Card Draw, each player is initially dealt five cards. In typical Three Card Poker games where the player plays against a dealer hand, the player is dealt a total of three cards and the dealer hand includes a total of three cards as well. In certain known Three Card Poker games, the initially dealt player hand and dealer hand are final and there is no option to replace or draw any new cards. In Texas Hold'em, Five Card Stud and Seven Card Stud, each player is initially dealt two-cards. These cards are typically dealt face-down. However, depending on the game, some of the cards may be dealt face-up to the player. For example, in Five Card Stud, each player is initially dealt one card face-up and one card face-down. In Texas Hold'em, each player is initially dealt two-cards face-down which are commonly referred to as the hole cards.

For certain poker variations where additional cards are dealt or where cards may be replaced, after the initial deal, a first round of wagering begins, where the players have the opportunity to place wagers. If a player places a wager, that wager must be matched (i.e., called) or raised by each player that wants to remain in the game. A raise includes matching the previous wager and increasing the total bet. A player who does not match a bet drops out of the game or folds. A round of betting ends when either every player but one has folded, or when the highest bet or raise has been called by each remaining player such that each remaining player has wagered the same amount into the pot during the round.

In other known multiplayer variations of poker, the players play against a dealer or a casino rather than against each other. Some of these variations include Caribbean Stud Poker and Three Card Poker. In one variation of Caribbean Stud Poker the player places an ante wager the dealer deals a five card player hand and a five card dealer hand. One of the cards in the dealer hand is revealed to the player. After this card is revealed and the player has viewed his/her cards, the player must either make a call bet by increasing the player's stake by an amount equal to twice the original ante, or folding, in which case the player forfeits the ante. All of the cards in the dealer hand are revealed and if the dealer hand does not have and A-K or higher, the player's call bet is returned, plus an amount equal to the original ante. If the dealer hand is a A-K or better, and the player hand has a higher rank than the dealer hand, the dealer pays out even money on the ante and fixed odds on the call bet according to a pay table. This is an example of a variation of a poker game played against the casino where, in order to continue the game, the player must increase the original wager. That is, the player must either fold a smaller initial wager or increase their stake in the game. Other player versus casino poker games have features that do not allow additional wagering after the initial wager, and other game variations include one or more optionally wagering opportunities.

Of the poker variations mentioned above, Texas Hold'em is one of the more popular versions. Texas Hold'em is generally a multi-player card game played at a live card table or via a computer-based virtual card table. In one version of a live card table game of Texas Hold'em, only two players at a table make the initial bets, commonly referred to as the blinds. These blinds include a large blind and a small blind, where the large blind is typically twice the value of the small blind. In a blind based game such as Texas Hold'em, all players are initially eligible to receive a hand, even if they did not place the large blind or the small blind. After the players have anted, each player eligible for play is dealt an initial set of cards. Each of the players must match the blinds, raise the blinds or fold. Texas Hold'em includes a designated number of community cards (i.e., usually five) that can be used by all of the players in combination with their hole cards. However, in certain variations, there may only be three community cards. In certain Texas Hold'em games, the community cards are dealt over the course of several wagering rounds. For example, the gaming device or dealer deals the flop (i.e., usually three cards), the turn (usually one card), and the river (usually one card). The winning hand is the resulting five card hand (of the combined seven cards) having the highest poker rank. This method of determining a winning five card hand is similar to determining a winning hand in Seven Card Stud. However, Seven Card Stud does not utilize community cards as in Texas Hold'em. In other variations of Texas Hold'em, where the number of community cards is only three, the flop is a single card rather than three cards.

Texas Hold'em generally requires two or more players. Certain computer-based versions of the game implement virtual players that use computer heuristics to attempt to allow the virtual players to behave like actual human players.

Certain gaming establishments have an interest in being able to leverage the interest in Texas Hold'em by offering variations of the game that can be played against the house or casino rather than against other players. This may appeal to players who are waiting to get a seat at a standard table, to those who do not believe they have the skill or bankroll to participate in a standard game, or to those players simply looking for an interesting new casino game.

Existing player versus casino games based on Texas Hold'em generally fall into a few different categories. One type of game has the player attempting to achieve a certain hand outcome relative to a pay table, with assorted betting options and/or requirements along the way. Another type of Texas Hold'em game is based on the outcome of the player's hand relative to that of the dealer's hand, with assorted betting options and/or requirements along the way. Some games offer both type of mechanisms, with the main game based on latter category and an optional side bet based on the former category.

However, Texas Hold'em is generally considered to be a game of skill, where skilled players tend to have a statistical and strategic advantage over lesser skilled players. For example, a skilled player is often able to discern visual clues or tells from their opponents that give them certain information about their opponents' hands. A skilled player may be able to calculate the odds of winning a particular hand or the odds of receiving one or more cards that would be required to win. If the skilled player can do both, they have a distinct advantage over a non-skilled player or a player with lesser skills. Accordingly, certain non-skilled players do not enjoy or may be reluctant to play Texas Hold'em against opponents who are highly skilled. Additionally, certain skilled players may seek out a game of poker with non-skilled players to gain an advantage.

A need therefore exists for new and exciting poker games, including a need for new Texas Hold'em poker games where player can play against a casino dealer or against a gaming machine.

SUMMARY

The gaming systems, gaming devices, and methods of the present disclosure provide various embodiments of single player card games where the player plays against the house, gaming establishment or casino. The gaming system can be embodied in a gaming table, an individual gaming machine or gaming console, or may be provided over a data network such as the internet.

In the various embodiments described below, a gaming system includes a single player poker game that includes one or more opportunities for selecting or forming player hands and dealer hands. In certain embodiments, the player is able to select one or more player hands from a plurality of dealt player hands. In these embodiments, the gaming system also selects one or more of the dealt dealer hands to compete against the player hands. In one such embodiment, the gaming system enables wagers to be initially placed on each of a plurality of player hands, and a play of the game includes one or more opportunities for a player to fold or cancel one of the player hands and withdraw the associated wager. The game also includes one or more opportunities for the gaming system to fold dealer hands. In one embodiment involving player selection of a player hand, the game includes dealing several initial player hands and enabling a player to select just one of the player hands to compete against one or more dealer hands. In one embodiment, a play of the game includes dealing a plurality of player cards and enabling a player to form multiple initial player hands from the dealt player cards. In this embodiment, the game also includes dealing a plurality of dealer cards and forming multiple dealer hands to compete against the formed player hands. In certain of these embodiments, a number of community cards are dealt and the highest ranking combined hand of the formed or selected player and dealer hands wins an award.

In one embodiment, the gaming system provides a card game where the player has one or more options to withdraw one or more portions of a previously placed wager during a play of the game. In one such embodiment, the gaming system enables a player to place a total wager amount that is divided into sub-wagers or portions of wagers that are allocated (in one embodiment equally) between a plurality of player hands. The gaming system deals the plurality of player hands and also deals a plurality of dealer hands. The gaming system also places wagers on each of the plurality of dealer hands. In one embodiment, these wagers are respectively equal to the sub-wager amounts discussed above. It should be appreciated that in other embodiments, the player may place separate wagers for each of the player hands, and the wagers placed on the dealer hands may be different than that of the player wagers.

After the player hands and dealer hands have been dealt, the gaming system provides one or more opportunities to fold one of the player hands and withdraw the sub-wager associated with the folded player hand. This allows a player that has a relatively poor ranking starting hand to reduce his/her potential losses. In certain embodiments, the gaming system optionally causes one of the dealer hands to be folded and withdraw the respective portions of gaming system's matched sub-wagers. Therefore, both the player and the gaming system have a similar option to fold a low ranking starting hand and withdraw a sub-wager. This folding process can be repeated one or more times after additional cards are dealt. The comparison of the remaining hands in a suitable manner determines the outcomes of the respective player hands.

In one example embodiment, each of the player hands and the dealer hands have two cards. In one such embodiment, the gaming system deals a number of community cards which may be combined with each of the remaining two-card player hands and two-card dealer hands, respectively, after folding by the player and dealer. After the community cards are dealt and the player has had an opportunity to re-evaluate their remaining two-card hands in combination with the community cards, the player can again optionally fold one of the remaining two-card player hands and withdraw the sub-wager associated with that folded hand. The gaming system can also cause one of the remaining dealer hands to be folded and withdraw a portion of gaming system's matched sub-wager associated with the folded dealer hand. This process of dealing community cards and enabling both the player and the gaming system to withdraw wagers and fold a remaining hand may be repeated one or more times based on the rules of the card game and the total number of player hands and dealer hands. However, in various embodiments, it should be understood that the player should not be able to fold all of their hands and thereby withdraw all of their sub-wagers.

In this example embodiment, after all of the community cards are dealt, the gaming system determines a final rank for each of the player hands and dealer hands. This final rank is based on the respective two-card player and dealer hands combined with the community cards. If one of the remaining player hands is ranked higher than all of the remaining dealer hands, the gaming system provides an award to the player based on the remaining wagers.

Payouts and awards may be structured in a number of different manners. In one embodiment, the award is the sum of: the sub-wagers associated with each of the remaining player hands; and the sub-wagers matched by the gaming system and associated with each of the remaining dealer hands. Therefore, if the gaming device withdraws one or more sub-wagers associated with the respective dealer hands, the potential award to the player will be smaller. It should be appreciated that other suitable award determination mechanisms can be employed in accordance with the present disclosure. It should also be appreciated that the community cards do not need to be employed in certain embodiments.

In another example embodiment with community cards, the gaming system provides a Texas Hold'em style poker game where the player has one or more options to withdraw a portion of a previously placed wager during a play of the game. In one such embodiment, the player plays multiple player hands against multiple dealer hands, as discussed above. In this embodiment, the player places three equal wagers on three different player hands. Three matching wagers must be placed by the gaming system respectively on three dealer hands. After the player hands and dealer hands have been dealt, the gaming system provides the player an opportunity to fold one of the player hands and withdraw the wager associated with the folded player hand. The gaming system can cause one of the dealer hands to be folded and withdraw the gaming system's wager associated with the folded dealer hand. Three community cards are dealt and the player and the gaming device again each have the option to withdraw a wager and discard a hand. Finally, two community cards are dealt for a total number of community cards equaling five. After all five of the community cards have been dealt, the gaming system evaluates the player hands and dealer hands to determine the best five card hand based on the respective initial two-card player or dealer hand and the five community cards. If one of the remaining player hands ranks higher than all of the remaining dealer hands, the player wins and the gaming device provides the player with an award, as discussed above or in another suitable manner.

In the embodiments discussed above, the player can strategically fold one or more starting hands, withdraw the associated wagers, and thus conserve potential losses. However, for each starting hand that the player folds, the total wager amount is reduced and the total number of hands that the player can use to try and beat the dealer hands diminishes. Therefore, if the player keeps all three of the player hands, the player has maximum credit exposure and the highest potential to beat all of the dealer hands. In one embodiment, the gaming system or house has a slight advantage because the cards in the player hands are dealt face-up (i.e., the gaming system can take the players cards into consideration when making its decision on folding hands). However, it should be appreciated that in other embodiments, the gaming system would make decisions to fold one or more of the dealer hands without knowledge of the cards in the player hands.

In one embodiment, several initial player hands are dealt, as discussed above. In this embodiment, a single wager is placed and the player must select one of the initially dealt player hands to play. The selected player hand competes against one or more dealer hands. In one example embodiment, the player selects the best hand out of three player hands and the selected player hand competes against two dealer hands. Therefore, in this embodiment, the player has a higher number of possible player hands to initially select from, but the single selected player hand must outrank a higher number of dealer hands.

In one embodiment, the game includes multiple player and dealer hands as discussed above. However, in this embodiment, the player is able to form the initial player hands by picking individual cards from a pool of available player cards. Likewise, the gaming device selects individual cards from a pool of available dealer cards to form a plurality of initial dealer hands. Once the initial player hands and dealer hands are formed, one or more community cards are dealt to determine the final combined player and dealer hands, as described above. In one embodiment, the pool of available cards to form the initial player hands is smaller than the pool of available cards to form the initial dealer hands. In this embodiment, the number of initially formed player hands is also less than the number of initially formed dealer hands. However, it should be appreciated that in other embodiments, the number of cards in the player card pool may be the same as or greater than the number of cards in the dealer card pool. Also, it should be appreciated that the number of initial player hands may be the same as or greater than the number of initial dealer hands. In certain embodiments, the gaming device is able to take into consideration the values of one or more of the cards in the player card pool or in the formed player hands when selecting the cards from the dealer card pool to form the dealer hands. However, it should be appreciated that in other embodiments, the player is able to take into consideration the values of one or more of the cards in the dealer card pool or in the formed dealer hands when selecting the cards from the player card pool to form the player hands. It should also be appreciated that in other embodiments, the gaming device and the player are not able to the view the cards of the gaming device and player, respectively, when forming the initial player and dealer hands.

Additional features and advantages are described herein, and will be apparent from, the following Detailed Description and the figures.

BRIEF DESCRIPTION OF THE FIGURES

FIG. 2B is a schematic diagram of the data network that one or more of the gaming devices of the present disclosure may be connected to.

DETAILED DESCRIPTION

Figure 1A:
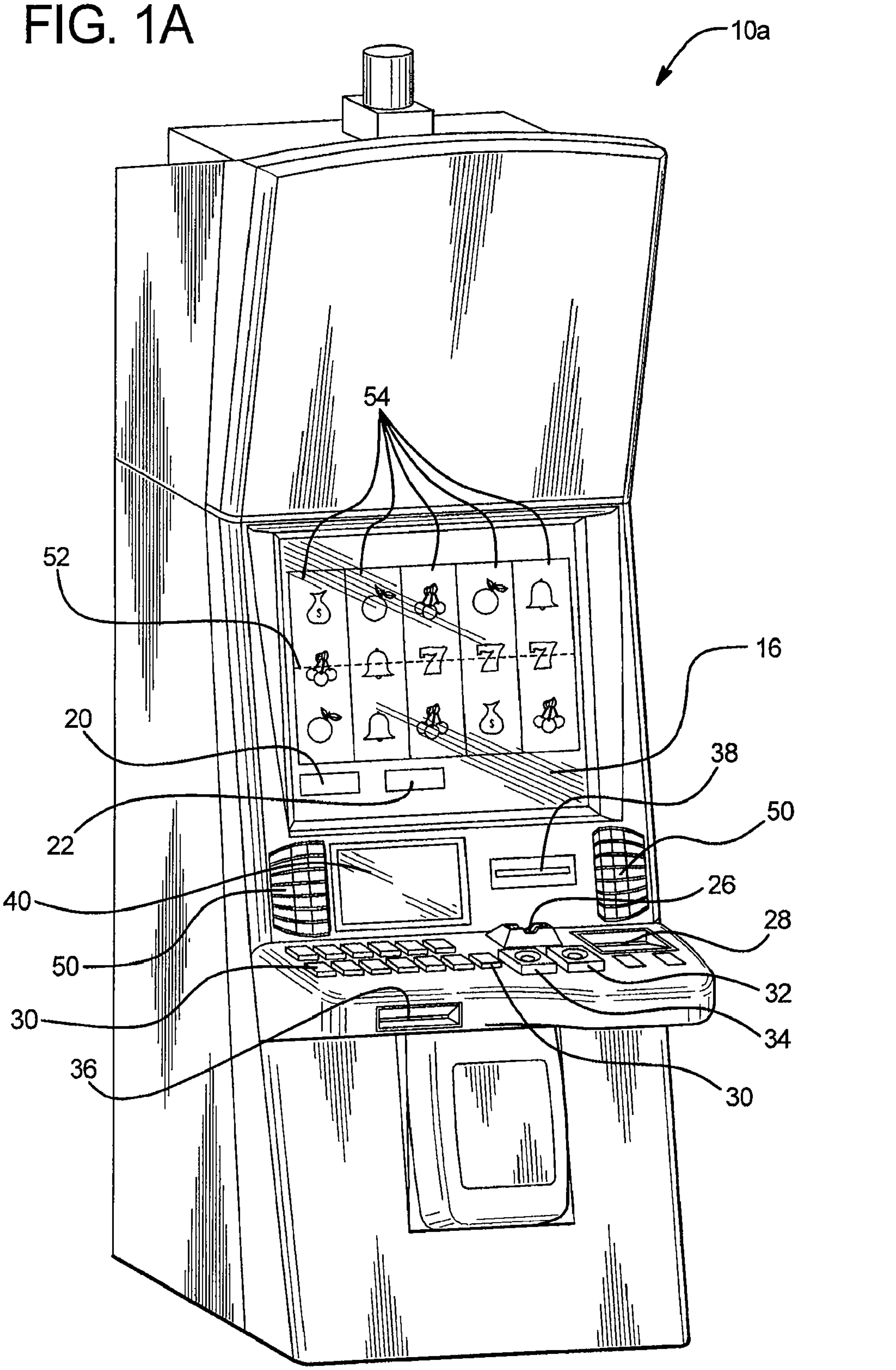
FIG. 1A is a front perspective view of one embodiment of the gaming system of the present disclosure.

The present disclosure may be implemented in various configurations for gaming machines or gaming devices, including but not limited to: (a) a casino table game, played on a physical table with physical cards dealt by a live dealer; (b) a casino table game, played on a physical table with physical cards dealt by a live dealer, with a computer that is able to determine card values and generate signals to the dealer to direct certain dealer actions; (c) a dedicated gaming machine or gaming device, wherein the computerized instructions for controlling any games (which are provided by the gaming machine or gaming device) are provided with the gaming machine or gaming device prior to delivery to a gaming establishment; and (d) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

In one embodiment, the game may be provided over a network such as the Internet. In another embodiment, the game may be provided for use on a personal digital assistant (PDA) or cellular telephone. In these embodiments, the player downloads the game to a local computing device or devices and is able to play the game in a separate location from the actual gaming establishment. In addition, in a multiplayer embodiment, several players can log on to a central server and play the game with several other players that are playing at different locations.

Figure 1B:
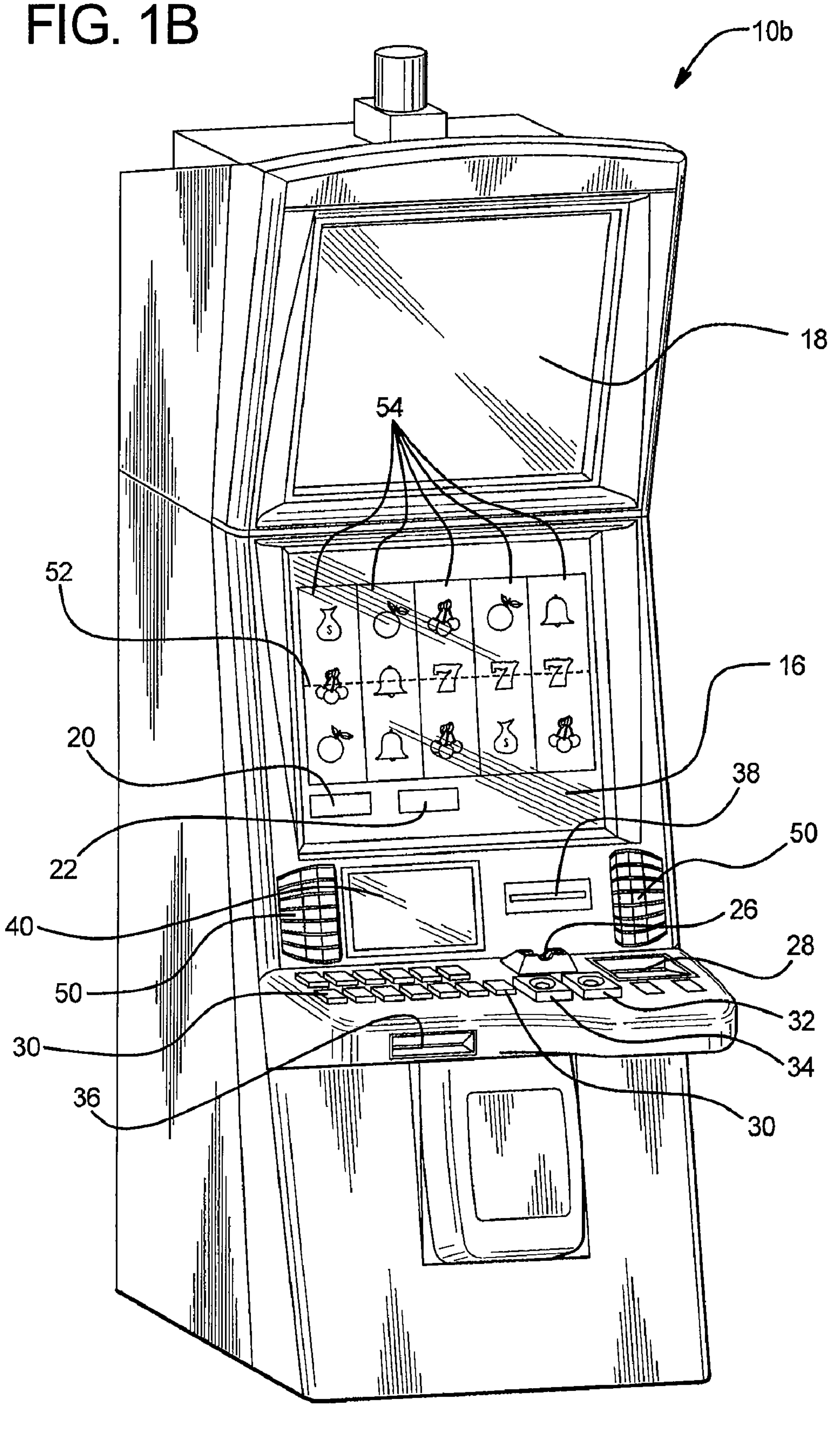
FIG. 1B is a front perspective view of one embodiment, of the gaming system of the present disclosure.

Referring now to the drawings, two example alternative embodiments of the gaming devices disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device 10 may be positioned on a base or stand or can be configured as a pub-style table-top game (not shown) which a player can operate preferably while sitting. As illustrated by the different configurations shown in FIGS. 1A and 1B, the gaming device 10 may have varying cabinet and display configurations.

Figure 2A:
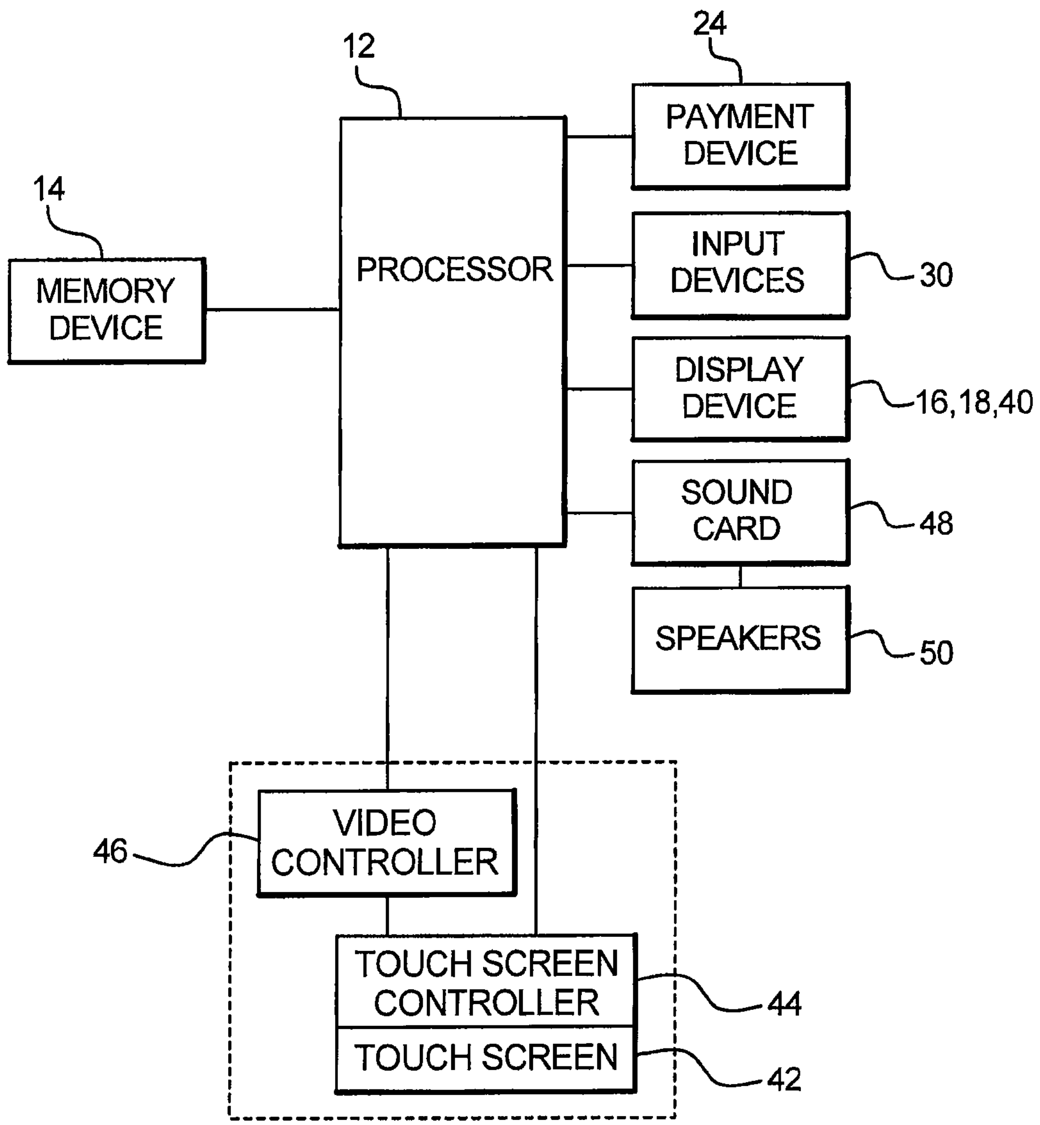
FIG. 2A is a schematic diagram of the electronic configuration of one embodiment of the gaming device of the present disclosure.

In one embodiment, as illustrated in FIG. 2A, the gaming device 10 preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device 10. The memory device stores program code and instructions, executable by the processor, to control the gaming device 10. The memory device also stores other data such as image data, event data, player input data, random or pseudo-random number generators, paytable data or information and applicable game rules that relate to the play of the gaming device 10. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device 10.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device 10 are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device 10 includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device 10. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device 10. In one embodiment, money may be transferred to a gaming device 10 through electronic funds transfer. When a player funds the gaming device 10, the processor determines the amount of funds entered and displays the corresponding amount on the credit or other suitable display as described above.

As seen in FIGS. 1A, 1B and 2A, in one embodiment the gaming device 10 includes at least one and preferably a plurality of input devices 30 in communication with the processor. The input devices can include any suitable device which enables the player to produce an input signal which is received by the processor. In one embodiment, after appropriate funding of the gaming device 10, the input device is a game activation device, such as a pull arm 32 or a play button 34 which is used by the player to start any primary game or sequence of events in the gaming device 10. The play button can be any suitable play activator such as a bet one button, a max bet button or a repeat the bet button. In one embodiment, upon appropriate funding, the gaming device 10 begins the game play automatically. In another embodiment, upon the player engaging one of the play buttons, the gaming device 10 automatically activates game play.

In one embodiment, as shown in FIGS. 1A and 1B, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device 10.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device 10 by touching the touch-screen at the appropriate places. One such input device is a conventional touch-screen button panel.

The gaming device 10 may further include a plurality of communication ports for enabling communication of the processor with external peripherals, such as external video sources, expansion buses, game or other displays, an SCSI port or a key pad.

In one embodiment, as seen in FIG. 2A, the gaming device 10 includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device 10, such as an attract mode. In one embodiment, the gaming device 10 provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
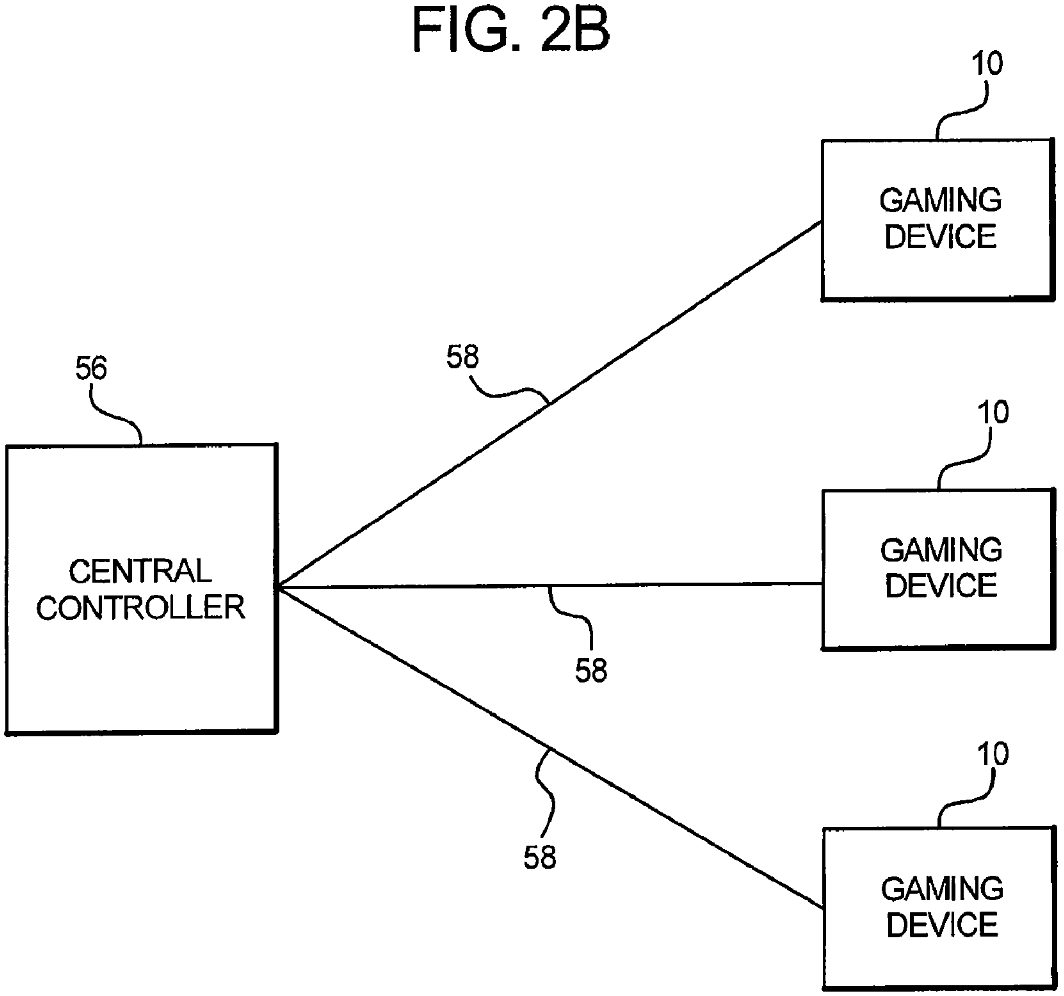

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

One or more embodiments of the present disclosure comprise a gaming system including a live table game and an activity tracking and reward system. The tracking system is configured to collect and store raw data relating to the wagering activities of players at a gaming table. The present disclosure also includes methods of utilizing the obtained data. For example, the data may be used to calculate the house rake, where the house rake may be based on the size of the pot at the end of a hand. In one embodiment, certain criteria are applied to the obtained data to determine if a player qualifies to receive a progressive jackpot award. In another embodiment, the collected data is analyzed to determine a player's wagering history to determine whether or not the player is entitled to certain complimentary items. In another embodiment, the gaming system notifies a player that a seat is vacant at a poker table, where the player is located at a remote gaming device or gaming table.

FIRST EXAMPLE EMBODIMENT OF POKER GAME

Figure 3A:
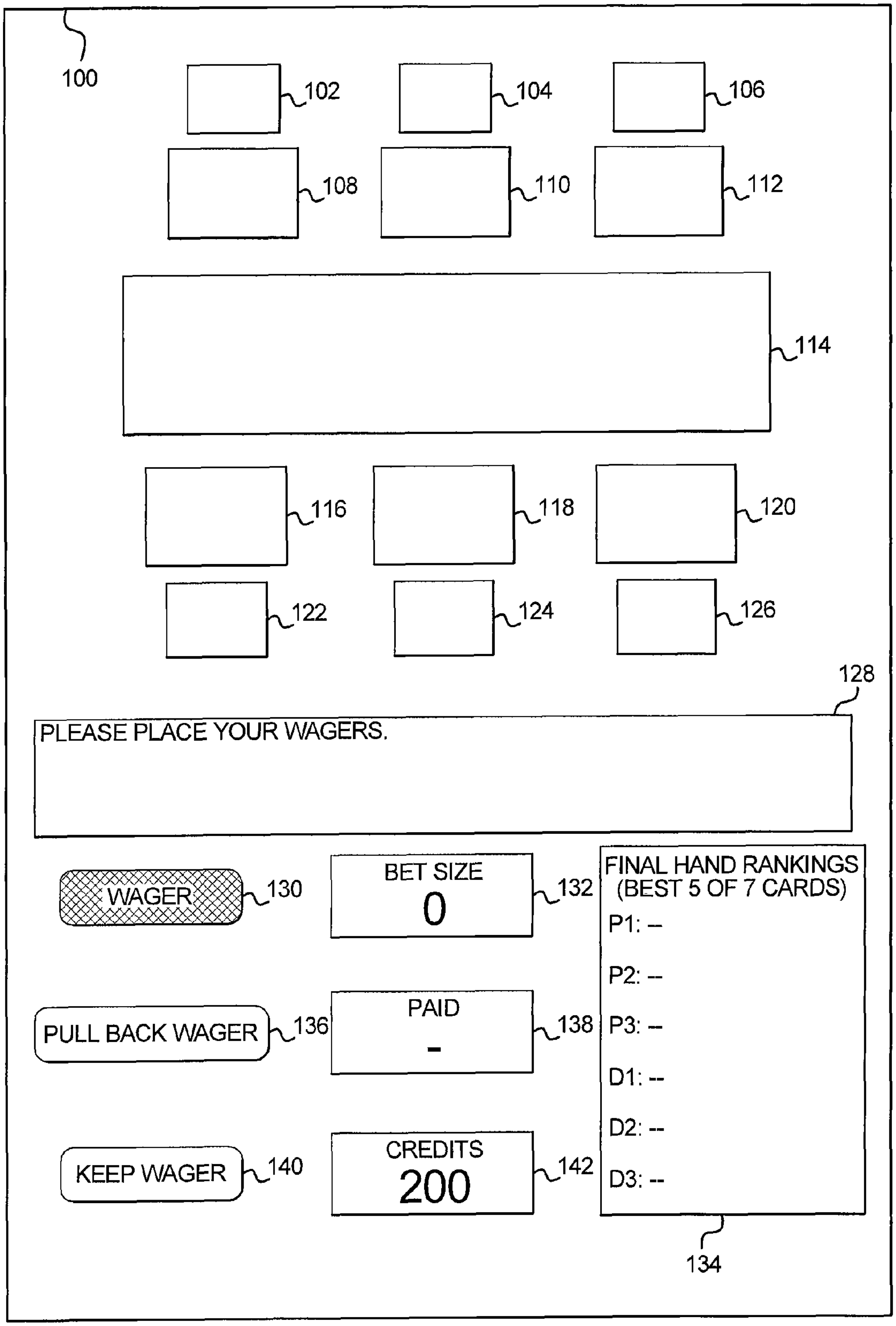
FIGS. 3A, 3B, 3C, 3D, 3E, 3F and 3G are illustrations of screen displays for a round of play of the game, in an embodiment where one or more player hands may be optionally cancelled.

As shown in FIG. 3A, in one example embodiment, the gaming system 100 incorporates a Texas Hold'em style poker game where the gaming system 100 initially deals each participating player six cards face-up to form three two-card player hands 116, 118 and 120. In this example embodiment, the cards are dealt from a virtual deck of 52-playing cards. The player places three equal wagers, and the gaming device places three matching wagers. Each of the three wagers placed by the player corresponds to an initial two-card player hand where each of the two-cards are dealt face-up to the player. In one embodiment, it should be appreciated that the player need only designate a single wager amount, and then the gaming device would apply this designated wager amount to each of the player hands and dealer hands. The gaming device deals two-cards face-down for each of the dealer hands. The player can elect to withdraw one of the wagers and have the corresponding initial two-card hand folded. In this embodiment, the house, casino, or gaming establishment has the same option to withdraw one wager and discard the corresponding dealer hand. In this embodiment, the dealer cards that are discarded are not shown to the player. However, it should be appreciated that in other embodiments, the player may be allowed to view the cards in the discarded dealer hand prior to eliminating the respective dealer hand. This would give the player a slight advantage is determining whether or not to keep or fold a different one of the two-card player hands.

After the wagers have been placed and the cards have been dealt, three community cards are dealt in a community card area 114. The player and the gaming system can then respectively withdraw one of the wagers associated with one of the respective player or dealer hands. After this, the remaining two community cards are dealt, all of the cards in the dealer hands are revealed, and the best hand takes the wagers remaining in the game. It should be appreciated that the number of community cards may be one, two, three, five, or any suitable number. It should be appreciated that the number of dealer hands may the same, less, or more than the number of player hands.

As shown in FIG. 3A, in one embodiment, a gaming system 100 includes several elements. Specifically, the display area of the gaming system 100 includes an area for a first dealer hand 108, an area for a second dealer hand 110, and an area for a third dealer hand 112. The display area also includes a first dealer wager area 102, a second dealer wager area 104, and a third dealer wager area 106. Similarly, the display area includes an area for a first player hand 120, an area for a second player hand 118, and an area for a third player hand 116. The display area also includes a first player wager area 126, a second player wager area 124, and a third player wager area 122. The display area of the gaming system 100 also includes a play area 114. This play area 114 may be used for dealing a number of community cards or for dealing one or more cards to be distributed to any of the player hands or dealer hands. Other elements of the display area include a message display 128, a wager input 130, a bet size display 132, a final hand ranking display 134, a withdraw wager input 136, and an award paid display 138, a keep wager input 140, and a total credits display 142. However, it should be appreciated that the gaming system 100 may include other or different display areas and inputs to facilitate game play.

FIGS. 3A to 3G illustrate an example play of the game according to this embodiment. As shown in FIG. 3A, the gaming system 100 prompts or requires the player to place an initial wager, where the wager amount will be applied to each of the three player hands 116, 118, and 120. That is, if the player places a wager of five-credits, then a total wager of fifteen credits will be required. Of this fifteen credits, five-credits are applied to the first player hand 120 in the first player wager area 126, five-credits are applied to the second player hand 118 and placed in the second player wager area 124, and five-credits are applied to the third player hand 116 and placed in the third player wager area 120.

Figure 3B:
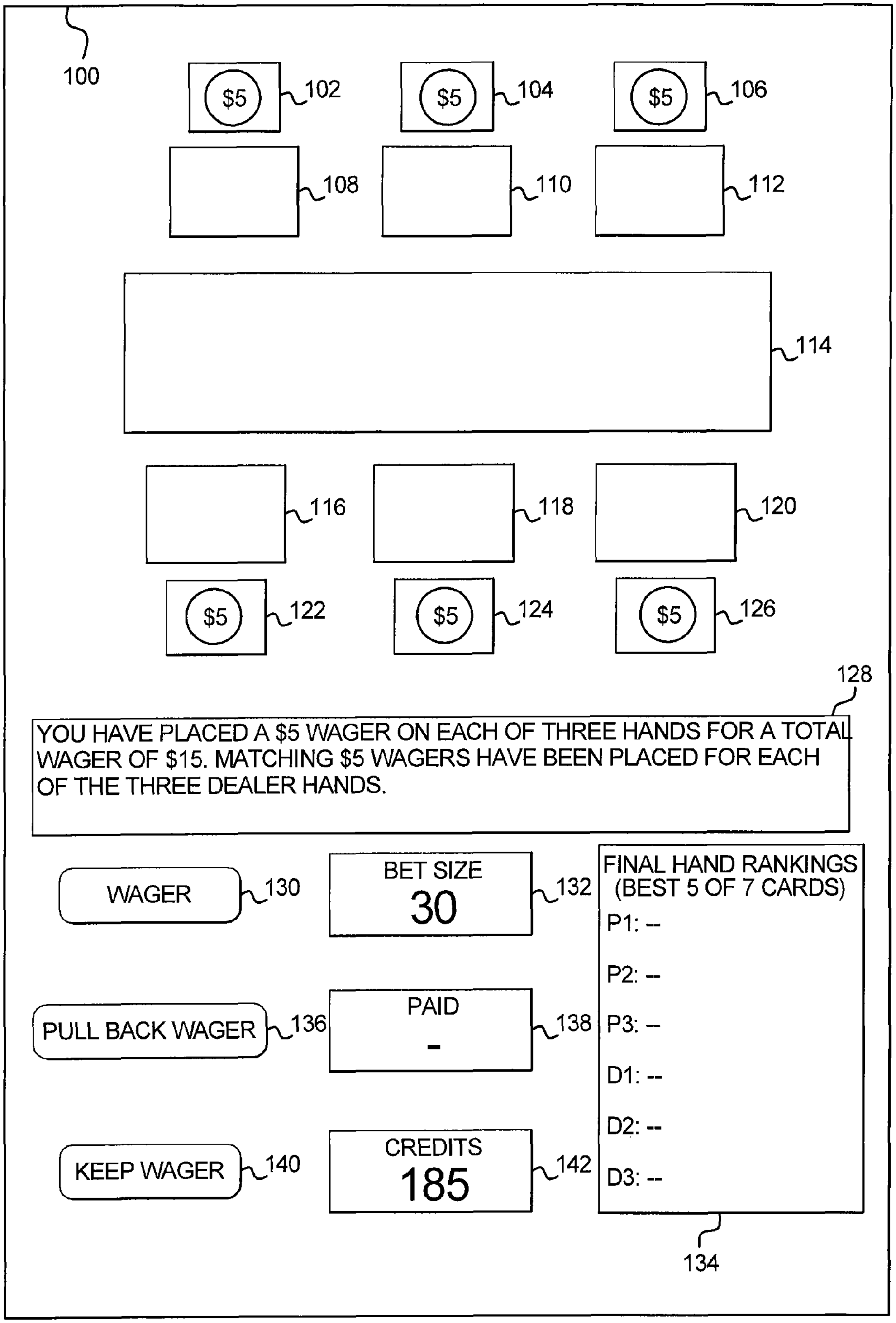

FIG. 3B shows the various wagers placed in the first player wager area 126, the second player area 124, and the third player wager area 122. The message display 128 also indicates that the player has placed a five-credit wager on each of the three player hands for a total wager of fifteen credits. Matching five-credit wagers have been placed for each of the three dealer hands 108, 110, and 112, as shown in FIG. 3B. Therefore, a five-credit wager has been placed in the first dealer wagering area 102, the second dealer wager area 104, and the third dealer wager area 106. The pot size at this point in the game is thirty credits as indicated by the bet size display 132. The player's credits have also been decreased from two-hundred down to one-hundred eighty-five as indicated in total credits display 142.

Figure 3C:
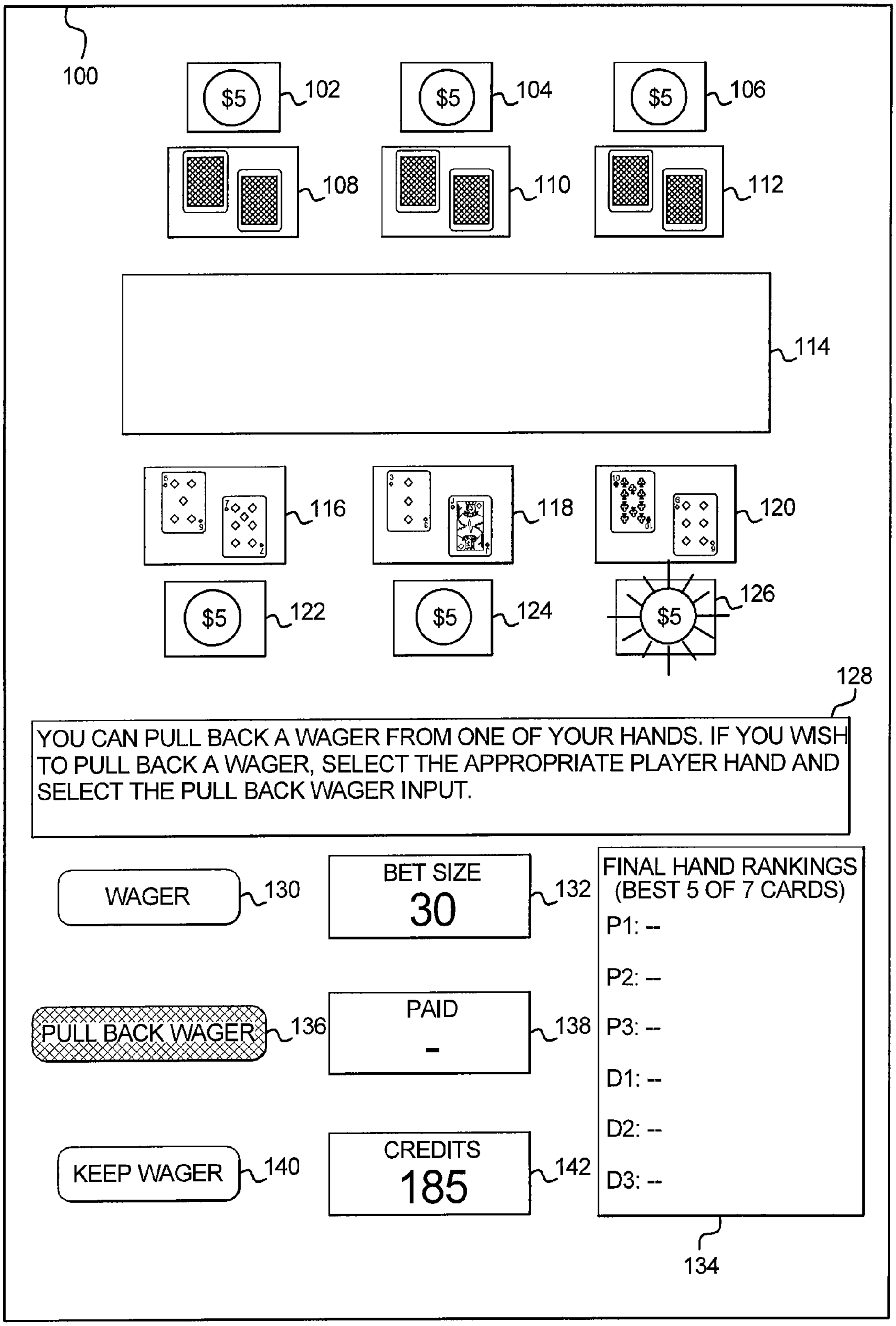
Figure 3D:
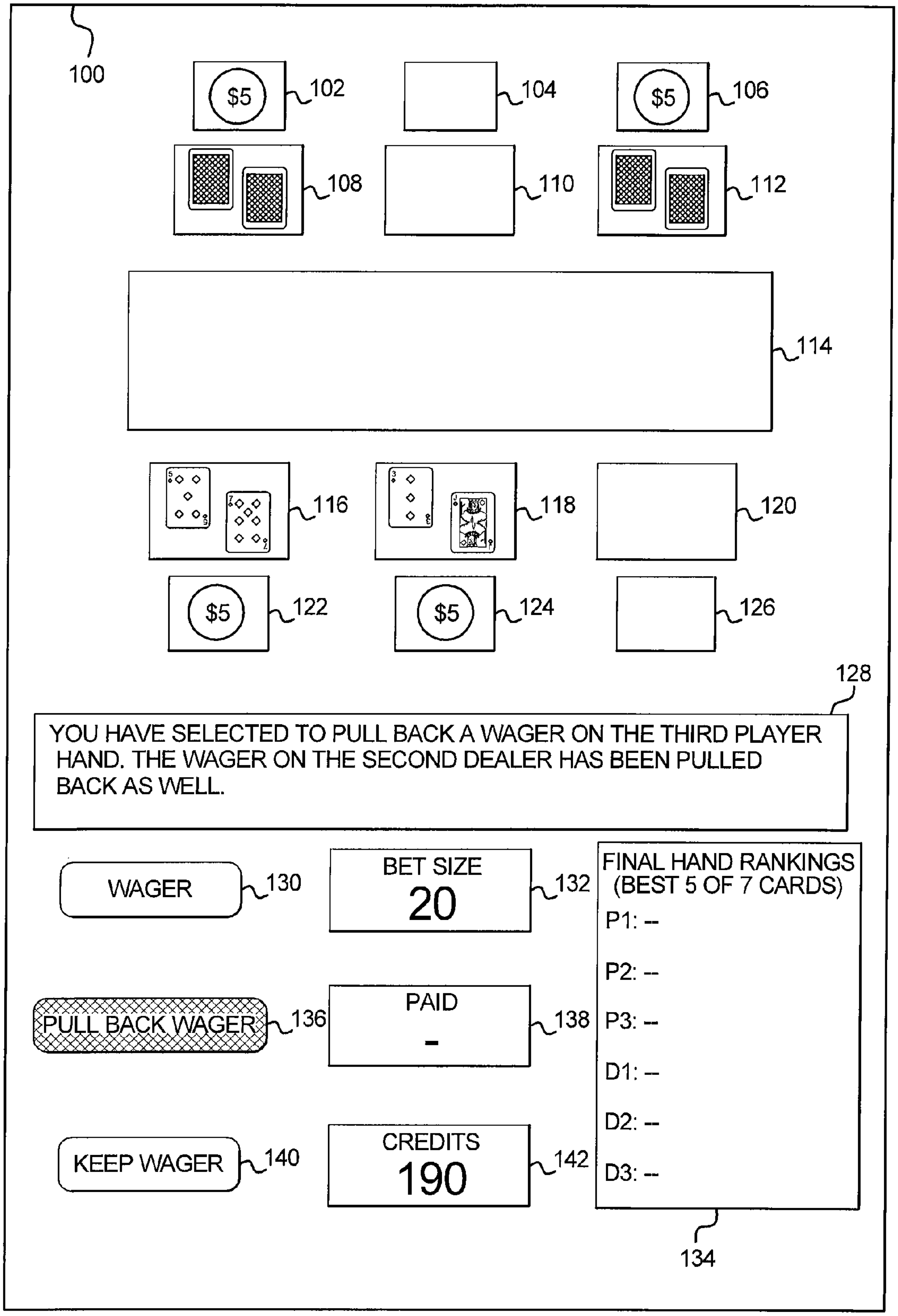

As shown in FIG. 3C, the gaming device has dealt the cards for the player hands and the dealer hands. The first player hand 116 includes a 5♦ and a 7♦, the second player hand includes a 3♦ and a J♦, and the third initial player hand 120 includes the 10♣ and the 6♦. Six cards have also been dealt to the three dealer hands, where two-cards are dealt face-down to the first dealer hand 108, two-cards are dealt face-down to the second dealer hand 110, and two-cards are dealt face-down to the third dealer hand 112. The player then has the option to withdraw a wager associated with one of the three player hands, as indicated in the message display 128. In this embodiment, the player is able to view all of the cards in each of the three player hands to determine whether one of the three hands has a sufficiently low starting rank that the player would not want to proceed. Thus, the player has the ability to withdraw a wager from the play area for a particular starting hand. In this example round of play of the game, the player elects to withdraw the five-credit wager associated with the third player hand 116, as indicated by the activated pull-back wager input 136 and the highlighted five-credit wager in the third wager area 122. As shown in FIG. 3D, the gaming system 100 adjusts the total number of credits to indicate that the five-credit wager has been returned to the player.

In this embodiment, after all the initial two-card hands have been dealt, and after the player has optionally withdrawn a wager related to one of the player hands, the gaming device also has an option to withdraw the wager related to one of the three dealer hands 108, 110 and 112. In this example play of the game, the gaming system 100 withdraws the five-credit wager from the second dealer wager area 104 that relates to the second dealer hand 110. Although in this embodiment, the cards in the dealer hands are not visible to the player, it should be appreciated that in other embodiments, one or more or all of the dealer cards may be visible to the player. It should be appreciated that in other embodiments, the gaming system 100 may withdraw one of the wagers related to or associated with one of the dealer hands prior to the player having the option to withdraw a wager associated with one of the player hands. In one embodiment, the gaming system 100 must remove at least one of the dealer hands (i.e., even if each of the three dealer hands 102, 104, 106 are high ranking two-card hands).

Because the player has withdrawn the five-credit wager related to the third player hand 116, and the five-credit wager associated with second dealer hand 110 has also been withdrawn, the pot size has been reduced from thirty credits down to twenty credits, as indicated by the pot display 132. The total amount of player credits has been increased from one-hundred eighty five up to one-hundred ninety, as indicated by the total credits display 142. Accordingly, for every initially placed wager that is withdrawn by either the player or the gaming device, the amount of the pot size and the amount of the potential award is decreased as the credits are refunded to the player account.

Figure 3E:
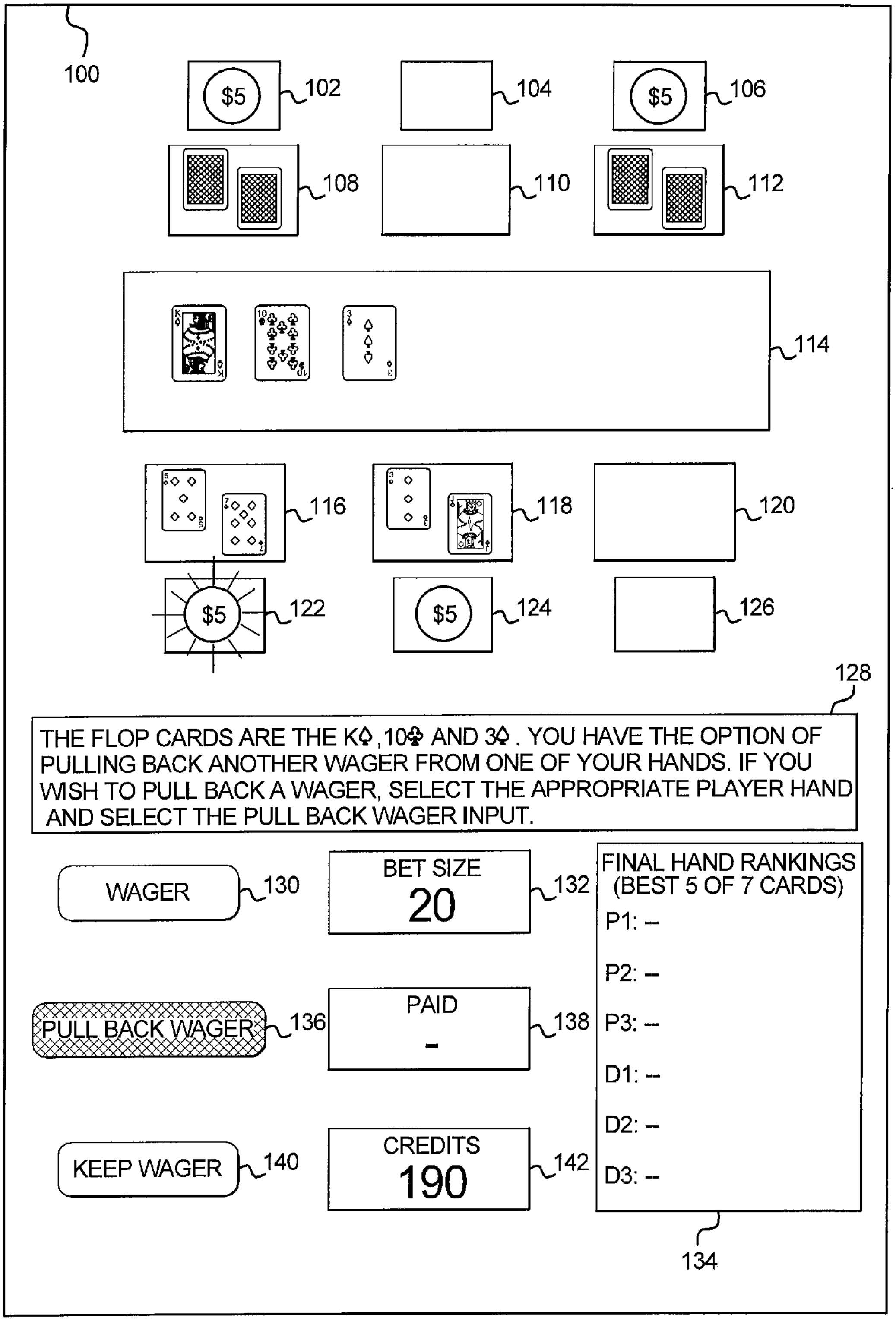

As shown in FIG. 3E, the gaming system 100 deals the three flop cards in the play area 114. In this embodiment the flop cards include the K♠, 10♣, and 3♠. The player then has the option to withdraw another wager associated with one of the remaining player hands (i.e., the first player hand 120 and the second player hand 118). The player then has another option to examine the each of the remaining two player hands with respect to the revealed community cards to determine whether the rank of one of these hands is sufficiently low such that the player would wish to withdraw the wager and fold the hand. In this example, the player chooses to withdraw another wager as indicated by the activated withdraw wager input 136, and the highlighted five-credit wager located in the first player wager area 126.

Figure 3F:
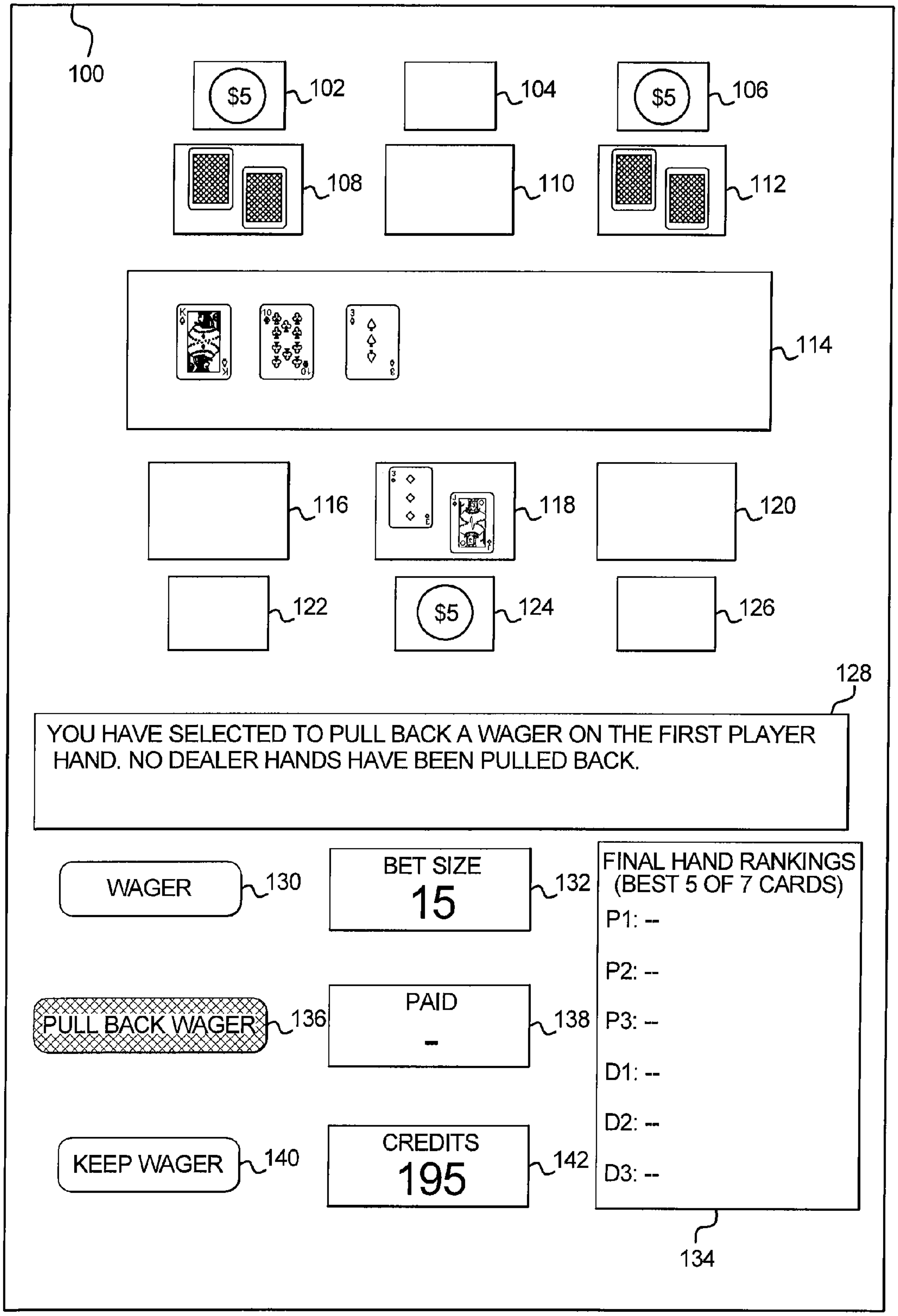

As shown in FIG. 3F, the wager associated with the first player hand 120 has been withdrawn from the first player wager area 126. The cards (i.e., 5♦ and 7♦) have been removed from the first player hand 120 area. Accordingly, because the player has withdrawn another five-credit wager, the pot size is reduced from twenty credits down to fifteen credits, as indicated by the bet size display 132. Because five credits have been returned to the player, the total number of credits has increased from one-hundred ninety to one-hundred ninety five, as indicated by the total credits display 142. The remaining second player hand 118 includes the 3♦ and J♦. These cards, combined with the three community cards including the K♠, 10♣, and 3♠ gives the player at least a pair of threes with two community cards remaining to be dealt. As described in detail above, the gaming system 100 then has the option to withdraw an additional wager associated with one of the remaining dealer hands 108, 112. However, in this case, no wagers associated with the remaining dealer hands 108 and 112 have been withdrawn, as indicated in the message display 128. Accordingly, the pot size remains at fifteen credits which includes ten credits associated with the first and third dealer hands 108 and 112 and five credits associated with the second player hand 118. Thus, although the player has wagered a lesser amount of credits than is associated with the two dealer hands 108 and 112, the player is at a certain disadvantage because the number of player hands is less than the number of dealer hands (i.e., there is only one available player hand 118 that must outrank two dealer hands 108 and 112).

In this embodiment, the gaming system 100 has the option to withdraw a wager associated with one of the associated dealer hands after the player withdraws a wager, as described above. However, it should be appreciated that, in another embodiment, if the player elects to withdraw a wager, then the gaming device must also move a wager associated with one of the dealer hands. Therefore, in this embodiment, the final number of dealer hands will be the same as the final number of player hands.

In the embodiment shown in FIG. 3F, although the dealer cards associated with the various dealer hands are not visible to the player, it is assumed that the gaming device withdraws the wager and folds the dealer hand which has the lowest potential for a winning outcome. In one embodiment, the gaming system makes the determination of which hand, if any to fold based on the values of the dealer cards and any revealed community cards. In another embodiment, the gaming system makes the determination of which hand, if any, to fold based also on the values of the folded player cards. In another embodiment, the gaming system makes the determination of which hand, if any, to fold based on the values of all of the player cards. In another embodiment, the gaming system makes the determination of which hand, if any, to fold based on the values of all of the community cards, whether yet revealed to the player or not.

Figure 3G:
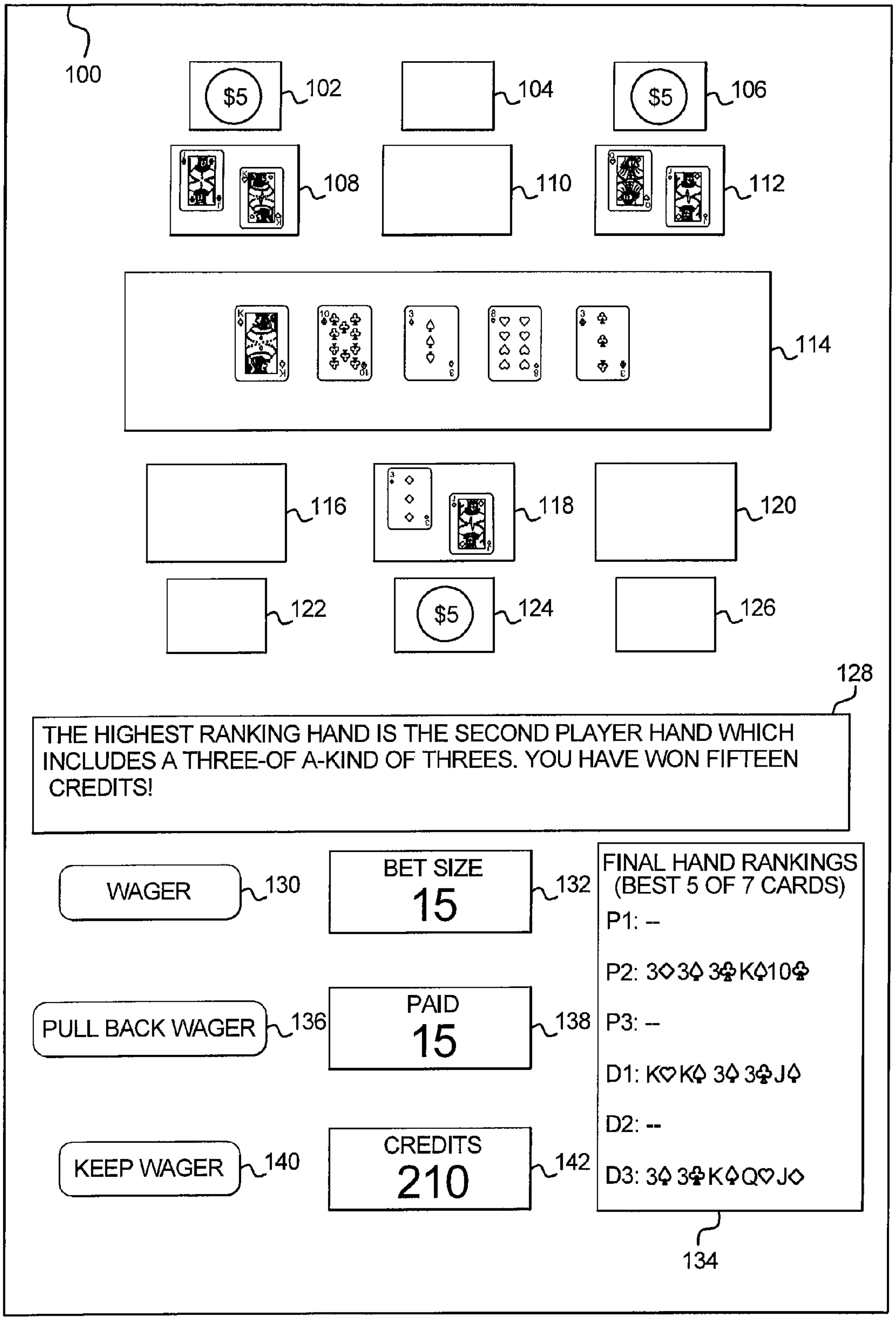

As shown in FIG. 3G, the gaming system 100 deals the turn card into the play area 114, where the turn card (i.e., the fourth community card) is the 8♥. The gaming system 100 deals the river card into the play area 114, where the river card (i.e., the fifth community card) is the 3♣. The gaming system 100 evaluates the final hand rankings for the remaining player hands and the remaining dealer hands to determine the highest ranking five-card hands. As shown in the final hand ranking display 134, the second player hand includes 3♦, 3♠, 3♣, K♠, 10♣, which includes a Three-Of-A-Kind of threes. As also indicated of the final hand ranking display 134, the first dealer hand includes K♥, K♠, 3♠, 3♣, J♠, and the third dealer hand includes 3♠, 3♣, K♠, Q♥ and J♦. Therefore, the highest ranking hand of the remaining player hands and the remaining dealer hands is the second player hand which includes the Three-Of-A-Kind of threes, as indicated in the message display 128. The gaming system 100 provides the player with an award of fifteen credits, as indicated in the award paid display 138. The gaming system 100 updates the credit display 142 from one-hundred ninety five credits to a total of two-hundred ten credits. At this stage, this example round of play of the game has ended.

In one embodiment, the player places three equal wagers, as in the example above. Each player wager receives an initial two-card player hand, where each of the cards are dealt face-up to the player. However, in this example the player is not playing against one or more dealer hands. Rather, the player is paid according to a paytable. An example paytable is shown below in Table 2.

TABLE 2

| Hand | Payout |
|---|---|
| On Board Royal Flush | 5000:1 |
| Royal Flush | 250:1 |
| Straight Flush | 25:1 |
| Four of a Kind | 10:1 |
| Full House | 4:1 |
| Flush | 2:1 |
| Straight | 1:1 |
| Three of a Kind | Push - Wager Returned |

Although an example paytable is shown in Table 1, it should be appreciated that any suitable payout ratio may be used, and more or less designated ranking poker hands may be used. In one embodiment, where the poker game is a seven card poker game, the player is required to use at least one of the card in the two-card player hand in order to be eligible for the award based on the paytable. In another embodiment, the player must use both of the cards in the two-card player hand.

As in the example above, the player makes three equal wagers related to three different player hands and has the option, after the gaming device deals the six cards to form the three player hands, to withdraw a wager associated with one of the player hands. Therefore, if one of the player hands has a sufficiently low rank, the player may choose to withdraw a wager associated with that hand. After the player makes the decision whether or not to withdraw a wager, the gaming device deals three community cards into the play area. After the three community cards are dealt, the player again has the option to withdraw one of the wagers associated with one of the player hands from the game. After this, the remaining community cards are dealt into the play area. The gaming device evaluates the remaining player hands and determines a final hand ranking for each hand (which is the best five of seven cards for each player hand). For each of the player hands that achieves one of the determined hand rankings (e.g., Full House or Three-Of-A-Kind), the player is paid according to a paytable (e.g., as shown in Table 1).

In one embodiment, a seven-card poker game as described above with respect to FIGS. 3A to 3G is provided, and includes a feature where each of the cards in the dealer hand are revealed to the player prior to the player being able to withdraw one or more wagers. Thus, in this embodiment, the player has an advantage of being able to consider the cards in each of the dealer's hands when making a decision as to whether or not to withdraw one or more of the player's wagers. In one embodiment, an additional fee is required to be placed in order to be able to view the cards in the dealer hands. In this embodiment, the additional fee is required to at least partially compensate for the fact that the player has an advantage by being able to view the dealer cards. In one embodiment, the player must pay the additional fee prior to the start of the game to see the dealer's cards. In another embodiment, the player can pay this fee after the start of the game.

In one embodiment, one of the cards in each of the dealer's hands is revealed prior to the player having to make a decision regarding withdrawing one or more of the player's wagers (i.e., one card in each of the dealer hands is dealt face-down, and one card in each of the dealer hands is dealt face-up). In one embodiment, the gaming system randomly selects which one of the two dealer cards to reveal to the player. In another embodiment, the selection of which dealer card to make visible to the player is based on an algorithm. In one example, the algorithm compares the relative values of the dealer cards. In another example, the algorithm additionally considers the values of the player cards. In one embodiment, each of the cards in the three dealer hands are initially dealt face-down. Then, prior to the player's first opportunity to withdraw a wager, the cards in one of the dealer hands are revealed. This give the player a slight advantage in being able to consider at least two of the dealer cards in addition to the face-up cards in the player hands when making a decision to withdraw a wager. In this embodiment, prior to the player having the second opportunity to withdraw a wager, two additional cards are revealed in another one of the dealer hands. Therefore, in this embodiment, before each player wager withdrawal opportunity, the gaming device must reveal one of the dealer hands to the player.

In one embodiment, a seven-card poker game as described above with respect to FIGS. 3A to 3G is provided, where a player may place an optional side bet wager. When a player places a side bet wager, the player is eligible to receive a bonus award if the player's final hand is of a certain rank relative to a bonus paytable. For example, if the player's final hand rank is a Three-Of-A-Kind or higher, the player will receive an award based on the paytable. In another embodiment, if the player places a side bet wager, the player is eligible to receive a bonus award if the highest final hand in the game is of a certain rank relative to a bonus paytable, regardless of whether the highest final hand is one of the player hands or one of the dealer hands.

SECOND EXAMPLE EMBODIMENT OF POKER GAME

Figure 4A:
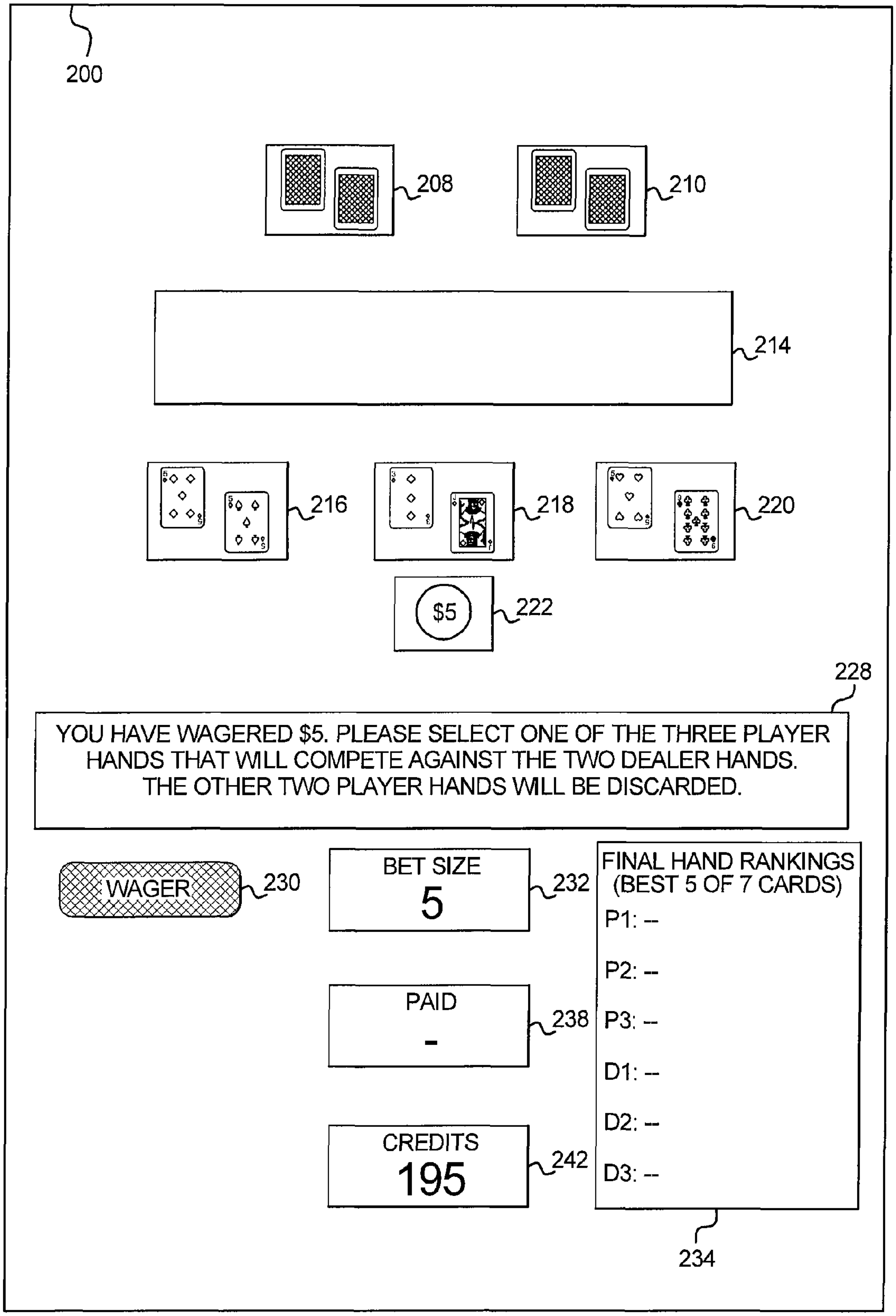
FIGS. 4A, 4B and 4C are illustrations of screen displays for a round of play of the game, in an embodiment where one player hand is selected from several player hands.
Figure 4B:
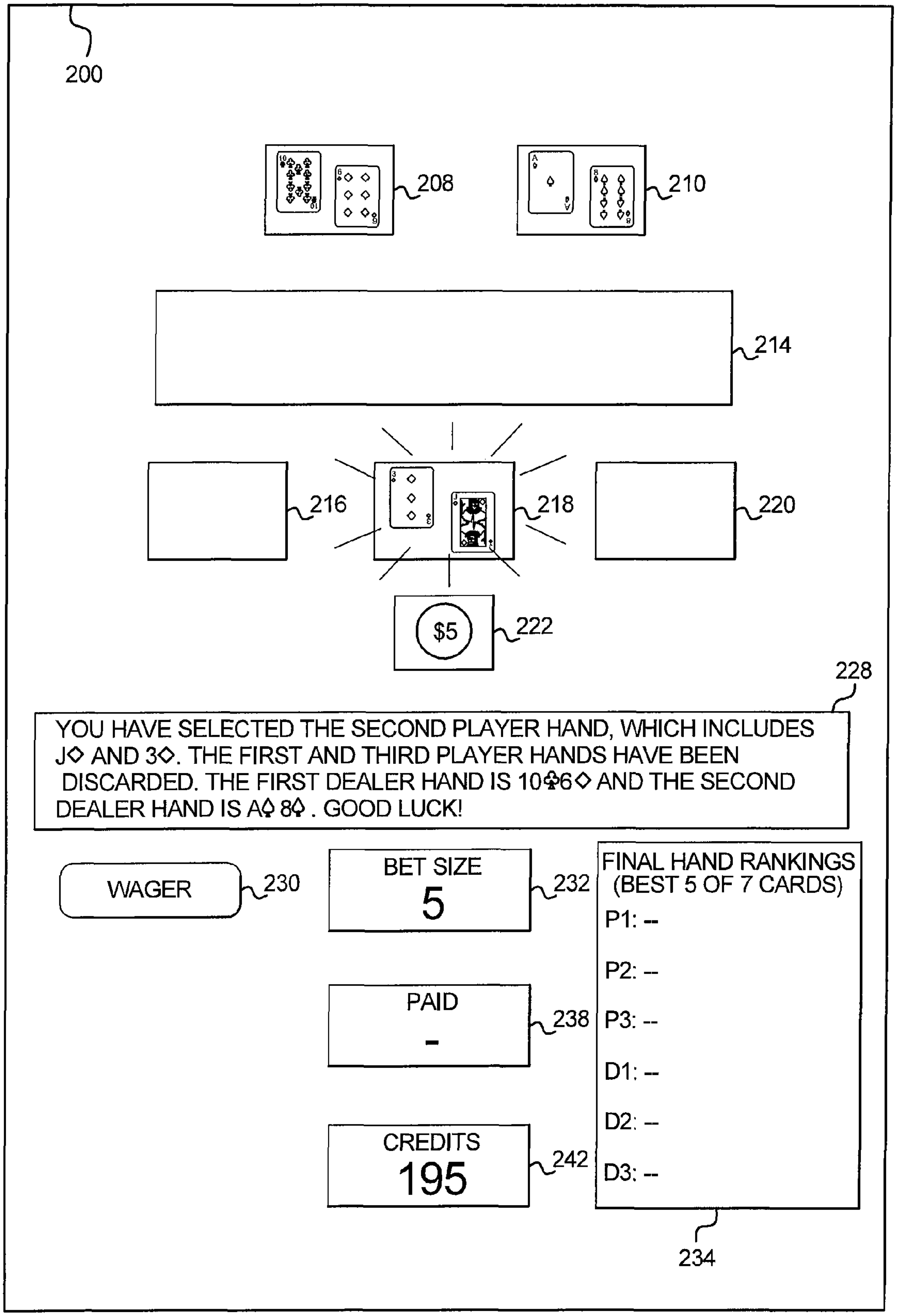
Figure 4C:
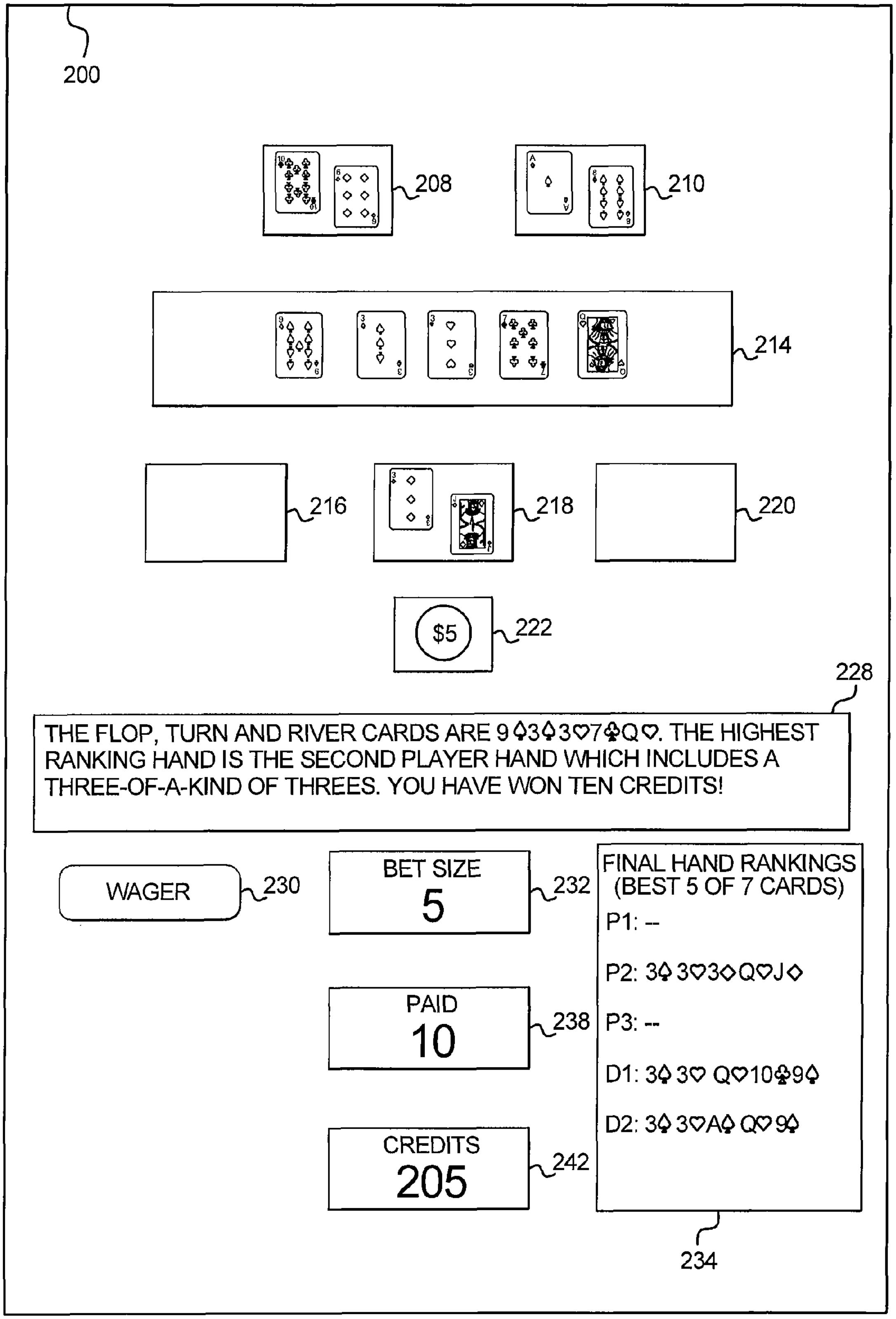

As shown in FIGS. 4A to 4C, in one embodiment, the gaming device 200 incorporates a Texas Hold'em style poker game where the gaming device 200 initially deals each participating player six cards face-up to form three two-card initial player hands 216, 218 and 220. In this embodiment, the cards are dealt from a virtual deck of fifty-two playing cards. The gaming device 200 also deals four cards face-down to form two initial dealer hands 208 and 210. The display of the gaming device 200 includes several elements. The display of the gaming device 200 includes an area for a first dealer hand 208, an area for a second dealer hand 210, a play area 214, an area for a first player hand 216, an area for a second player hand 218, and an area for a third player hand 220. The display also includes a player wager area 222, a message display 228, a wager input 230, a bet size display 232, a final hand ranking display 234, an award paid display 238, and a total credits display 232.

As shown in FIG. 4A, the player has placed a five-credit wager on this example play of the game, as indicated by the bet size display 232 and the total credits display 242. Five credits are indicated in the player wager area 222. The initial six cards dealt face-up to the player include two-cards for the first player hand 216, two-cards face-up for the second player hand 218, and two-cards face-up for the third player hand 220. The first player hand 216 includes the 5♦ and 5♠. The two-cards for the second player hand 218 include the 3♦ and J♦, and the two-cards for the third player hand 220 include the 5♥, and 9♣. The gaming device 200 instructs the player to select one of the three player hands, as indicated in the message display 228. In this embodiment, the player has a certain advantage over the gaming device 200 because the player can select the best hand from among three different player hands, whereas the dealer only has two total hands. However, the player also has a certain disadvantage in that the player must select and use only one of the three player hands, whereas the gaming device will be able to use both of the dealer hands. In one embodiment, the cards in the player hands that were not selected are discarded. In another embodiment, the cards in the player hands that were not selected are randomly shuffled back into the deck of cards.

As shown in FIG. 4B, the player has selected the second player hand 218, which includes the 3♦ and J♦, as indicated in the message display 228. As shown in FIG. 4B, the first player hand 216 and the third player hand 220 have been discarded and removed from the display area. The gaming device 200 reveals the first dealer hand 208 which includes the 10♣ and 6♦. The gaming device 200 reveals the two-cards in the second dealer hand 210 which include the A♠ and 8♠.

As shown in FIG. 4C, the gaming device 200 deals five community cards which include three flop cards, a single turn card, and a single river card. In this example play of the game, the flop cards include the 9♠, 3♠, and 3♥. The turn card is the 7♣, and the river card is the Q♥. In one embodiment, the gaming device 200 deals the flop cards simultaneously, followed by dealing the turn card, and finally followed by dealing the river card. However, it should be appreciated that cards may all be dealt simultaneously or one at a time or in any other suitable order. In this example play of game, the final hand ranking for the second player hand 218, which includes the best five of seven cards, includes the 3♠, 3♥, 3♦, Q♥ and J♦. The final hand ranking for the first dealer hand 208, includes the 3♠, 3♥, Q♥, 10♣ and 9♠, and the final hand ranking for the second dealer hand 210 includes the 3♠, 3♥, A♠, Q♥ and 9♠. The highest ranking hand is the second player hand which includes a Three-Of-A-Kind of threes, as indicated in the message display 228. Accordingly, the gaming device 200 pays the player ten credits, as indicated in the award paid display 238. The gaming device 200 updates the total credit display from two-hundred credits to two-hundred five credits, as indicated in the total credits display 242. This ends this example round of play of the game.

Figure 4D:
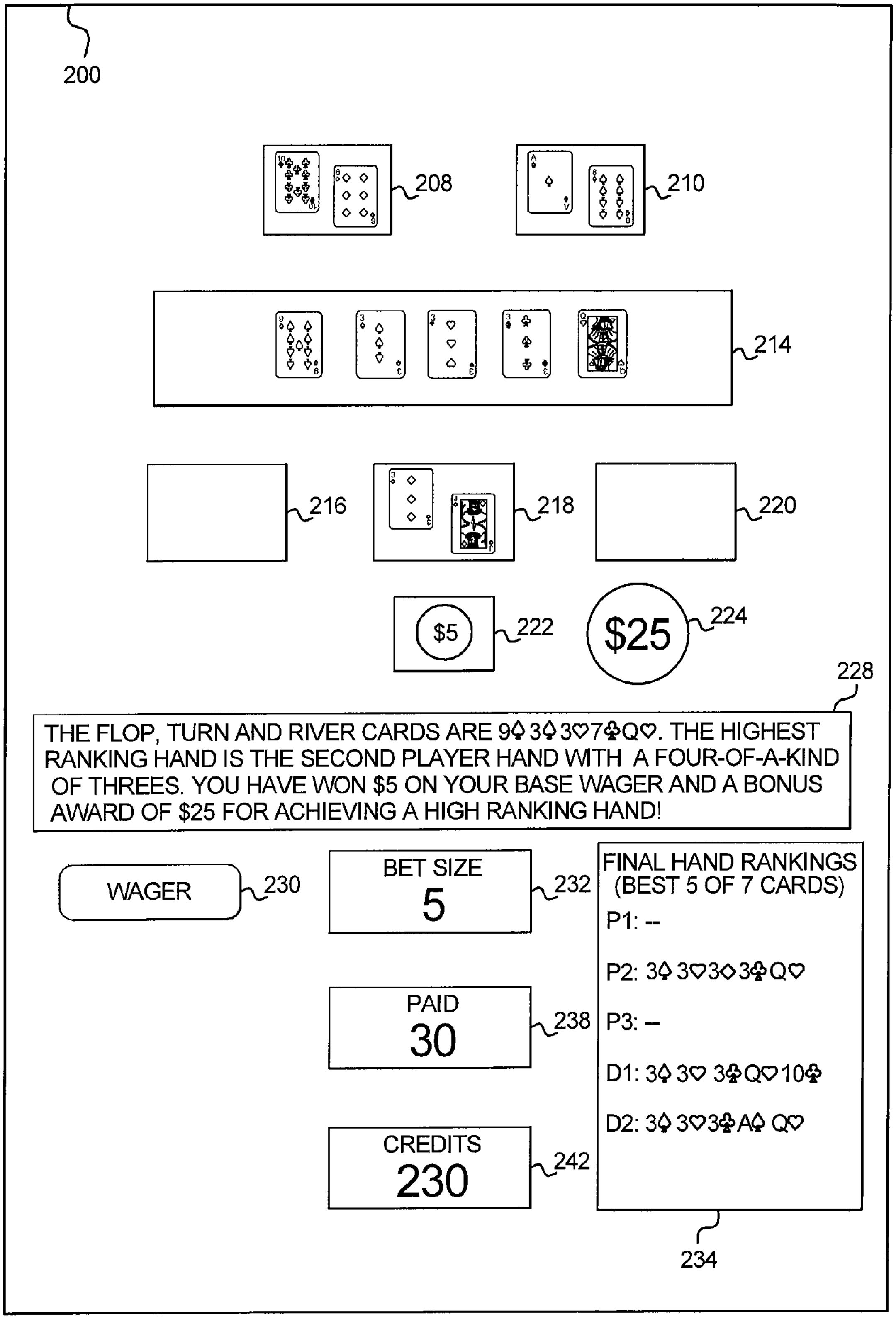
FIG. 4D is an illustration of a screen display for a round of play of the game, in an embodiment where one player hand is selected from several player hands, and a bonus award is provided.

In one embodiment, as shown in FIG. 4D, a seven-card poker game is provided as described above with respect to FIGS. 4A-4C, where the player has an option to pay an additional fee to participate in a bonus game. In this embodiment, if the selected player hand 218 is the hand with the highest final hand ranking and if the ranking of this hand is a predetermined high ranking hand, the player wins a bonus award. In this example, as shown in FIG. 4D, the final hand ranking of the second player hand 218, includes a 3♠, 3♥, 3♦, 3♣ and Q♥, which includes a Four-Of-A-Kind of threes. Because this is a designated high ranking hand and the player has placed the optional side wager, the player receives not only the base award of five-credits, but as indicated in the player wager area 222, also receives a bonus award of twenty-five credits, as indicated in the bonus award paid display 224. Therefore, the gaming device 200 provides the player with a total award of thirty credits, as indicated in the award paid display 238. The gaming device 200 also updates the total number of credits from two-hundred to two-hundred thirty, as indicated in the total credits display 242.

In one embodiment, a seven-card poker game is provided as described above with respect to FIG. 4A to 4C, where six cards are dealt to a player face-up, and four cards are dealt to the casino face-up. The six player cards and four dealer cards form three two-card player hands and two two-card dealer hands, respectively. In this embodiment, at the beginning of a round of play of the game, the player is required to place a base wager. However, if the player elects to select one of the three player hands to play against the dealer hand, the player is required to double the initial player wager in order to be able to select this hand and continue play. Therefore, if the player wishes to fold (i.e., not continue), the player simply selects a fold input (not shown) and forfeits the initial wager. If the player chooses to play the hand by doubling the wager, then the non-selected player hands are discarded as described above. In this embodiment, if the player has the highest ranking final hand, the player wins 1:1 on the doubled wager. For example, if the player initially wagered ten credits and elected to play the hand by doubling the initial wager to twenty credits, and the player wins the hand, the award is twenty credits. In one embodiment, if the player and the dealer tie (i.e., the final ranking of the player hand and the final ranking of the best dealer hand are the same), the player's initial wager and the doubled wager are returned to the player. In another embodiment, if the dealer's final outcome is not of a certain ranking (e.g., the dealer's final outcome is less than two-pair), then the player is paid 1:1 on the player's original wager and the player's doubled wager is returned without any additional award. In one embodiment, this payment occurs irrespective of the player's final outcome. In another embodiment, this payment only occurs if the player's final outcome is higher than the outcomes of both of the dealer hands.

In one embodiment, a seven-card poker game is provided as described above with respect to FIGS. 4A to 4C, where eight cards are dealt to the player to form four player hands, and six cards are dealt face-up to form three dealer hands. In this embodiment, the player selects one of the player's four initial two-card hands to play against the dealer hand. In this embodiment, the player also has the option to double the initial wager. In contrast to the previous embodiment described above, the player is not required to double the player's initial wager but has the option to double the wager. Regardless of whether the player selects the option to double the initial wager, after the single player hand is selected by the player, the non-selected player hands are discarded and removed from the display. Then, the five community cards are dealt as described above. If the player has the highest ranking final hand, the player wins 1:1 on the player's initial or increased wager. If the player and the dealer tie, the player's initial wager and the double-up bet are returned. In another embodiment, if the play of the game results in a tie between the player and the dealer, the player forfeits the player's initial wager and the gaming system returns the player's double-up bet to the player. In another embodiment, if the player of the game results in a tie between the player and the dealer, the player forfeits both the player's initial wager and the player's double-up bet.

In other embodiments, there are a number of possible award structures. In one embodiment, the player wins 1:1 on the player's initial wager. In another embodiment, the player wins 1:1 on the player's initial wager and the player wins a bonus award for certain high-ranking winning hands, such as a Full House, Four-Of-A-Kind, Straight Flush, Royal Flush, or other suitable high ranking hands. In this embodiment, the bonus award is paid according to a paytable. In one embodiment, if the player hand beats all of the dealer hands, the player wins 1:1 on the initial wager. If the player hand beats all but one of the dealer hands, then the player's wager is pushed.

Moreover, ties between the player and the dealer hands can be handled in a number of ways. In one embodiment, the player always wins, and in another embodiment, the dealer always wins, in another embodiment, the player gives the original wager back.

In one embodiment, if the player wins after having received an initial starting hand with a lower rank than any of the dealer two-card hands, the player earns an extra large award. Therefore, in this embodiment, the player is provided with an extra bonus award if the player is able to come from behind with the poorest initial two-card hand and achieve a high ranking final hand to beat all of the final dealer hands.

In one embodiment, a seven-card poker game is provided as described above with respect to FIGS. 4A to 4C, where all the cards in the dealer hands are hidden until the player makes a selection from amongst the plurality of player hands available. In another embodiment, certain dealer cards are hidden until the player makes the selection, and certain other of the dealer cards are visible to the player prior to the player making a selection of a player hand. In another embodiment, all of the cards in the dealer hands are visible to the player.

In one embodiment, the seven-card poker game is provided as described above with respect to FIGS. 4A to 4C where the player is able to make an optional side wager in addition to the primary wager. In this embodiment, a bonus award is paid based on the side wager relative to the value of a winning hand (either the player hand or the dealer hand) against a paytable.

In one embodiment, after the play of the game has begun and a partial outcome of the play of the game has been determined, the player has the option to place a side wager or secondary wager. In this embodiment, the gaming system provides a secondary award to the player if the player's final outcome is a winning outcome, the value of the secondary award being based on the odds of the player achieving a winning outcome at the time the secondary wager was placed. In one example, the value of the secondary award is inversely proportional to the odds of winning. Thus, at the time the partial outcome is determined, if the probability of achieving a winning outcome is relatively low, the associated secondary award would be relatively high. Conversely, at the time the partial outcome is determined, if the probability of achieving a winning outcome is relatively high, the associated secondary award would be relatively low.

In one embodiment, the player has an option of placing a secondary wager at the beginning of a round of play of the game. In this embodiment, the gaming system provides the player with a secondary award if the rank of one or both of the initial two-card player hands is a sufficiently high rank. For example, if one of the player's initial two-card hands if a pair of Aces, the gaming system provides the player with a secondary award regardless of whether the player ultimately beats the dealer hands.

In one embodiment, the gaming system provides the player an option of placing a secondary wager at the beginning of a round of play of the game. In this embodiment, the gaming system provides the player with a secondary award if the rank of the best five card hand formed from the player's six initially dealt cards (i.e., the two cards in the first player hand, the two cards in the second player hand, and the two cards in the third player hand) is of a sufficiently high rank. For example, if five of the cards in the player's six initially dealt cards form a Four Of A Kind, the gaming system provides the player with a secondary award regardless of whether the player ultimately beats the dealer hand (e.g., if the cards in the first player hand include A♥A♦, the cards in the second player hand include A♠A♣, the cards in the dealer hand include K♥K♦, and the community cards include K♠6♥8♣3♦2♥, the final dealer hand would have a higher final ranking than the final player hand but the player would still receive the secondary award for the Four Of A Kind of Aces).

THIRD EXAMPLE EMBODIMENT OF POKER GAME

As shown in FIGS. 5A to 5H, in one embodiment, the gaming device 300 incorporates a Texas Hold'em style poker game where a gaming device 300 initially deals a plurality of dealer cards from which the gaming device 300 selects three dealer hands. Therefore, there will a first dealer hand, a second dealer hand, and a third dealer hand that each include two-cards. In this embodiment, the gaming device 300 separates the six dealer cards into three two-card dealer hands such so as to maximize the potential winning hand combinations for the gaming device 300. Likewise, the gaming device 300 deals a plurality of cards to the player, from which the player can separate the player cards into two different two-card player hands. After the player and the dealer have formed their respective two-card hands, five community cards are dealt. As described above with respect to the other embodiments, if the player has the highest ranking final hand, the player wins an award. In one embodiment, the gaming device 300 may take into account knowledge of the player cards prior to separating the dealer cards into the two-card dealer hands. In another embodiment, the gaming device 300 must form the three two-card dealer hands without any knowledge of the player cards.

Figure 5A:
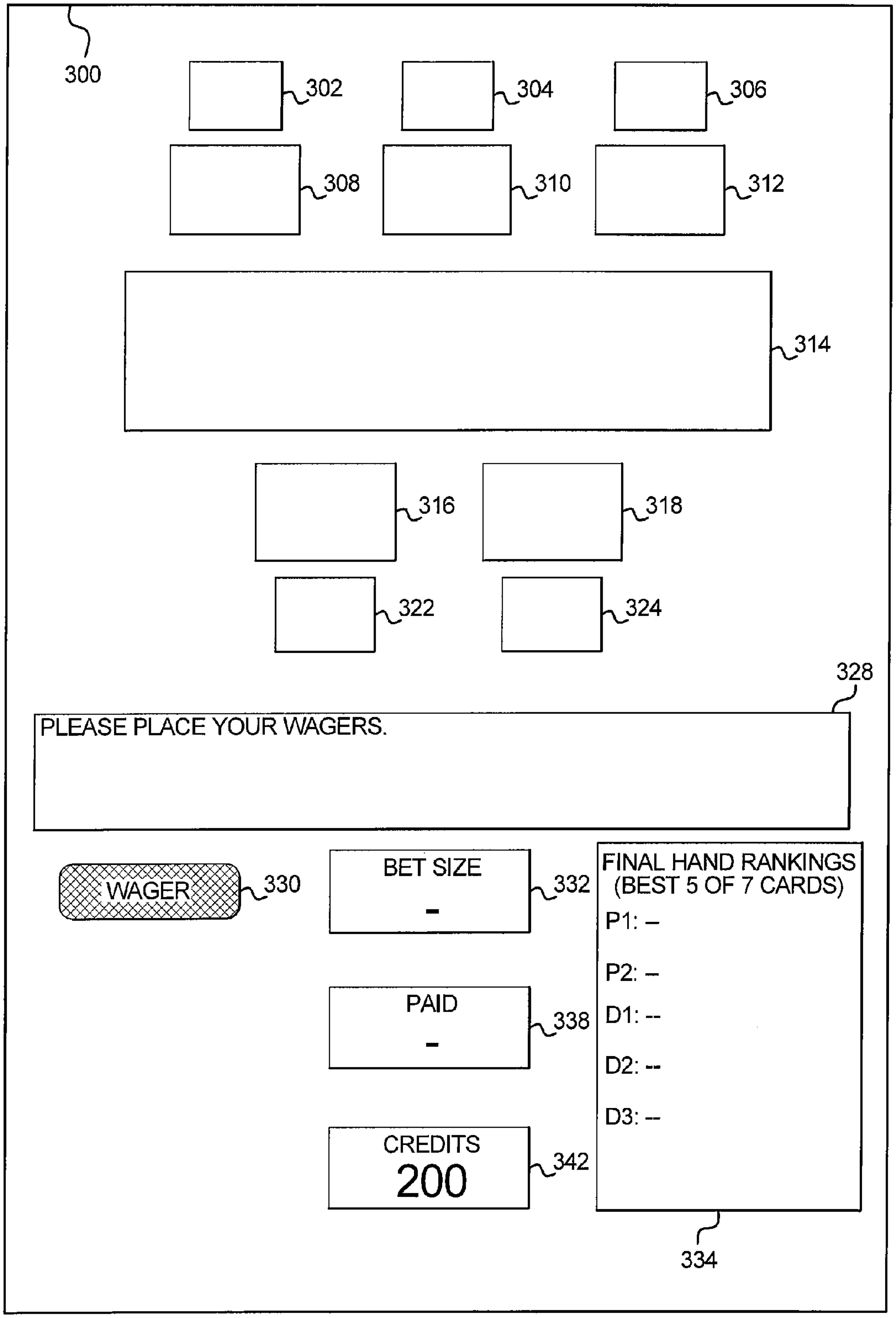
FIGS. 5A, 5B, 5C, 5D, 5E, 5F, 5G and 5H are illustrations of screen displays for a round of play of the game, in an embodiment where player cards and dealer cards are distributed to player and dealer hands, respectively.

As shown in FIG. 5A, the display of the gaming device 300 includes several elements. The display includes a first dealer wager area 302, a second dealer wager area 304, and a third dealer wager area 306. The display also includes an area for a first dealer hand 308, an area for a second dealer hand 310, and an area for a third deal hand 312. The display also includes a play area 314, an area for a first player hand 316, an area for a second player hand 318, a first player wager area 322, and a second player wager area 324. The display further includes' a message display 328 a wager input 330, a pot sized display 332, an award paid display 338, a total credits display 342, and a final hand ranking display 334. It should be appreciated that in other embodiments, different inputs and display areas may be provided.

Figure 5B:
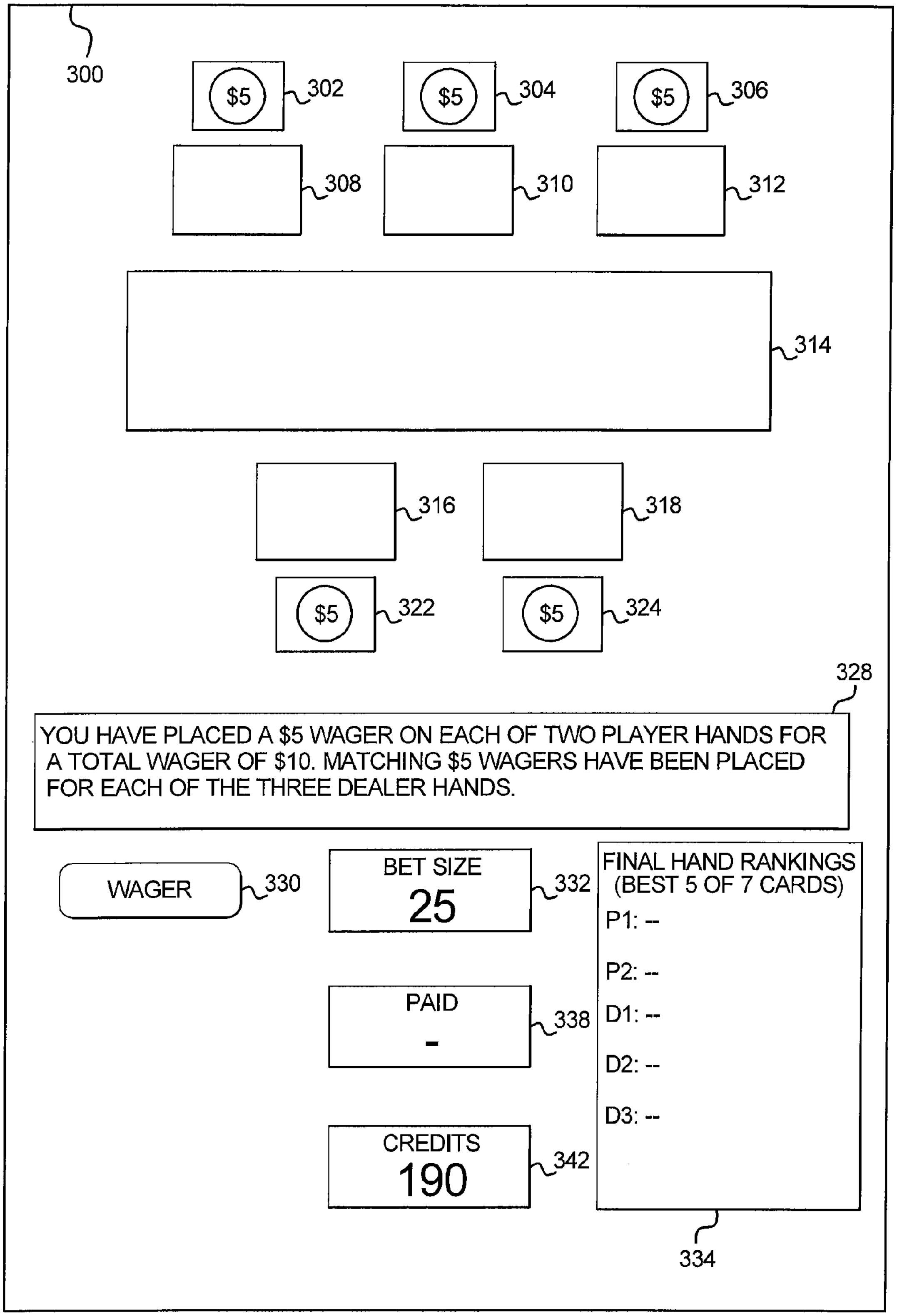

As shown in FIG. 5A, the gaming device 300 prompts or requires the player to place an initial wager. In this embodiment, the amount of the wager is applied to both the first player hand 316 and the second player hand 318. Therefore, if the player places a wager of five credits, five credits are applied to the first player hand 316, and an additional five credits are applied to the second player hand 318, for a total wager amount of ten credits. As shown in FIG. 5A, a player selects the wager input 330 to place a wager. As shown in FIG. 5B, the player has placed five credit wager on each of the two player hands 316 and 318 for a total wager of ten credits, as indicated in the message display 328, the first player wager area 322, and the second player wager area 324. Matching five credits wagers are placed for each of the three dealer hands, as indicated by the message display 328, the first dealer wager area 302, the second dealer wager area 304, and the third dealer wager area 306. Therefore, the total wager by the player is ten credits and the total pot size is twenty five credits, as indicated in the bet size display 332. The gaming device 300 causes the credits display to be reduced from two-hundred credits down to one-hundred ninety credits, as indicated in the total credits display 342.

Figure 5C:
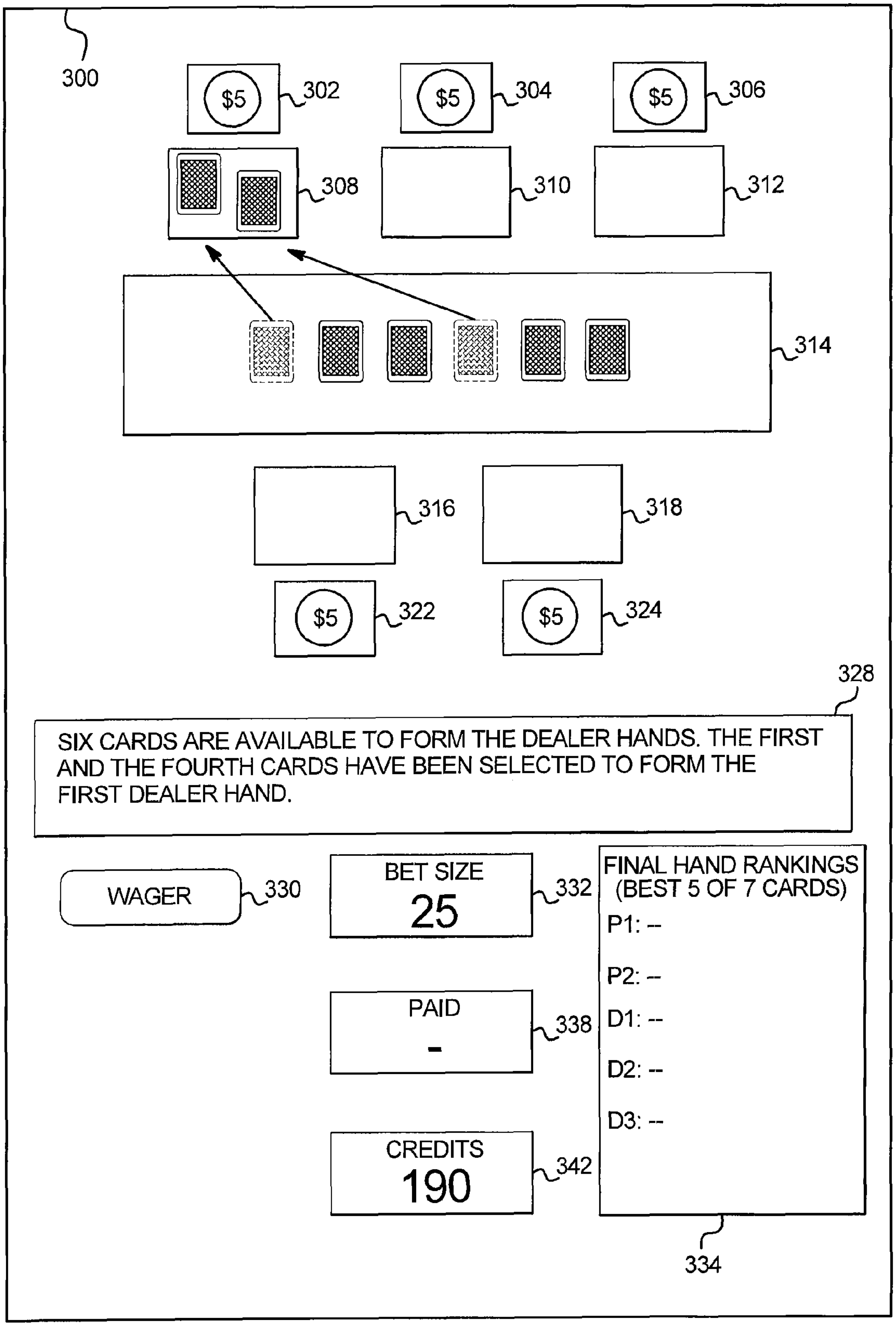

As shown in FIG. 5C, the gaming device 300 deals six cards into the play area 314. The six cards are available to form the three two-card initial dealer hands. In this embodiment, the dealer cards are all dealt face-down. However, it should be appreciated that in other embodiments, one or more of the initial dealer cards may be dealt faced up. As shown in FIG. 5C, the gaming device 300 selects the first and fourth available dealer cards in the play area 314 to form the first dealer hand 308. Although not shown in FIG. 5C, the gaming device 300 includes one or more computer programs to utilize knowledge of the six available dealer cards in order to combine the cards into three dealer hands (i.e., the gaming device 300 combines the cards to form three dealer hands so as to maximize the probability of beating the player hands).

Figure 5D:
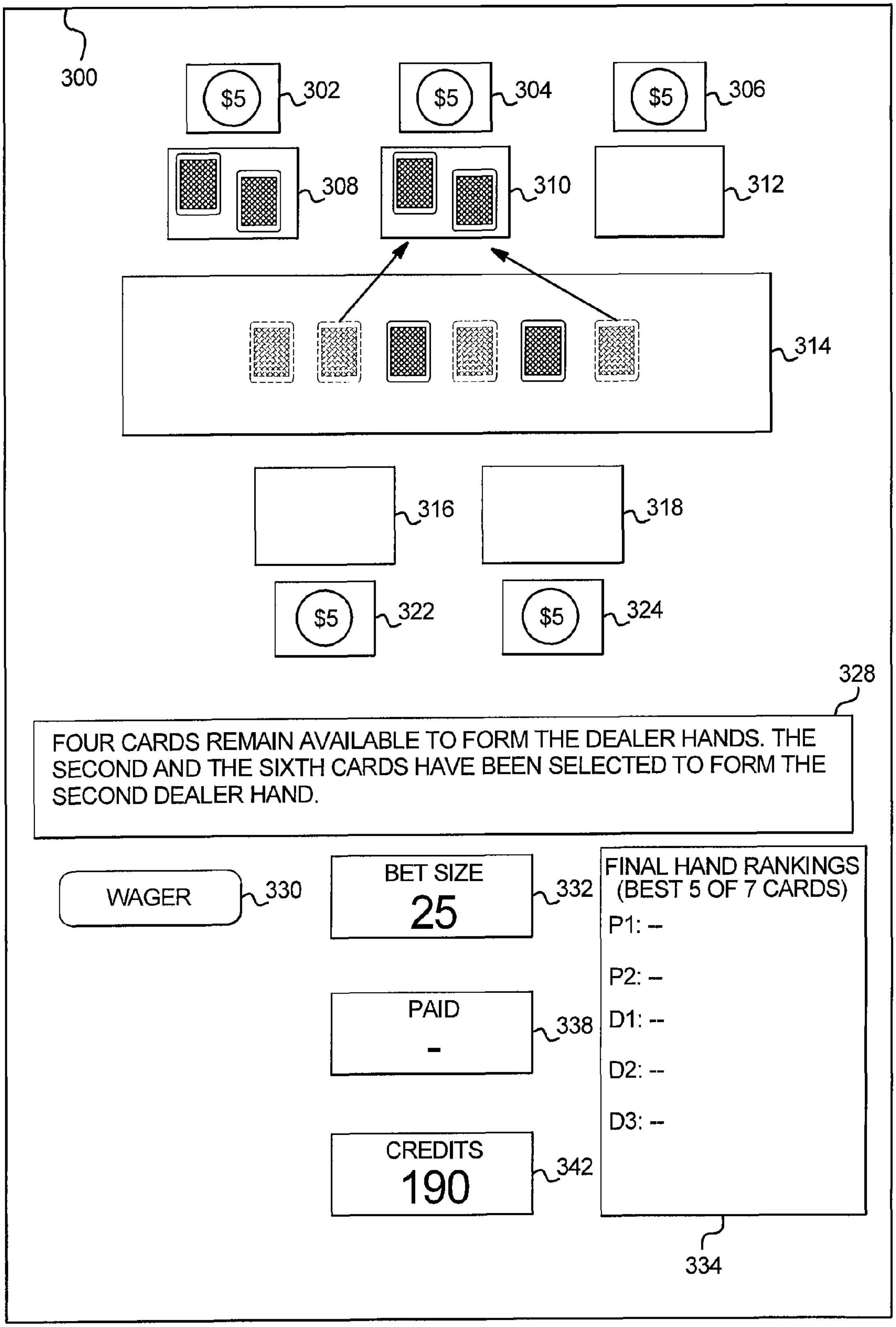
Figure 5E:
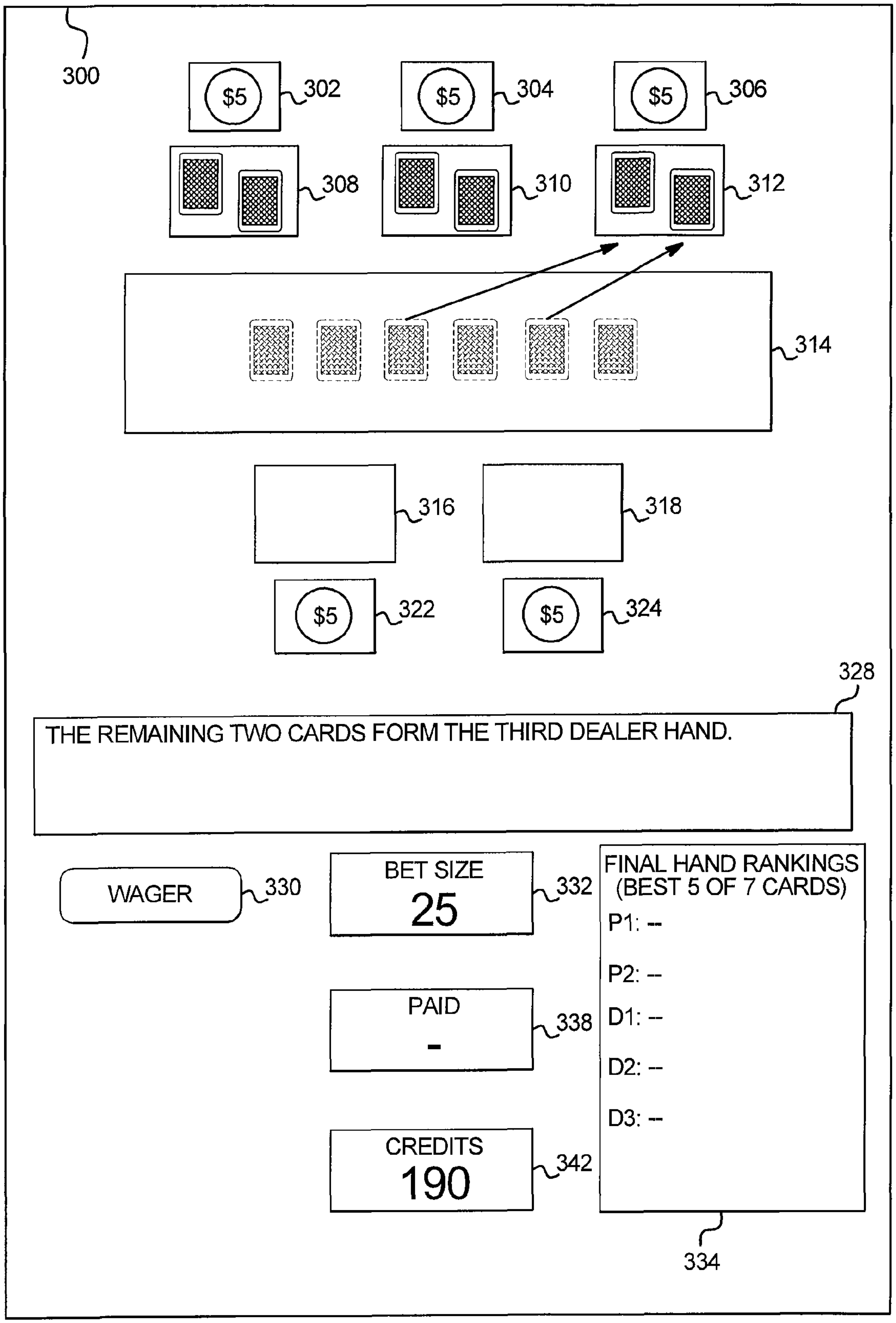

As shown in FIG. 5D, four cards remain available to form the remaining second dealer hand 310 and the third dealer hand 312, as also indicated in the message display 328. The gaming device 300 selects the second and the sixth available dealer cards to form the second dealer hand 310. As shown in FIG. 5E, the only two remaining dealer cards (i.e., the third card and the fifth card) form the third and final dealer hand 312.

Figure 5F:
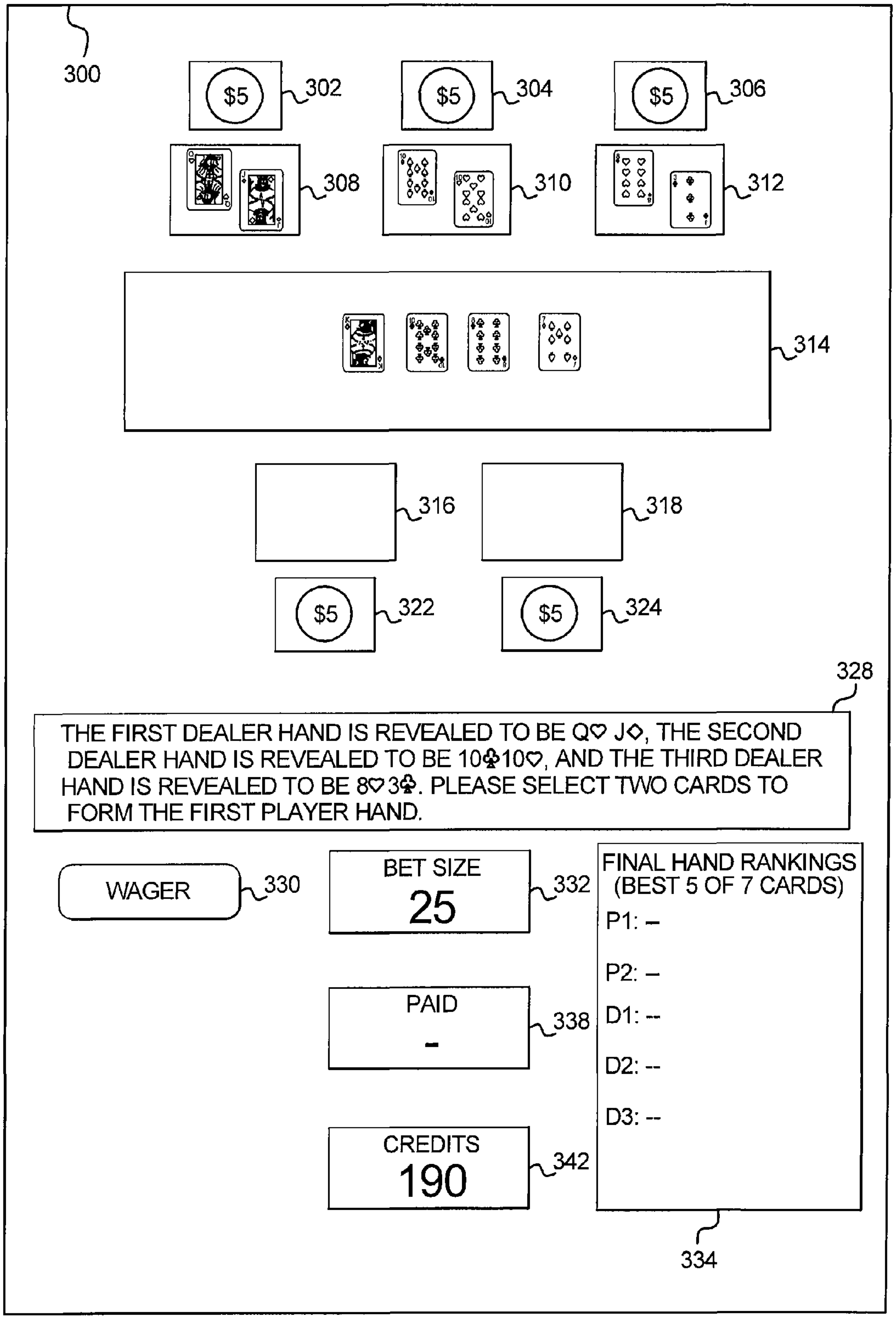

As shown in FIG. 5F, the first dealer hand 308 is revealed and includes a Queen of Hearts (Q♥) and the Jack of Diamonds (J♦). The second dealer hand 310 is revealed and includes the Ten of Clubs (10♣) and the Ten of Hearts (10♥), and the third dealer hand 306 is revealed and includes the Eight of Hearts (8♥) and the Three of Clubs (3♣). The gaming device 300 deals the four available player cards into the play area 314, from which the player may select two player cards to form the first player hand 316 and two player cards to form the second player hand 318. As shown in FIG. 5F, the four available player cards include the King of Spades (K♠), the Ten of Clubs (10♣), the Eight of Clubs (8♣), and the Seven of Spades (7♠). The gaming device 300 instructs the player to select two cards to form the first player hand 316, as indicated in the message display 328.

Figure 5G:
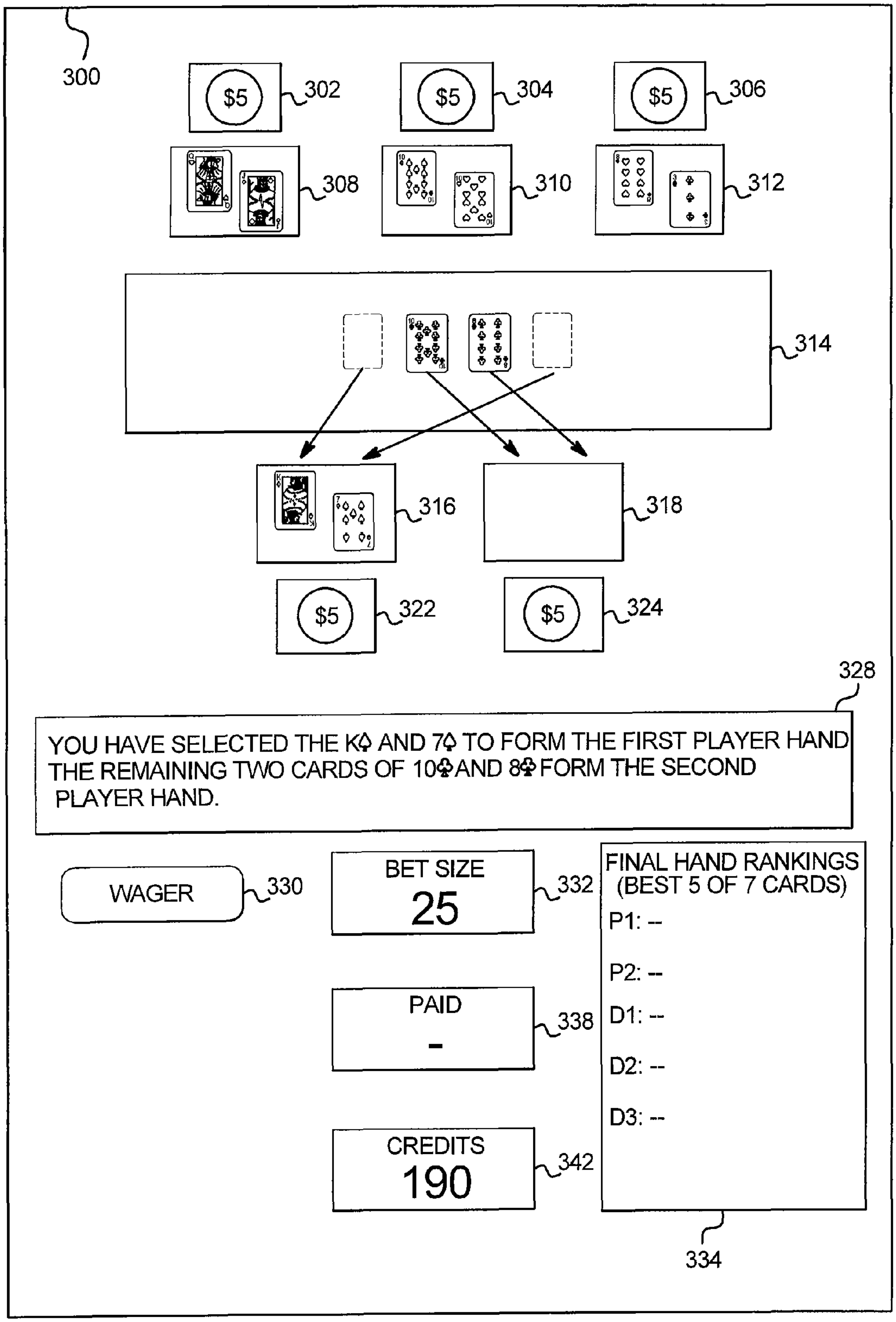

As shown in FIG. 5G, the player has selected the King of Spades (K♠) and the Seven of Spades (7♠) to form the first player hand 316. The remaining two player cards that include the Ten of Clubs (10♣) and the Eight of Clubs (8♣), are automatically moved to or designated to form the second player hand 318. In this embodiment, because the cards in each of the dealer hands have been previously revealed to the player at the time the player is able to select the player hands, the player is able to factor in the dealer cards when making these decisions. Accordingly, the player has a certain advantage in being able to select cards for the first player hand 316 and the second player hand 318 after the dealer cards have been revealed.

Figure 5H:
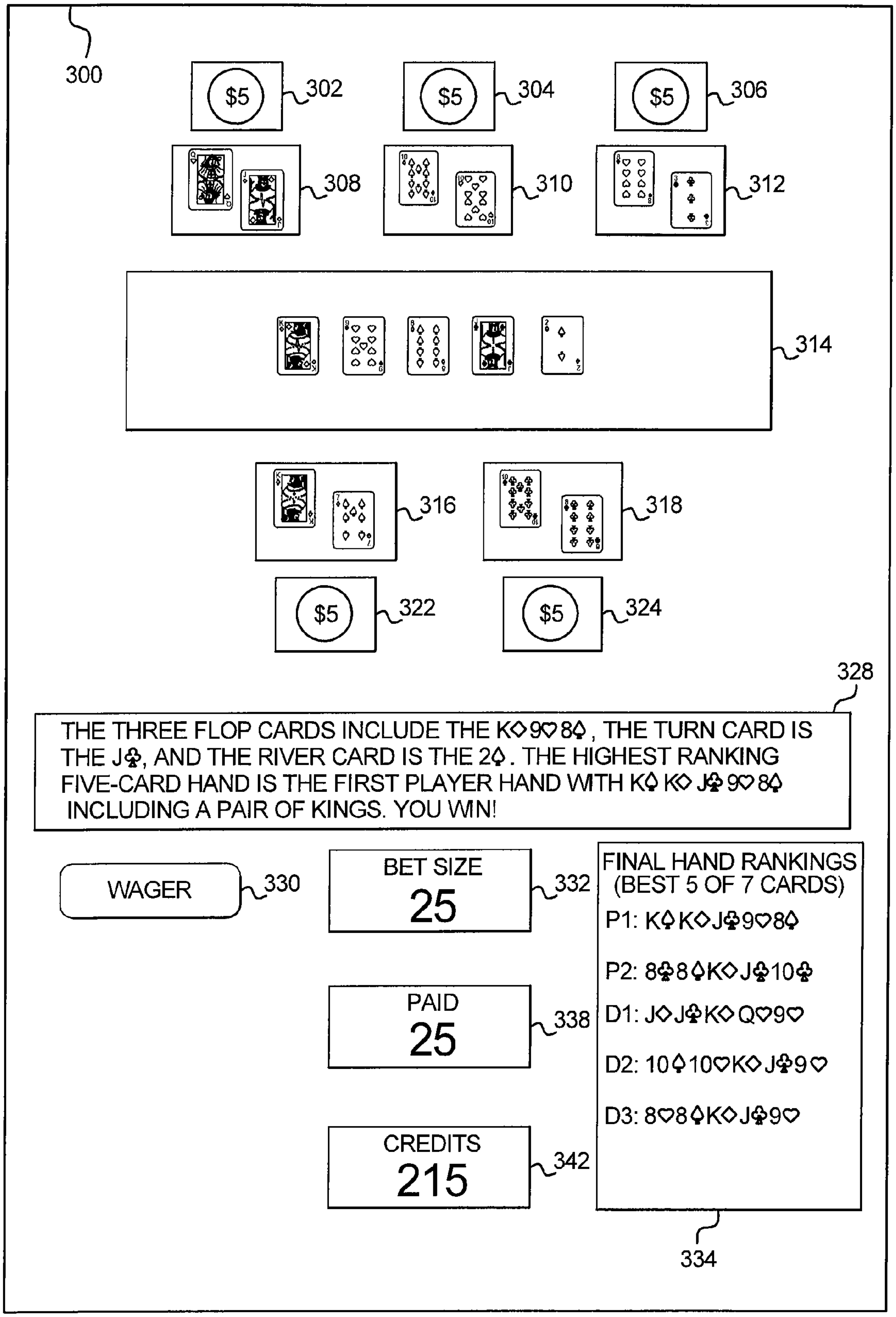

As shown in FIG. 5H, the gaming device 300 deals the community cards into the play area 314. The five community cards include three flop cards, a single turn card, and a single river card. In this example play of the game, the three flop cards include the King of Diamonds (K♦), the Nine of Hearts (9♥), and the Eight of Spades (8♠). The turn card is the Jack of Clubs (J♣), and the river card is the Two of Spades (2♠), as indicated in the play area 314 and in the message display 328. The final hand ranking (i.e. the best five of seven cards) for the first player hand 316 includes the King of Spades (K♠), the King of Diamonds (K♦), the Jack of Clubs (J♣), the Nine of Hearts (9♥), and the Eight of Spades (8♠), and the final hand ranking for the second player hand 318 includes the Eight of Clubs (8♣), the Eight of Spades (8♠), the King of Clubs (K♣), the Jack of Clubs (J♣), and the Ten of Clubs (10♣). The final hand ranking of the first dealer hand includes the Jack of Diamonds (J♦), the Jack of Clubs (J♣), the King of Clubs (K♣), the Queen of Hearts (Q♥), and the Nine of Hearts (9♥), the final hand ranking of the second dealer hand 310 includes the Ten of Spades (10♠), the Ten of Hearts (10♥), the King of Diamonds (K♦), the Jack of Clubs (J♣), and the Nine of Hearts (9♥), and the final hand ranking of the third dealer hand 312 includes the Eight of Hearts (8♥), the Eight of Spades (8♠), the King of Diamonds (K♦), the Jack of Clubs (J♣), and the Nine of Hearts (9♥).

Accordingly, the highest ranking five-card hand of the dealer hands and the player hands is the first player hand 316 which includes the King of Spades, the King of Diamonds, the Jack of Clubs, the Nine of Hearts, and the Eight of Spades. That is, the first player hand, including the pair of Kings, is higher ranking than the highest ranking dealer hand, which includes a pair of Jacks (i.e., the first dealer hand 308). The gaming device 300 provides an award of twenty-five credits to the player as indicated in the award paid display 338. The gaming device 300 causes the total number of player credits to be updated from one-hundred credits to two-hundred fifteen credits, as indicated in the total credit display 342. This ends this example round of play of the game.

In one embodiment, a seven card poker game is provided as described above with respect to FIGS. 5A to 5H, where the gaming device deals six dealer cards into the play area, where the initial six dealer cards are not initially visible to the player. In this embodiment, the gaming device separates the six dealer cards into three different two-card dealer hands. In this embodiment, the cards in the three dealer hands are not revealed to the player prior to the player selecting amongst the four player cards to form their two two-card player hands. Therefore, in this embodiment, the player receives four cards, face-up, which the player separates into different two-card player hands. Accordingly, in this embodiment, the player does not have the advantage of knowing the values of the six different cards in the dealer hands. Then, the gaming device reveals the cards in the dealer hands, the five community cards are dealt, and the gaming device determines the highest ranking hand from amongst the player hands and the dealer hands. The highest ranking hand wins all the money in the pot and the game ends. In one embodiment, the gaming device utilizes the knowledge of the player cards prior to making a selection of the three dealer hands. In another embodiment, the gaming device does not utilize knowledge of the player cards when making selections for the dealer hands.

In one embodiment, a seven card poker game is provided as described above with respect to FIGS. 5A to 5H, where the gaming device places two wagers of the same amount and receives four cards which are not visible to the player, which the gaming device then separates into different two-card dealer hands. Then, a player receives four cards, face-up, which the player separates into two different two-card player hands. Thus, in this embodiment, both the player and the gaming device each receive two two-card hands. In this embodiment, the cards forming the two-card dealer hands are revealed after the player separates the player cards into the different player hands. Thus, the player does not have the advantage of being able to take into account the values of the cards in the dealer hands prior to making the player's selections. After the dealer hands and the player hands have been separated, the gaming device deals a number of community cards and the highest ranking hand takes the money in the pot. In one embodiment, the gaming device separates the cards in the dealer hands with knowledge of the values of the four player cards. However, it should be appreciated that in another embodiment, the gaming device separates the cards for the dealer hands without knowledge of the values of the cards in the player hands.

In one embodiment, a seven-card poker game is provided as described above with respect to FIGS. 5A to 5H where the player can optionally pay an additional fee. In this embodiment, a bonus award is paid to the player if the player has a winning hand, and the player is paid according to a paytable. Thus, if the player has one hand that has a sufficiently high rank, and if the player has paid the additional fee, the player wins a bonus award. In one embodiment, the value of the bonus award is a function of the rank of the player's hand. In another embodiment, the additional fee is required, and is not optional to the player.

FOURTH EXAMPLE EMBODIMENT OF A POKER GAME

As shown in FIGS. 6A to 6I, in one embodiment, the gaming device 400 incorporates a Texas Hold'em style poker game where the gaming device 400 initially deals four cards face-down from which the gaming device 400 may select to form dealer hands. Two cards are selected to form the first dealer hand 408 and two-cards are selected to form a second dealer hand. After the gaming device 400 deals the cards for the first dealer hand 400 and the second dealer hand 410, the four dealer cards are revealed. Then, the gaming device 400 deals four cards into a play area 414, from which the player can select two cards to form a first player hand 416 and two cards to form a second player hand 418.

Figure 6A:
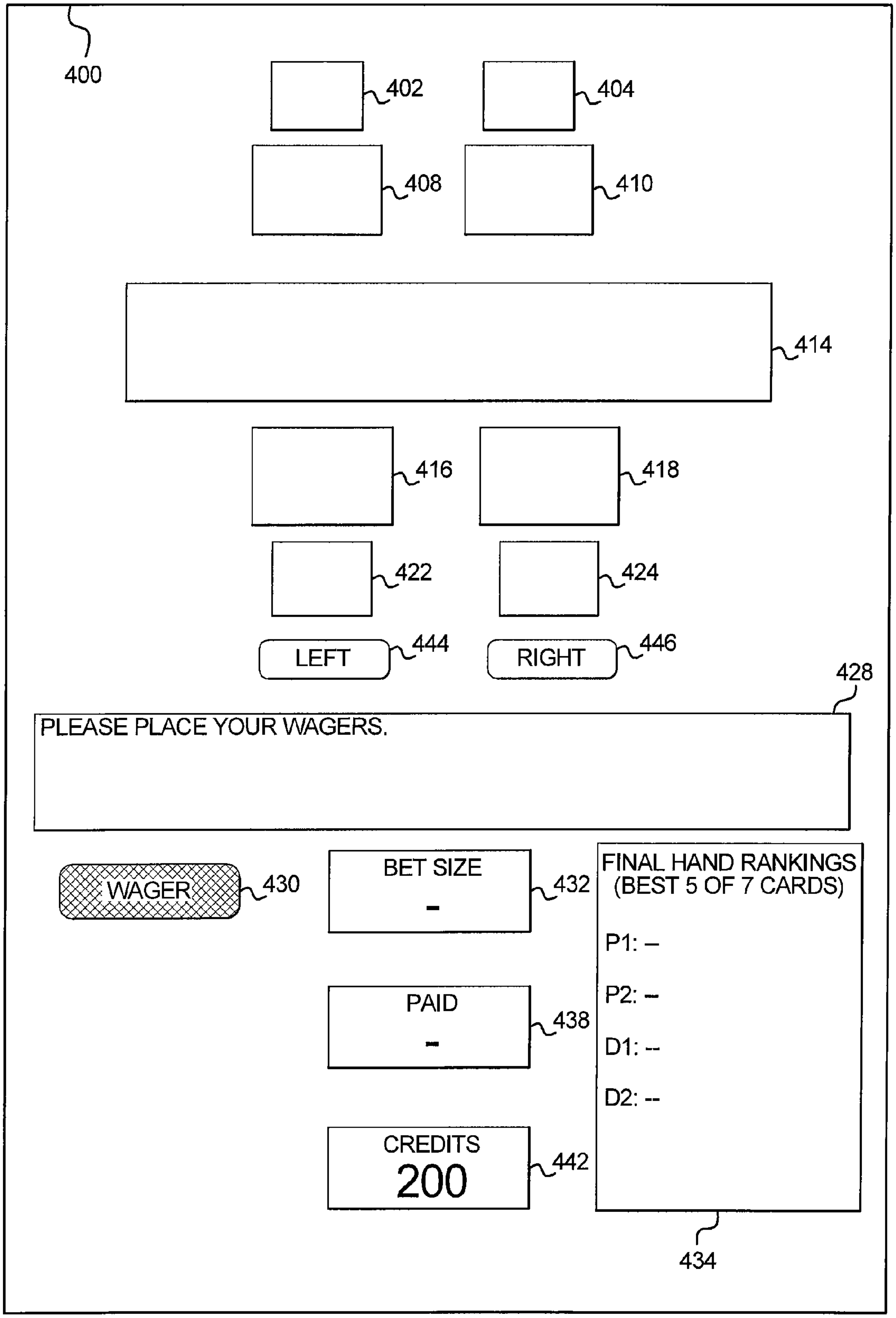
FIGS. 6A, 6B, 6C, 6D, 6E, 6F, 6G, 6H and 6I are illustrations of screen displays for a round of play of the game, in an embodiment where player cards and dealer cards are distributed to player and dealer hands, respectively.

As shown in FIG. 6A, the display of the gaming device 400 includes several elements. The display includes a first dealer wager area 402, a second dealer wager area 404, an area for a first dealer hand 408, and an area for a second dealer hand 410. The display also includes a play area 414, an area for a first player hand 416, an area for a second player hand 418, a first player wager area 422, and a second player wager area 424. In this embodiment, the display also includes a left side select button 444 and a right side select button 446. The select buttons enable a player to direct the gaming device to move one of the player cards to either the first player hand 416 or the second player hand 418. However, it should be appreciated that in other embodiments, alternative input or selection devices such as a touch screen or other suitable input devices may be used to allow or enable a player to provide input to the gaming device directing placement of cards into the respective player hands. The display also includes a message display 428, a wager input 430, a bet size display 432, a final hand ranking display 434, an award paid display 438, and a total credits display 442. It should be appreciated that the display may include any other suitable inputs or other displays to facilitate the play of the game.

Figure 6B:
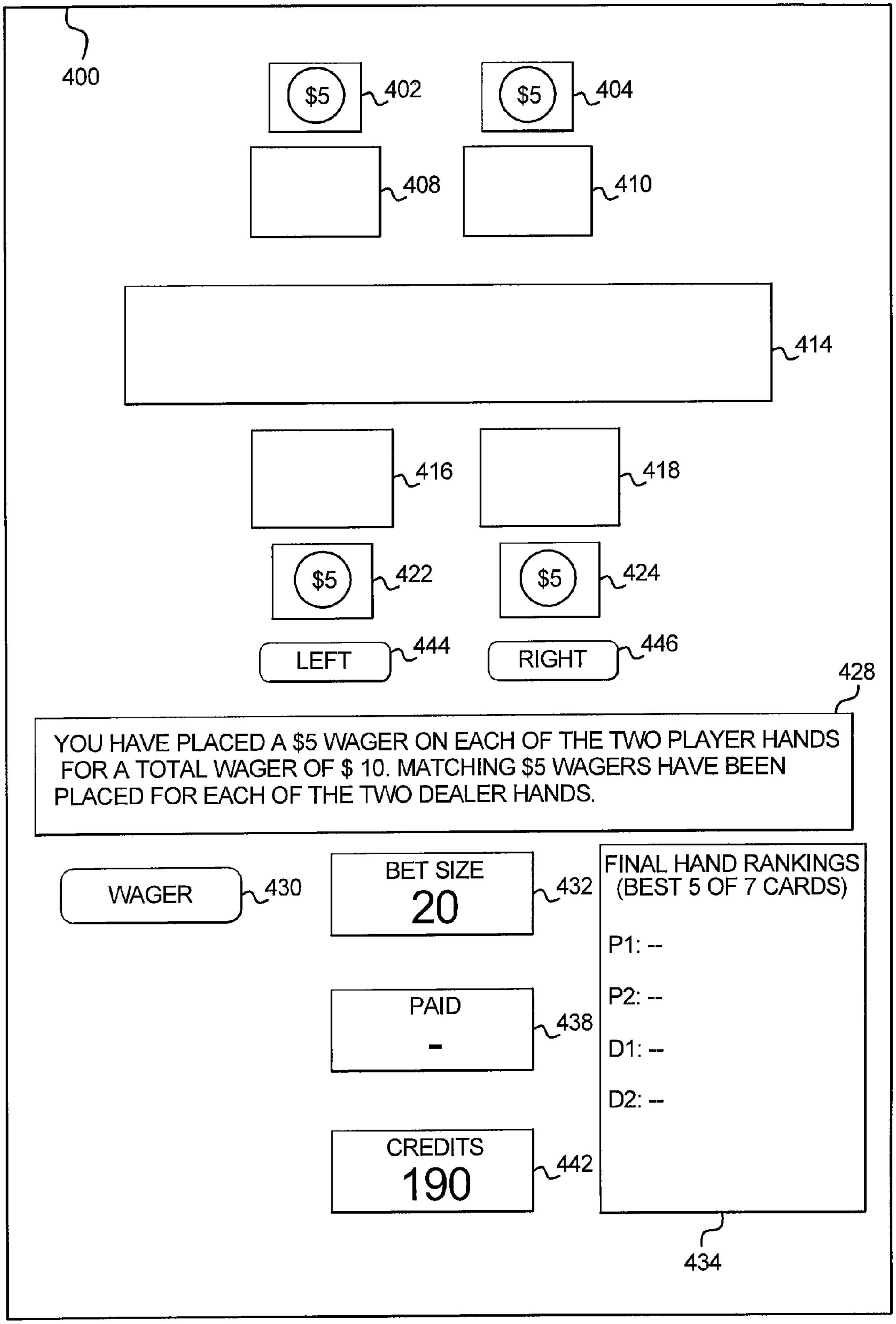

As shown in FIG. 6A, the gaming device 400 directs the player to place an initial wager, as shown in the message display 428. As shown in FIG. 6B, the player has placed a five credit wager on each of two player hands 416, 418, for a total wager of ten credits, as indicated in the message display 428, the first player wager area 422, and the second player wager area 424. The gaming device 400 places matching five credit wagers for the first dealer hand 408 and the second dealer hand 410. The matching five-credit wagers for the dealer hands are indicated in the message display 428, the first dealer wager area 402, and the second dealer wager area 404. The gaming device 400 updates the pot size to twenty credits, as indicated in the bet size display 432. The gaming device 400 causes the credits display 442 to decrease the total amount of the player credits from two-hundred down to one-hundred ninety.

Figure 6C:
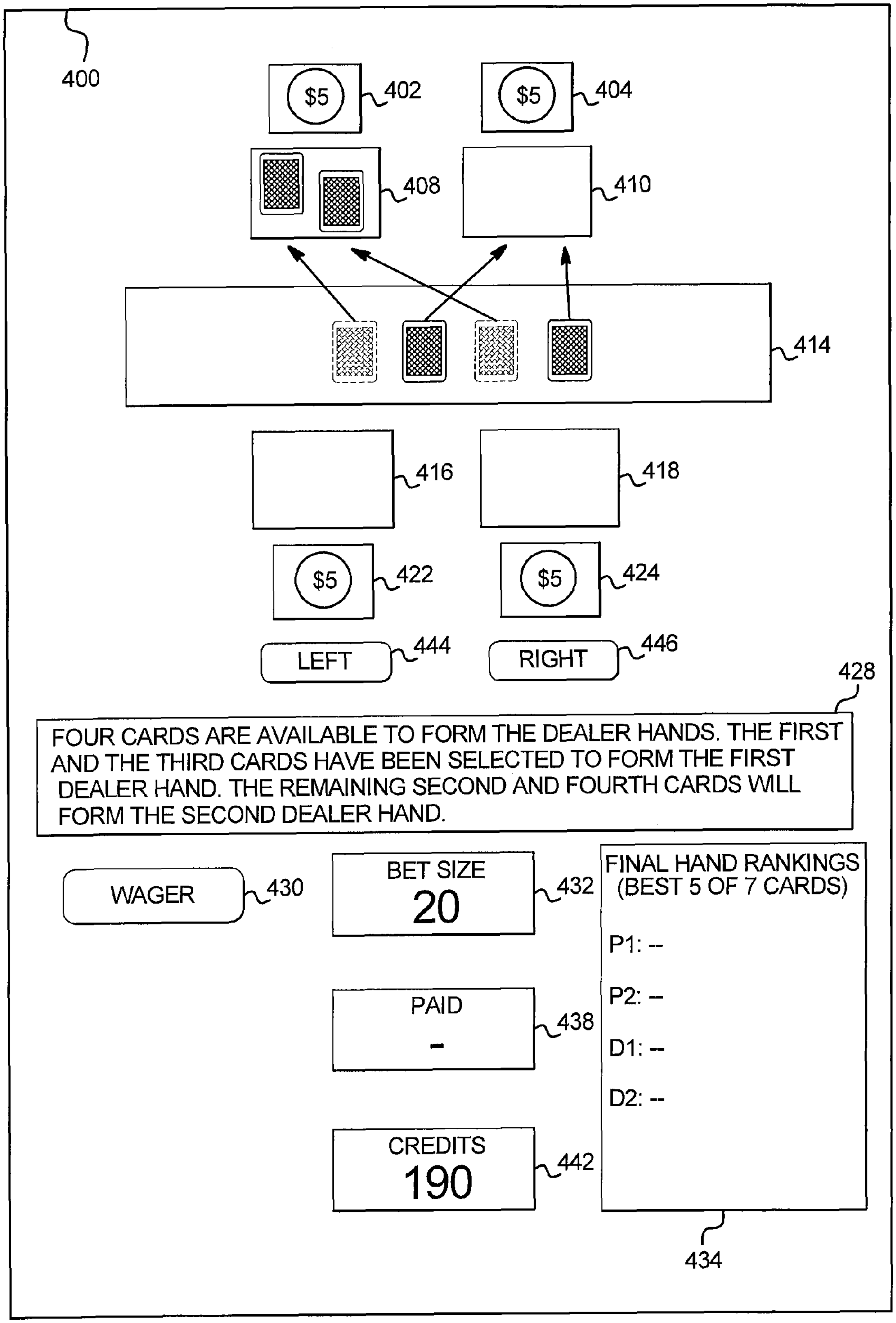

As shown in FIG. 6C, the gaming device 400 deals four dealer cards face-down in the play area 414, where the four dealer cards are available for selection into the first dealer hand 408 and the second dealer hand 410. In this example play of the game, the gaming device 400 causes the first and third cards in play area 414 to be moved to form the first dealer hand 408. The remaining second and fourth cards in the play area 414 will be moved to form a second dealer hand 410, as indicated in the message display 428.

Figure 6D:
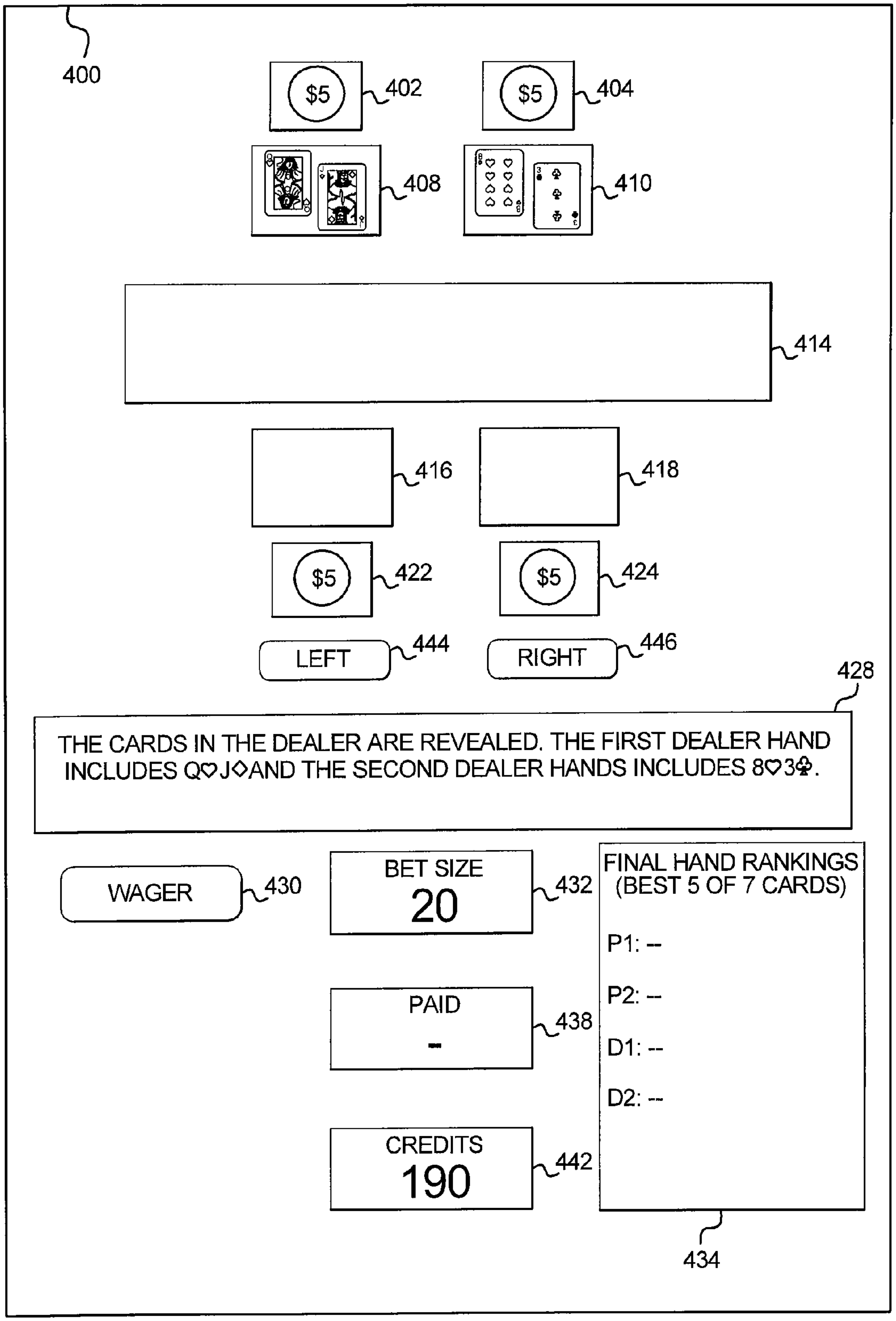

As shown in FIG. 6D, the gaming device 400 causes the cards in the first dealer hand 408 and the cards in the second dealer hand 410 to be revealed. The first dealer hand 408 includes the Queen of Hearts (Q♥) and the Jack of Diamonds (J♦), and the second dealer hand 410 includes the Eight of Hearts (8♥) and the Three of Clubs (3♣), as also indicated in the message display 428.

Figure 6E:
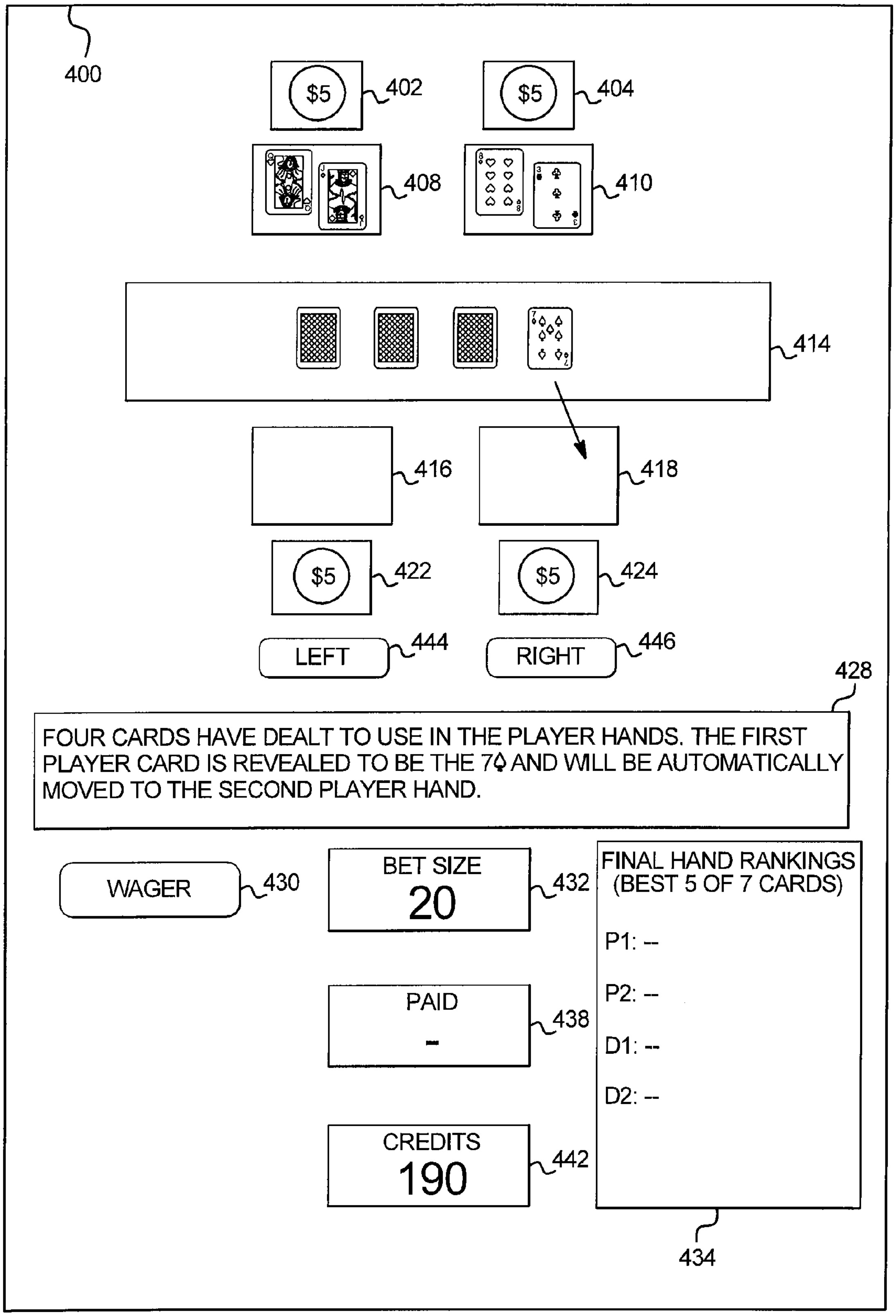
Figure 6F:
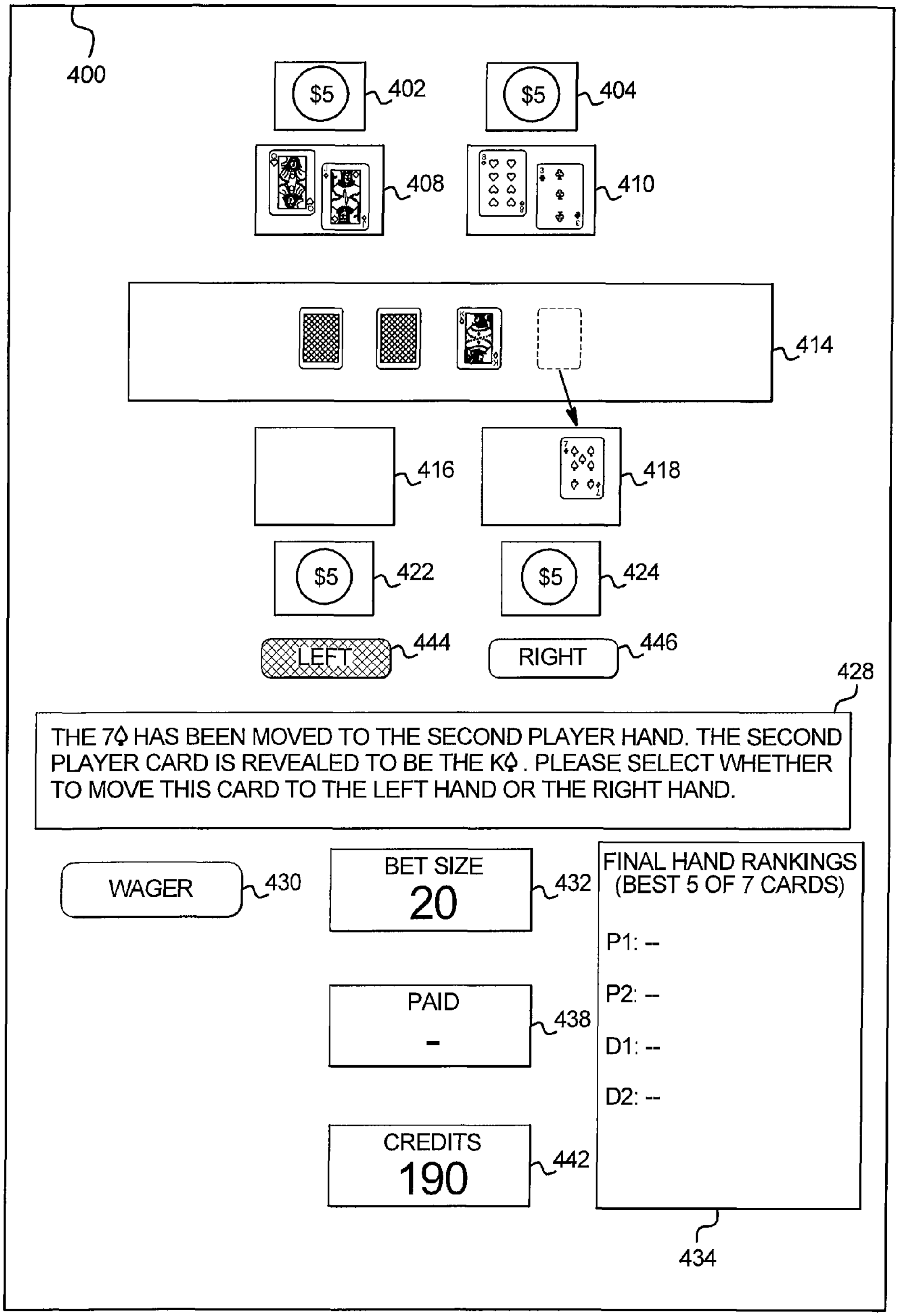

As shown in FIG. 6E, the gaming device 400 causes four cards to be dealt into the play area 414 for use in the player hands. All of these cards are initially dealt face-down. At this stage, the gaming device 400 causes a first player card to be revealed to the player in the play area 414, where the first player card is a Seven of Spades (7♠). In this embodiment, the gaming device 400 automatically moves this first card to the second player hand 418, as indicated in message display 428 and as shown by the direction arrow in FIG. 6E. However, it should be appreciated that in other embodiments, the player may also select to which hand the first revealed should go. As shown in FIG. 6F, the first player card, which is the Seven of Spades (7♠), has been moved to the second player hand 418.

Then, the gaming device 400 causes a second player card to be revealed, where the second player card is the King of Spades (K♠). The gaming device 400 then directs the player to select whether to move this second player card to the left hand side or the right hand side (i.e. the first player hand 416 or the second player hand 418, respectively). Therefore, in this embodiment, the player has a slight disadvantage in not having knowledge of the remaining third and fourth player cards, as in the embodiment described above with respect to FIGS. 5A-5H. Thus, the player must make a decision to place the King of Spades (K♠) into the first player hand 416 or into the second player hand 418 with incomplete knowledge of the remaining two player cards. This disadvantage to the player may be at least marginally offset by the fact that there are only two dealer hands, in contrast to the three dealer hands described above with respect to the embodiment shown in FIGS. 5A-5H.

Figure 6G:
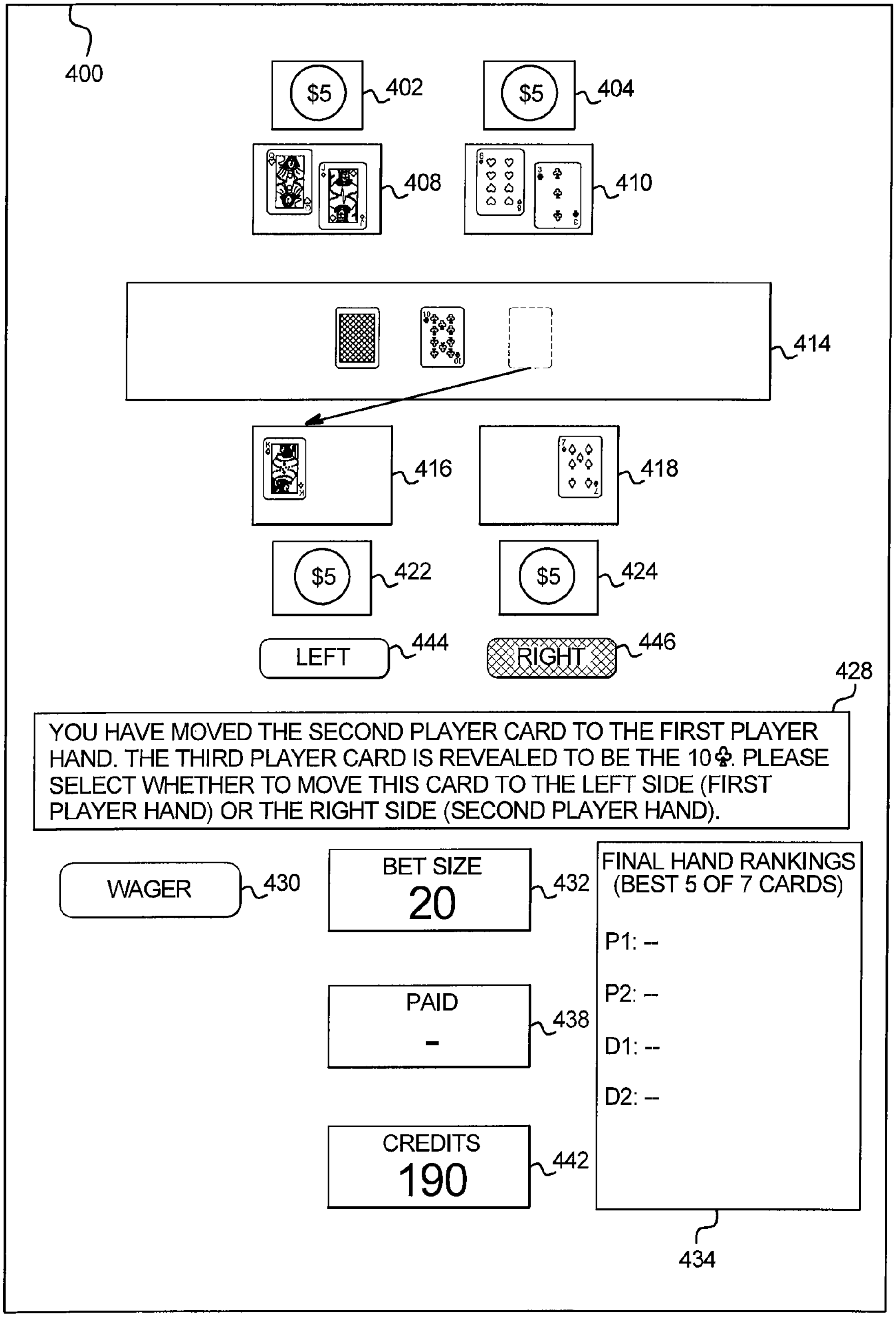

As shown in 6F, the player has selected to move the King of Spades (K♠) to the first player hand 416, by activating the left input 444. As shown in FIG. 6G, the gaming device 400 has caused a second player card (i.e., the King of Spades) to be moved to the first player hand 416, as also indicated by the message display 428. Therefore, the player has a single card in the first player hand 416 and a single card in the second player hand 418. The gaming device 400 causes the third player card in the play area 414 to be revealed, where the third player card is the Ten of Clubs (10♣). Then, the gaming device 400 directs the player to move the third player card to either the left side (i.e., the first player hand 416) or the right side (i.e., the second player hand 418), and also indicated in message display 428. As shown in FIG. 6G, the player has chosen to move the third player card to the second player hand 418, as indicated by the activated right input 446.

Figure 6H:
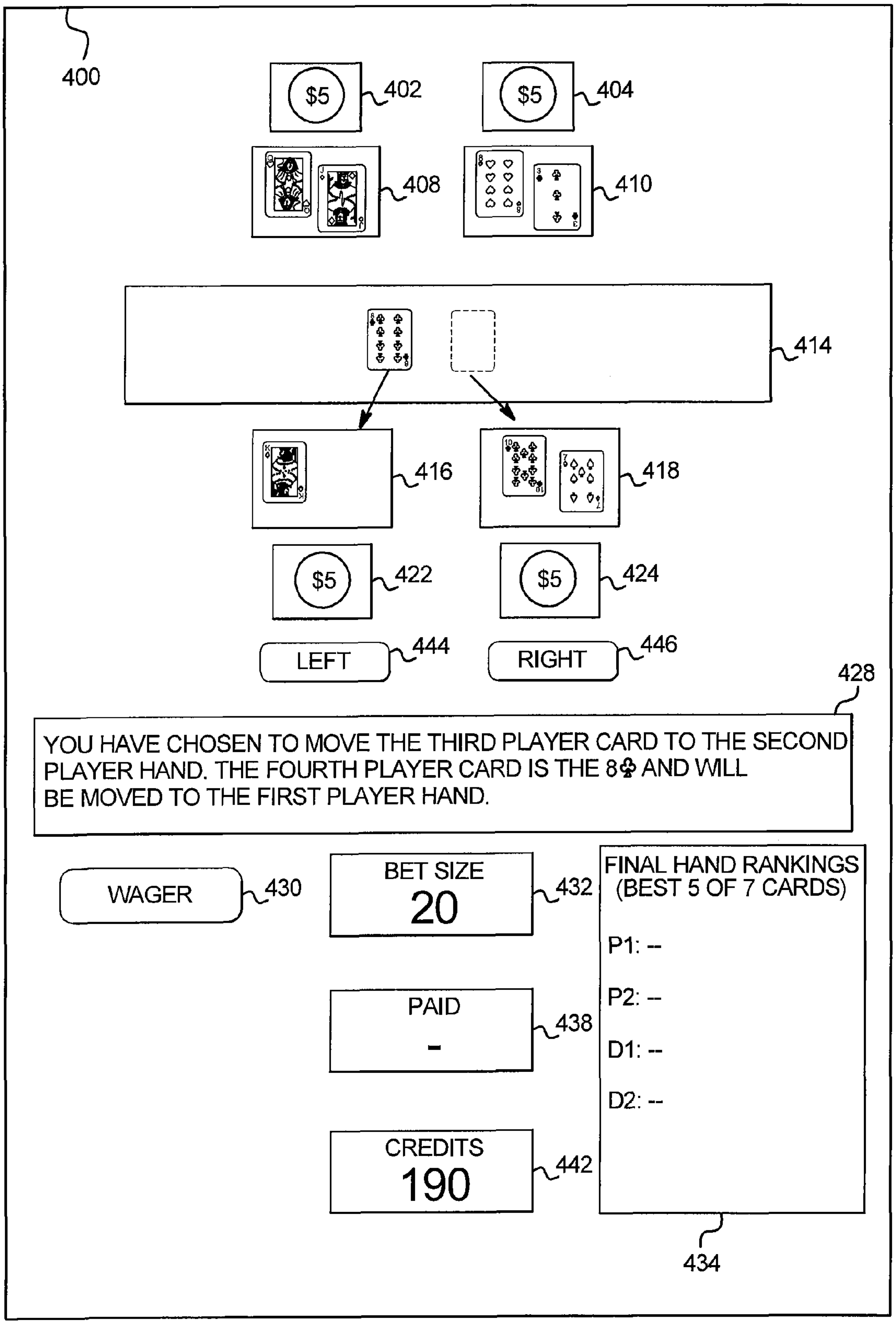
Figure 6I:
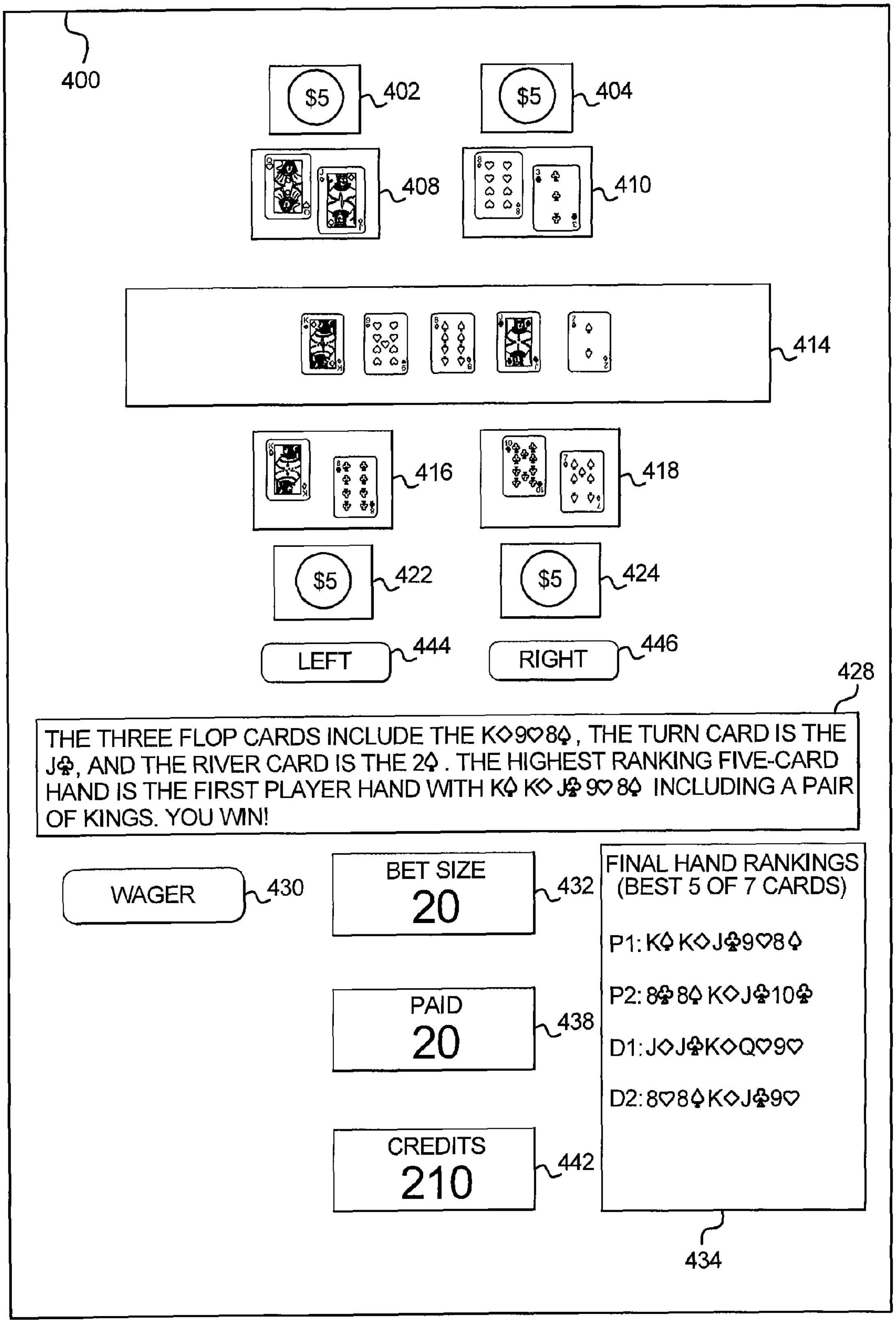

As shown in FIG. 6H, the gaming device causes the third player card to be moved to the second player hand 418. Therefore, at this stage, the first player hand 416 includes one card and the second player hand 418 includes two-cards. Accordingly, the gaming device 400 automatically causes the fourth player card (i.e., the only player card remaining) to be revealed and moved to the open position in the first player hand 416. In this example, the fourth player card is the 8♣. As shown in FIG. 6I, the gaming device 400 deals the five community cards into the play area 414. In this example, the three flop cards include the K♦, 9♥ and 8♠, the turn card is the J♣ and the river card is the 2♠, as also indicated in message display 428. The gaming device 400 determines the final hand rankings (i.e., the best five of seven cards) for the player hands and the dealer hands. As indicated in the final hand rankings display 434, the final hand ranking of the first player hand 416 includes the K♠, K♦, J♣, 9♥ and 8♠, and the final hand ranking of the second player hand 418 includes the 8♣, 8♠, K♦, J♣ and 10♣. The final hand ranking of the first dealer hand includes the J♦, J♣, K♦, Q♥, 9♥, and the final hand ranking of the second dealer hand 410 includes the 8♥, 8♠, K♦, J♣ and 9♥. Accordingly, the highest ranking five-card hand is the first player hand 416 which includes a pair of Kings. The gaming device 400 provides the player with an award of twenty credits, as indicated in the awards display 438. The gaming device 400 updates the total credits display 442 from one-hundred ninety credits to two-hundred ten credits. This ends this example round of play of the game.

In one embodiment, instead of the player playing against dealer hands, the gaming system enables the player to play against a paytable. In one embodiment, the player is paid relative to the highest ranking hand of the player hands, if the highest ranking hand is of a sufficiently high rank and is paid according to a paytable. In another embodiment, the gaming system pays the player relative to the ranking of each player hand that has a sufficiently high rank according to a paytable. In another embodiment, the player plays K number of hands, where K can be any integer number greater than one. In this embodiment, the gaming system deals 2*K cards to the player from which the player is to form K number of two-card player hands. In one example, where K=2, the player is dealt four cards and directs the gaming system to place two cards into each of the two-card hands. In one embodiment, the player's cards are dealt one at a time, and after each card is dealt, the player assigns the card to a particular hand.

In one example embodiment, a single player multi-hand Texas Hold'em style poker game is provided where the player receives awards based on a paytable and does not compete against a dealer hand. In one such embodiment, the player places three equal wagers on three different initial two-card player hands. In one embodiment, the gaming system deals multiple player hands and multiple community cards. Each of the initial two-card player hands are dealt face-up. After viewing the initial two-card player hands, the player can elect to fold one of the two-card player hands and withdraw the wager associated with that player hand. The gaming system deals three community cards and the player again has the option to fold a hand and withdraw a wager associated with that player hand. Two additional community cards are dealt for a total number of community cards equaling five. After the community cards are dealt, if one or more of the remaining unfolded player hands are of a predetermined minimum rank as set forth in a paytable, the gaming device provides the player with an award for each winning hand according to the paytable and based on the wager amount. In this embodiment, the player can strategically remove poor ranking starting hands and thus conserve potential losses, as described above.

In another embodiment, a single player multi-hand Texas Hold'em style poker game with community cards is provided where the player selects one player hand from a plurality of initial two-card player hands, and the player plays the selected player hand against a plurality of dealer hands. In one such embodiment, the gaming system deals six cards to the player to form three two-card player hands. Four cards are dealt to form two separate two-card dealer hands. The player must select one of the three player hands that the player believes will have the highest probability of beating both of the dealer hands. In these embodiments, five community cards are dealt as described above. If the selected player hand has a higher rank than all of the dealer hands, the player wins an award. In one such embodiment, the player has a certain advantage because the player can select the best hand from among three different starting player hands, whereas there are only two dealer hands. However, the player also has a certain disadvantage in that the player must select and use only one of the three player hands, and the selected hand must have a higher final rank that both of the final dealer hands.

In one embodiment where the player must select one of a plurality of player hands, the player can view the cards in the two-card dealer hands prior to making a selection of the player hand. In another embodiment, the player is not able to view the cards in the dealer hands prior to making a selection of the player hand. In one embodiment, the player makes an initial ante wager. In this embodiment, if the player wishes to fold all of the hands the player forfeits the ante wager. If the player wishes to continue the game by making a selection of one of the player hands, the player must double the initial ante wager.

In another embodiment, a single player multi-hand Texas Hold'em style poker game is provided where the player forms multiple two-card player hands from a set of dealt cards. The gaming system also forms multiple two-card dealer hands from a set of dealt cards. In one such embodiment, the gaming device initially deals six dealer cards face-down from which the gaming device selects cards to form the two-card dealer hands. The gaming system selects two cards to form a first dealer hand, selects two cards to form a second dealer hand, and selects two cards to form a third dealer hand. After the gaming device deals the cards for the first dealer hand, the second dealer hand, and the third dealer hand, the six dealer cards are revealed to the player. The gaming device deals four cards into a play area from which the player can select two cards to form a first player hand and two cards to form a second player hand. In this embodiment, the player is able to view all of the four player cards and six dealer cards prior to selecting the cards to form the first and second player hands.

In another embodiment, only four dealer cards are dealt to form two two-card dealer hands. In this embodiment, the player is not able to view all of the player cards when choosing where to place the player cards (i.e., only one player card is revealed at a time). In this embodiment, because only one of the player cards is revealed at a time, the player must make a best guess as to what the remaining face-down player cards will be when choosing which player to place each player card.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:

at least one input device;

at least one processor;

at least one display device; and at least one memory device storing a plurality of instructions which, when executed by the at least one processor, cause the at least one processor to operate with the at least one display device and the at least one input device to, for each of at least one player, for a play of a game by said player:

(a) enable said player to place a number of wagers, the number of wagers being at least two, (b) display a quantity of player hands each including at least one card and a quantity of two-card dealer hands, the quantity of player hands and the quantity of dealer hands each being equal to the number of wagers, (c) for each of the player hands, associate one of the wagers with said player hand, (d) enable said player to fold one of the player hands and, if said player folds one of the player hands, withdraw the wager associated with said folded player hand and return said withdrawn wager to said player, (e) determine whether to fold one of the dealer hands based, at least in part, on whether said player folds one of the player hands and at least one other predefined condition, and if the at least one processor determines to fold one of the dealer hands, display an indication of said folded dealer hand, (f) display at least one community card, (g) for each non-folded player hand, determine a final player hand, said final player hand including one or more of: one of the community cards and one of the cards of said non-folded player hand, (h) for each non-folded dealer hand, determine a final dealer hand, said final dealer hand including one or more of: one of the community cards and one of the cards of said non-folded dealer hand, and (i) provide an award if a rank of one of the final player hands is higher than a rank of all of the final dealer hands, wherein the award is based on a number of remaining wagers and a number of final dealer hands.

2. The gaming system of claim 1, wherein the number of wagers is at least three and the plurality of instructions, when executed by the at least one processor, cause the at least one processor to operate with the at least one display device to repeat (d) and (e) once.

3. The gaming system of claim 1, wherein the number of wagers is at least three and the plurality of instructions, when executed by the at least one processor, cause the at least one processor to operate with the at least one display device to repeat (d) to (f) once.

4. The gaming system of claim 1, wherein the number of wagers is at least four and the plurality of instructions, when executed by the at least one processor, cause the at least one processor to operate with the at least one display device to repeat (d) to (f) twice.

5. The gaming system of claim 1, wherein an amount of each of the placed wagers is a same amount.

6. A method of operating a gaming system, said method comprising, for each of at least one player, for a play of a game by said player:

(a) causing at least one processor to execute a plurality of instructions stored in at least one memory device to operate with at least one input device to enable said player to place a number of wagers, the number of wagers being at least two, (b) causing the at least one processor to execute the plurality of instructions to operate with at least one display device to display a quantity of player hands each including at least one card and a quantity of two-card dealer hands, the quantity of player hands and the quantity of dealer hands each being equal to the number of wagers, (c) for each of the player hands, causing the at least one processor to execute the plurality of instructions to associate one of the wagers with said player hand, (d) causing the at least one processor to execute the plurality of instructions to operate with the at least one input device to enable said player to fold one of the player hands and, if said player folds one of the player hands, withdraw the wager associated with said folded player hand and return said withdrawn wager to said player, (e) causing the at least one processor to execute the plurality of instructions to determine whether to fold one of the dealer hands based, at least in part, on whether said player folds one of the player hands and at least one other predefined condition, and if the at least one processor determines to fold one of the dealer hands, operate with the at least one display device to display an indication of said folded dealer hand, (f) causing the at least one processor to execute the plurality of instructions to operate with the at least one display device to display at least one community card, (g) for each non-folded player hand, causing the at least one processor to execute the plurality of instructions to determine a final player hand, said final player hand including one or more of: one of the community cards and one of the cards of said non-folded player hand, (h) for each non-folded dealer hand, causing the at least one processor to execute the plurality of instructions to determine a final dealer hand, said final dealer hand including one or more of: one of the community cards and one of the cards of said non-folded dealer hand, and (i) causing the at least one processor to execute the plurality of instructions to cause an award to be provided if a rank of one of the final player hands is higher than a rank of all of the final dealer hands, wherein the award is based on a number of remaining wagers and a number of final dealer hands.

7. The method of claim 6, wherein the number of wagers is at least three and which includes causing the at least one processor to execute the plurality of instructions to operate with the at least one display device to repeat (d) and (e) once.

8. The method of claim 6, wherein the number of wagers is at least three and which includes causing the at least one processor to execute the plurality of instructions to operate with the at least one display device to repeat (d) to (f) once.

9. The method of claim 6, wherein the number of wagers is at least four and which includes causing the at least one processor to execute the plurality of instructions to operate with the at least one display device to repeat (d) to (f) twice.

10. The method of claim 6, wherein an amount of each of the placed wagers is a same amount.

11. The method of claim 6, which is provided through a data network.

12. The method of claim 11, wherein the data network is the internet.

13. A non-transitory computer readable medium including a plurality of instructions which, when executed by at least one processor, cause the at least one processor to, for each of at least one player, for a play of a game by said player:

(a) enable said player to place a number of wagers, the number of wagers being at least two, (b) cause at least one display device to display a quantity of player hands each including at least one card and a quantity of two-card dealer hands, the quantity of player hands and the quantity of dealer hands each being equal to the number of wagers, (c) for each of the player hands, associate one of the wagers with said player hand, (d) enable said player to fold one of the player hands and, if said player folds one of the player hands, withdraw the wager associated with said folded player hand and return said withdrawn wager to said player, (e) determine whether to fold one of the dealer hands based, at least in part, on whether said player folds one of the player hands and at least one other predefined condition, and if the at least one processor determines to fold one of the dealer hands, cause the at least one display device to display an indication of said folded dealer hand, (f) cause the at least one display device to display at least one community card, (g) for each non-folded player hand, determine a final player hand, said final player hand including one or more of: one of the community cards and one of the cards of said non-folded player hand, (h) for each non-folded dealer hand, determine a final dealer hand, said final dealer hand including one or more of: one of the community cards and one of the cards of said non-folded dealer hand, and (i) cause an award to be provided if a rank of one of the final player hands is higher than a rank of all of the final dealer hands, wherein the award is based on a number of remaining wagers and a number of final dealer hands.

14. The non-transitory computer readable medium of claim 13, wherein the number of wagers is at least three and the plurality of instructions, when executed by the at least one processor, cause the at least one processor to repeat (d) and (e) once.

15. The non-transitory computer readable medium of claim 13, wherein the number of wagers is at least three and the plurality of instructions, when executed by the at least one processor, cause the at least one processor to repeat (d) to (f) once.

16. The non-transitory computer readable medium of claim 13, wherein the number of wagers is at least four and the plurality of instructions, when executed by the at least one processor, cause the at least one processor to repeat (d) to (f) twice.

17. The non-transitory computer readable medium of claim 13, wherein an amount of each of the placed wagers is a same amount.

* * * * *